US010552769B2

(12) United States Patent
Mahakian et al.

(10) Patent No.: US 10,552,769 B2
(45) Date of Patent: Feb. 4, 2020

(54) STATUS MANAGEMENT FRAMEWORK IN A DISTRIBUTED ORDER ORCHESTRATION SYSTEM

(75) Inventors: Fred Mahakian, Erie, CO (US); Nikhil Parikh, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/359,611

(22) Filed: Jan. 27, 2012

(65) Prior Publication Data

US 2013/0197976 A1  Aug. 1, 2013

(51) Int. Cl.
  *G06Q 10/06* (2012.01)
  *G06Q 10/08* (2012.01)

(52) U.S. Cl.
  CPC ............ *G06Q 10/06* (2013.01); *G06Q 10/08* (2013.01)

(58) Field of Classification Search
  USPC ............................................. 705/7.11–7.42
  See application file for complete search history.

(56) References Cited

U.S. PATENT DOCUMENTS

| | | |
|---|---|---|
| 4,044,337 A | 8/1977 | Hicks et al. |
| 4,855,190 A | 8/1989 | Bezner |
| 5,201,010 A | 4/1993 | Deaton et al. |
| 5,440,726 A | 8/1995 | Fuchs et al. |
| 5,630,047 A | 5/1997 | Wang |
| 5,761,499 A | 6/1998 | Sonderegger |
| 5,768,586 A | 6/1998 | Zweben et al. |
| 5,987,423 A | 11/1999 | Arnold et al. |
| 5,996,088 A | 11/1999 | Frank et al. |
| 6,052,679 A | 4/2000 | Aparicio, IV et al. |
| 6,053,948 A | 4/2000 | Vaidyanathan et al. |
| 6,055,573 A | 4/2000 | Gardenswartz et al. |
| 6,341,287 B1 | 1/2002 | Sziklai et al. |
| 6,374,264 B1 | 4/2002 | Bohannon et al. |
| 6,539,386 B1 | 3/2003 | Athavale et al. |
| 6,560,592 B1 | 5/2003 | Reid et al. |
| 6,567,783 B1 | 5/2003 | Notani et al. |
| 6,601,233 B1 | 7/2003 | Underwood |
| 6,678,882 B1 | 1/2004 | Hurley et al. |
| 6,698,018 B1 | 2/2004 | Zimniewicz et al. |
| 6,876,977 B1 | 4/2005 | Marks |
| 6,915,294 B1 | 7/2005 | Singh et al. |
| 6,934,687 B1 | 8/2005 | Papierniak et al. |

(Continued)

OTHER PUBLICATIONS

Ulaga, Wolfgang, et al., "Value-Based Differentiation in Business Relationships: Gaining and Sustaining Key Supplier Status", Journal of Marketing, vol. 70, Jan. 2006, pp. 119-136.*

(Continued)

*Primary Examiner* — Amber A Misiaszek
(74) *Attorney, Agent, or Firm* — Potomac Law Group, PLLC

(57) ABSTRACT

A status management framework is provided that manages status information of a system. The status management framework receives messages from fulfillment systems, where the messages include status values. The status management framework propagates the received status values within the system. The status management framework includes a status service that receives status values from task layer services, and propagates the status values throughout objects of the system.

14 Claims, 28 Drawing Sheets

(56) References Cited

U.S. PATENT DOCUMENTS

| | | |
|---|---|---|
| 7,003,476 B1 | 2/2006 | Samra et al. |
| 7,031,787 B2 | 4/2006 | Kalthoff et al. |
| 7,096,189 B1 | 8/2006 | Srinivasan |
| 7,107,340 B2 | 9/2006 | Chkodrov et al. |
| 7,139,841 B1 | 11/2006 | Somasundaram et al. |
| 7,356,482 B2 | 4/2008 | Frankland et al. |
| 7,379,903 B2 | 5/2008 | Caballero et al. |
| 7,403,904 B2 | 7/2008 | Abe et al. |
| 7,412,399 B1 | 8/2008 | Racca et al. |
| 7,441,187 B2 | 10/2008 | Meadows |
| 7,467,375 B2 | 12/2008 | Tondreau et al. |
| 7,469,219 B2 | 12/2008 | Goldberg |
| 7,472,374 B1 | 12/2008 | Dillman et al. |
| 7,546,257 B2 | 6/2009 | Hoffman et al. |
| 7,567,975 B2 | 7/2009 | Yalamanchi |
| 7,574,483 B1 | 8/2009 | Alger et al. |
| 7,590,680 B2 | 9/2009 | Fernando et al. |
| 7,627,867 B2 | 12/2009 | Banks |
| 7,657,534 B2 | 2/2010 | Kirkgaard |
| 7,664,750 B2 | 2/2010 | Frees et al. |
| 7,680,752 B1 | 3/2010 | Clune, III et al. |
| 7,680,782 B2 | 3/2010 | Chen et al. |
| 7,707,200 B2 | 4/2010 | Jain et al. |
| 7,797,598 B1 | 9/2010 | Secatch |
| 7,873,611 B2 | 1/2011 | Ebersole |
| 7,987,163 B2 | 7/2011 | Keshavarz-Nia et al. |
| 8,028,276 B1 | 9/2011 | Bessonov |
| 8,112,317 B1 | 2/2012 | Ballaro et al. |
| 8,141,125 B2 | 3/2012 | Maes |
| 8,271,609 B2 | 9/2012 | Addala et al. |
| 8,402,064 B2 | 3/2013 | Addala et al. |
| 8,458,312 B2 | 6/2013 | Raghunathan et al. |
| 8,627,271 B2 | 1/2014 | Reed et al. |
| 2002/0026339 A1 | 2/2002 | Frankland et al. |
| 2002/0042751 A1 | 4/2002 | Sarno |
| 2002/0042755 A1* | 4/2002 | Kumar .................. G06Q 10/06 705/26.4 |
| 2002/0178014 A1 | 11/2002 | Geoffrey |
| 2002/0178074 A1* | 11/2002 | Bloom .................. G06Q 10/08 705/26.81 |
| 2003/0078933 A1 | 4/2003 | Gara et al. |
| 2003/0078944 A1 | 4/2003 | Yamauchi et al. |
| 2003/0144852 A1 | 7/2003 | Eckert et al. |
| 2003/0172007 A1 | 9/2003 | Helmolt et al. |
| 2003/0182145 A1 | 9/2003 | Kalthoff et al. |
| 2004/0024784 A1 | 2/2004 | Spall et al. |
| 2004/0064351 A1 | 4/2004 | Mikurak |
| 2004/0068526 A1 | 4/2004 | Singh |
| 2004/0088196 A1 | 5/2004 | Childress et al. |
| 2004/0111336 A1 | 6/2004 | Argust et al. |
| 2004/0139176 A1 | 7/2004 | Farrell et al. |
| 2004/0181425 A1 | 9/2004 | Schwerin-Wenzel et al. |
| 2004/0181771 A1 | 9/2004 | Anonsen et al. |
| 2004/0181775 A1 | 9/2004 | Anonsen et al. |
| 2004/0215526 A1 | 10/2004 | Luo et al. |
| 2004/0236607 A1 | 11/2004 | Kost et al. |
| 2004/0243485 A1 | 12/2004 | Borenstein et al. |
| 2004/0267689 A1 | 12/2004 | Gavlak et al. |
| 2005/0027732 A1 | 2/2005 | Kalima |
| 2005/0044197 A1 | 2/2005 | Lai |
| 2005/0044530 A1 | 2/2005 | Novik |
| 2005/0075941 A1 | 4/2005 | Jetter et al. |
| 2005/0096959 A1 | 5/2005 | Kumar et al. |
| 2005/0102192 A1 | 5/2005 | Gerrits et al. |
| 2005/0113098 A1 | 5/2005 | Cankaya et al. |
| 2005/0182768 A1 | 8/2005 | Waldorf et al. |
| 2005/0216573 A1* | 9/2005 | Gutjahr .................. H04L 41/044 709/219 |
| 2005/0240756 A1 | 10/2005 | Mayer |
| 2005/0289013 A1 | 12/2005 | Goldberg |
| 2006/0026319 A1 | 2/2006 | Rothman et al. |
| 2006/0178918 A1 | 8/2006 | Mikurak |
| 2006/0224613 A1 | 10/2006 | Bermender et al. |
| 2006/0235733 A1 | 10/2006 | Marks |
| 2006/0265272 A1 | 11/2006 | Bosa et al. |
| 2006/0277024 A1 | 12/2006 | Kloppmann et al. |
| 2007/0016429 A1 | 1/2007 | Bournas et al. |
| 2007/0016608 A1 | 1/2007 | Mullins |
| 2007/0088596 A1 | 4/2007 | Berkelhamer et al. |
| 2007/0121850 A1 | 5/2007 | Klos et al. |
| 2007/0192124 A1 | 8/2007 | Anderson et al. |
| 2007/0203803 A1 | 8/2007 | Stone et al. |
| 2007/0233287 A1* | 10/2007 | Sheshagiri ................ G06F 8/20 700/83 |
| 2007/0256050 A1 | 11/2007 | Behnia et al. |
| 2007/0260575 A1 | 11/2007 | Robinson et al. |
| 2007/0288412 A1 | 12/2007 | Linehan |
| 2008/0016471 A1 | 1/2008 | Park |
| 2008/0033700 A1 | 2/2008 | Kano et al. |
| 2008/0040245 A1 | 2/2008 | Wadawadigi et al. |
| 2008/0043639 A1* | 2/2008 | Song .................. H04L 43/0817 370/254 |
| 2008/0046868 A1 | 2/2008 | Tsantilis |
| 2008/0071561 A1 | 3/2008 | Holcombe |
| 2008/0098108 A1 | 4/2008 | Yu |
| 2008/0098378 A1 | 4/2008 | Kilbane et al. |
| 2008/0127044 A1 | 5/2008 | Barros |
| 2008/0147517 A1 | 6/2008 | Martinez et al. |
| 2008/0163164 A1 | 7/2008 | Chowdhary et al. |
| 2008/0229307 A1 | 9/2008 | Maeda et al. |
| 2008/0235324 A1 | 9/2008 | Abernethy et al. |
| 2008/0256133 A1 | 10/2008 | Frankland et al. |
| 2008/0281833 A1 | 11/2008 | Cain et al. |
| 2008/0301419 A1 | 12/2008 | Barros et al. |
| 2008/0307255 A1 | 12/2008 | Chen et al. |
| 2008/0320486 A1 | 12/2008 | Bose et al. |
| 2009/0070783 A1 | 3/2009 | Schmidt et al. |
| 2009/0083632 A1 | 3/2009 | Brosh et al. |
| 2009/0089078 A1 | 4/2009 | Bursey |
| 2009/0089776 A1 | 4/2009 | Sonkin et al. |
| 2009/0150887 A1 | 6/2009 | Sanghvi et al. |
| 2009/0171819 A1 | 7/2009 | Emde et al. |
| 2009/0172689 A1 | 7/2009 | Bobak et al. |
| 2009/0192884 A1 | 7/2009 | Lo |
| 2009/0210268 A1 | 8/2009 | Fan et al. |
| 2009/0216874 A1 | 8/2009 | Thain et al. |
| 2009/0222395 A1 | 9/2009 | Light et al. |
| 2009/0228546 A1 | 9/2009 | Yendluri |
| 2009/0319685 A1 | 12/2009 | Martin |
| 2010/0070331 A1 | 3/2010 | Koegler et al. |
| 2010/0110933 A1 | 5/2010 | Wilcock et al. |
| 2010/0121740 A1 | 5/2010 | Reed et al. |
| 2010/0138017 A1 | 6/2010 | Vrba et al. |
| 2011/0055815 A1 | 3/2011 | Squillace |
| 2011/0125553 A1 | 5/2011 | Mazzoleni et al. |
| 2011/0167105 A1 | 7/2011 | Ramakrishnan et al. |
| 2011/0184969 A1 | 7/2011 | Idicula et al. |

OTHER PUBLICATIONS

Sabin, et al., "Towards more efficient solution of conditional constraint satisfaction problems", University of New Hampshire, Durham, 2003, pp. 1-138 (Year: 2003).*
Xiaoyu Zhang and Denis Gračanin, "Service-Oriented-Architecture based Framework for Multi-User Virtual Environments", Proceedings of the 2008 Winter Simulation Conference, pp. 1-9.
Oracle®, "Oracle Fusion Middleware Developer's Guide for Oracle SOA Suite", 11g Release 1 (11.1.1) Part No. E10224-01, Chapter 31, pp. 1-25, http://download.oracle.com/docs/cd/E12839_01/integration.1111/e10224/bam_data_objects.htm.
Oracle®, "Oracle Fusion Middleware Fusion Developer's Guide for Oracle Application Development Framework", 11g Release 1 (11.1.1) Part No. B31974-03, Chapter 41, pp. 1-6, http://download.oracle.comldocs/cd/E12839_01/web.1111/b31974/adv_ads.htm.
Sterling Commerce, "Sterling Distributed Order Mangement", pp. 1-2.
Oracle®, "Oracle it Service Management Suite Overview", pp. 1-3, http://www.oracle.com/technetwork/oem/grid-control/overview/twp-oracle-it-serv-mgmt-feature-ove-133400.pdf.
Oracle Data Sheet, "Oracle Order Management", Copyright 2009 Oracle; pp. 1-5.

(56) References Cited

OTHER PUBLICATIONS

Raju Addala, et al., U.S. Appl. No. 12/718,468, filed Mar. 5, 2010.
Raju Addala, et al., U.S. Appl. No. 12/718,647, filed Mar. 5, 2010.
Raju Addala, et al., U.S. Appl. No. 12/697,756, filed Feb. 1, 2010.
Raju Addala, et al., U.S. Appl. No. 12/718,501, filed Mar. 5, 2010.
Raju Addala, et al., U.S. Appl. No. 12/718,536, filed Mar. 5, 2010.
Raju Addala, et al., U.S. Appl. No. 12/718,625, filed Mar. 5, 2010.
Raju Addala, et al., U.S. Appl. No. 12/718,520, filed Mar. 5, 2010.
Raju Addala, et al., U.S. Appl. No. 12/718,475, filed Mar. 5, 2010.
Raju Addala, et al., U.S. Appl. No. 12/718,585, filed Mar. 5, 2010.
Raju Addala, et al., U.S. Appl. No. 12/718,383, filed Mar. 5, 2010.
Raju Addala, et al., U.S. Appl. No. 12/718,569, filed Mar. 5, 2010.
Gregor Hohpe and Bobby Woolf, "Enterprise Integration Patterns; Publish-Subscribe Channel", http://www.eaipatterns.com/PublishSubscribeChannel.html.
Gregor Hohpe and Bobby Woolf, "Enterprise Integration Patterns; Point-to-Point Channel", http://www.eaipatterns.com/PointToPointChannel.html.
Gregor Hohpe and Bobby Woolf, Enterprise Integration Patterns; Chapter 3, pp. 57-97, http://www.eaipatterns.com/docs/EnterpriseIntegrationPatterns_HohpeWoolf_ch03.pdf.
Gregor Hohpe, "Programming Without a Call Stack—Event-driven Architectures", pp. 1-10, http://www eaipatterns.com/docs/EDA.pdf.
"Oracle Communications Order and Service Management™ Version 6.3", Administration Guide, First Edition, Sep. 2007.
Raju Addala, et al., U.S. Appl. No. 12/945,084, filed Nov. 12, 2010.
Fred Mahakian, et al., U.S. Appl. No. 12/900,816, filed Oct. 8, 2010.
Salta Sridharan, et al., U.S. Appl. No. 13/477,591, filed May 22, 2012.
Lienhard et al, Workflow and Business Rules: a Common Approach, BPTrends, Sep. 2005, ivyTeam-SORECOGroup, Switzerland.
Bimal Mehta et al., "BizTalk Server 2000 Business Process Orchestration", Microsoft Corporation, 2001, Bulletin of the IEEE Computer Society Technical Committee on Data Engineering.
BizTalk Orchestration: A Technology for Orchestrating Business Interactions White Paper, Microsoft Corporation, Jun. 5, 2000.
ConceptWave Software Inc., "Order Management", Jul. 26, 2004.
Joan Lawson et al., "Orchestrating into End-to-End Processes", Oracle International Corporation, Mastering SOA, Part 3, Feb. 2007.
"Orchestrating Web Services: The Case for a BPEL Server", by Dave Shaffer and Brian Dayton, An Oracle White Paper, Jun. 2004, Oracle Corporation.
Stephen McIlvenna et al., "Synthesis of Orchestrators from Service Choreographies", Faculty of Science and Technology, Institute of Computer Science, University of Tartu, Estonia, 2009.
Gael Blondelle et al., "How to Choose Your Process Orchestration Technology", EBM Websourcing, Petals link, Version 1.0, Dec. 2009.
Nuno F. Rodrigues et al., "On the Discovery of Business Processes Orchestration Patterns", University of do Minho, Portugal, 2004.
CGI Group Inc., "Order Orchestration and Management with Tapestry", 2009.
Carlo Blundo et al., "Validating Orchestration of Web Services with BPEL and Aggregate Signatures", Sixth European Conference on Web Services, 2008 IEEE Computer Society.
Bidwell, Percy W., "Imports in the American Economy", Foreign Affairs (pre-1986); Oct. 1945; 24, 000001; ProQuest Central, pp. 85-98, total 14 pages.
Classified ad 4—no title (May 29, 1852. New York Daily Times (1851-1857).
Martin, Thomas, "Ancient Greece: from prehistoric to Hellenistic Times", Yale University, 1996. pp. 11-12, total 2 pages.

* cited by examiner

1400

| Task_Instance_ID | Fulfillment_Line_ID | Status_Value |
|---|---|---|
| 1 | 1 | Scheduled |
| 1 | 2 | Scheduled |
| 2 | 1 | Shipped |
| 2 | 2 | Awaiting Shipping |
| 3 | 1 | In Progress |

1410 → Task_Instance_ID
1420 → Fulfillment_Line_ID
1430 → Status_Value

*Fig. 14*

| Task_Instance_ID | Fulfillment_Line_ID | Status_Value |
|---|---|---|
| 1 | 1 | Complete |
| 1 | 2 | Complete |
| 1 | 3 | Complete |
| 1 | 4 | Complete |
| 1 | 5 | Complete |

1510 — Task_Instance_ID
1520 — Fulfillment_Line_ID
1530 — Status_Value
1500

1540:
Task Instance Identity: 1
Status: Complete

*Fig. 15*

Figure 16:
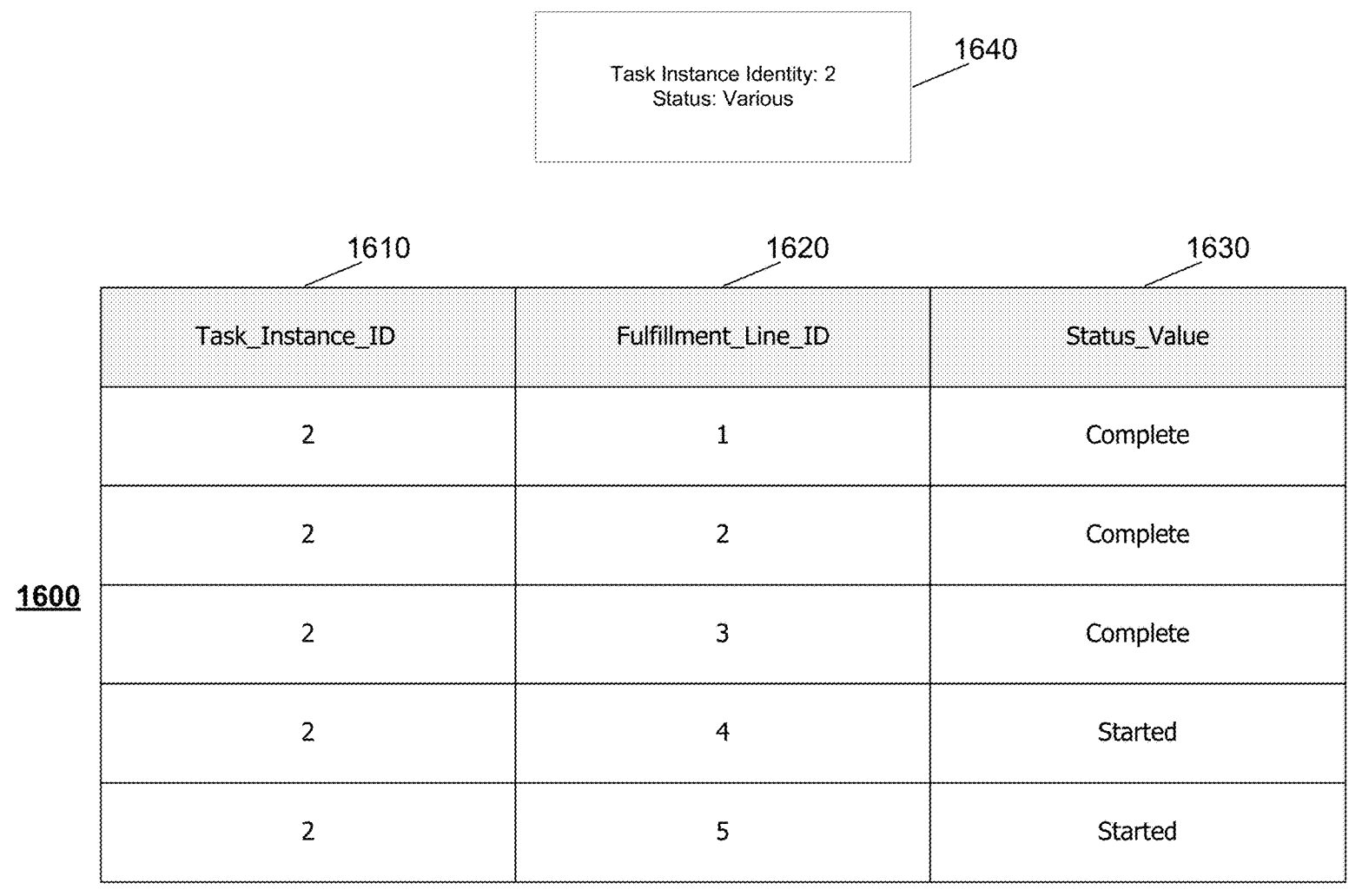

| Task_Instance_ID | Fulfillment_Line_ID | Status_Value |
|---|---|---|
| 2 | 1 | Complete |
| 2 | 2 | Complete |
| 2 | 3 | Complete |
| 2 | 4 | Started |
| 2 | 5 | Started |

1610 1620 1630

1600

1640
Task Instance Identity: 2
Status: Various

Orchestration Processes Status Conditions

| Sequence | Orchestration Process Name | Status Code | Condition |
|---|---|---|---|
| 1 | Carpets | Started | Measure = Unsourced |
| 2 | Carpets | Pre-Ship Tasks Complete | Measure = Complete |
| 3 | Carpets | Shipped | Ship Carpet = Shipped |
| 4 | Carpets | Installed | Install = Complete |

| Task_Instance_ID | Fulfillment_Line_ID | Status_Value |
|---|---|---|
| 1 | 1 | Complete |
| 2 | 1 | Complete |
| 3 | 1 | Complete |
| 4 | 1 | Complete |

2310 / 2320 / 2330

2380
Fulfillment Line Identity: 1
Status: Shipped

Fulfillment Line Status Conditions

| Sequence | Orchestration Process Name | Status Code | Condition |
|---|---|---|---|
| 1 | Carpets | Unscheduled | 2 = Not Complete |
| 2 | Carpets | Scheduled | 2 = Complete |
| 3 | Carpets | Awaiting Shipping | 4 = Not Complete |
| 4 | Carpets | Shipped | 4 = Complete |

2340 / 2350 / 2360 / 2370

STATUS MANAGEMENT FRAMEWORK IN A DISTRIBUTED ORDER ORCHESTRATION SYSTEM

FIELD

One embodiment is directed to a computer system generally, and more particularly to a computer system for managing an orchestration of business processes.

BACKGROUND

Order management systems are computer software and/or hardware systems implemented by a number of industries to facilitate order entry and processing. Companies, such as catalog companies and those utilizing electronic commerce, use order management systems to receive, process and fulfill customer orders. An order management system makes possible the entering of an order via a website shopping cart or data entry system. The system typically captures customer proprietary information and/or account level information for each order. Credit verification or payment processing may then be performed to check for available funds and validate the transaction. Valid orders are processed for warehouse fulfillment, including, picking, packing and shipping of the ordered goods or services.

Business processes are typically modeled by business architects/analysts. A business process may model message exchanges with different systems in a web services environment. The business architects/analysts then provide an information technology ("IT") designer with the model. The IT designer uses an orchestration language, such as business process execution language ("BPEL"), to code the business process. BPEL processes are typically created in a BPEL editor and a deployed BPEL process is invoked. BPEL provides orchestration logic which can be mapped to a business process. BPEL is also standard-based and provides programming paradigms such as data types, if-else statements, switch statements, loops, method invocation, variables definition, and fault handling. BPEL supports all message exchange patterns, and supports both asynchronous and synchronous service invocations. Thus, some communications with external fulfillment systems will have a synchronous response, and some communications will have an asynchronous response.

Furthermore, interacting with fulfillment systems can prove challenging in many respects. For example, each fulfillment system can have a different way of treating status. Some fulfillment systems can send explicit status values, while other fulfillment systems can send other information that may imply a status change. The lack of a uniform format for the various messages each fulfillment system can send can increase the difficulty of interacting with the fulfillment systems.

SUMMARY

One embodiment is directed to a distributed order orchestration system. The distributed order orchestration system receives a source status value from an external fulfillment system, where the source status value is associated with a task and a fulfillment line. The distributed order orchestration system further determines a task instance identity of the task associated with the source status value, and a fulfillment line identity of the fulfillment line associated with the source status value. The distributed order orchestration system further translates the source status value into a target status value based on a mapping table. The distributed order orchestration system further stores the target status value, task instance identity, and fulfillment line identity in an intersection table. The distributed order orchestration system further determines a status value of an object within the distributed order orchestration system based one or more target status values stored within the intersection table.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 14 illustrates an intersection table according to one embodiment.

FIG. 15 illustrates an intersection table that includes task/fulfillment line status values, and a task status value according to one embodiment.

FIG. 16 illustrates an intersection table that includes task/fulfillment line status values, and a task status value according to another embodiment.

FIG. 17 illustrates a user interface for defining a list of task types and defining a list of possible status values for each task type according to one embodiment.

FIG. 23 illustrates an intersection table that includes task/fulfillment line status values, and a plurality of fulfillment line status conditions that are used to determine a fulfillment line status value according to one embodiment.

DETAILED DESCRIPTION

One embodiment is directed to a status management framework of a distributed order orchestration system. According to the embodiment, the status management framework determines how status information received from the multiple fulfillment systems is propagated and displayed within the distributed order orchestration system. Furthermore, the status management framework can allow customers to customize how the distributed order orchestration system propagates and displays the status information received from the multiple fulfillment systems.

Distributed Order Orchestration Framework

One embodiment is directed to a distributed order orchestration system ("DOO"). Distributed order orchestration provides a flexible, configurable infrastructure that can be easily customized to be consistent with an enterprise's business practices and existing order fulfillment system architecture. Decomposition is the conversion of data received from one or more order capture modules into an internal canonical format in order to process the data. In one example embodiment, the distributed order orchestration system includes a capture layer for capturing customer orders across multiple channels, a decomposition layer to help determine the orchestration process, an orchestration layer for executing and orchestrating order line processing, a task layer services layer for performing task related logic, an external interface layer for interfacing with external systems, a fulfillment layer, and a global order promising layer to provide a user interface for scheduling and sourcing. The distributed order orchestration system may further include a fulfillment workbench layer that interfaces with the other layers of the system and manages sources, tasks and assignments. The various layers of the distributed order orchestration system described above combine to provide a complete order management solution at reduced implementation and maintenance costs. However, in an alternative embodiment, the capture layer is not part of the distributed order orchestration system. In this alternative embodiment, an order capture layer is part of a separate system, and a connector service is utilized as a bridge between the distributed order orchestration system and the capture layer.

Figure 1:
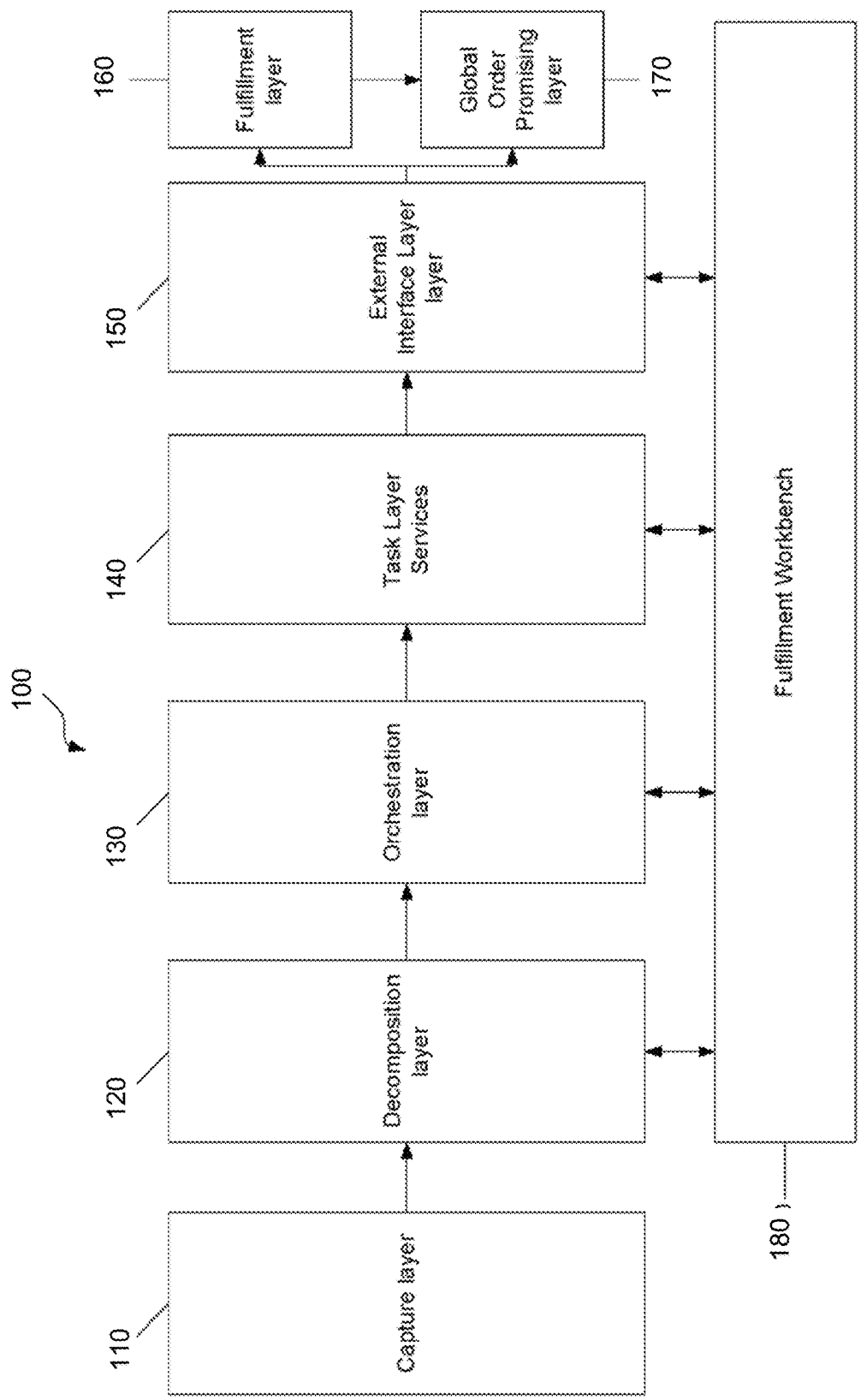
FIG. 1 illustrates an example of a distributed order orchestration system according to one embodiment.

FIG. 1 illustrates an example of a distributed order orchestration system 100 according to one embodiment. In the embodiment, distributed order orchestration system 100 includes a capture layer 110 that can receive and capture information related to customer orders for goods and/or services across multiple channels. The order may be received via a graphical user interface, such as that of a website shopping cart, or can be received via any data entry system. The capture layer 110 captures and forwards the order information to a decomposition layer 120. However, in an alternative embodiment, the capture layer 110 is separate from distributed order orchestration system 100. In this alternative embodiment, a connector service is utilized as a bridge between distributed order orchestration system 100 and capture layer 110.

Order capture systems capture the order with any necessary functional attributes that are needed to process the order, such as pricing, validation, eligibility, etc. The sales order is fed to decomposition layer 120 in a Source Order object. The source order object is generated from a sales order object submitted by different capture systems. The source order object is in a generic format that is fed into the decomposition layer 120.

Decomposition layer 120 receives the order information and breaks the received order into individual purchase orders to be sent to fulfillment systems and supply-side partners for execution. Decomposition layer 120 may include a decomposition rules workbench for setting up rules, rule sets, and transformation processes for the order capture layer 110 may capture the order from a sales perspective. For example, a laptop computer may be sold worldwide. The laptop includes a power cord, but the customer just buys a laptop (one line on the order). That is, a sales website may want to just sell the laptop and not have the customer individually order the power cord separately. However, from a fulfillment perspective, the laptop and the power cord need to be retrieved for the order. In decomposition layer 120, there may be a business rule that says that a laptop must have a power cord and the plug on the power cord must match the country to which the laptop is shipped. So when decomposition layer 120 is complete, the order has two lines, one with the laptop and one for the appropriate power cord. Thus, the order has been decomposed into multiple items that need to be fulfilled.

Also, decomposition layer 120 may take the received order and translate it to the order format and order content required by the other layers of the distributed order orchestration system 100, such as the fulfillment layer 160. Because capture layer 110 is capable of receiving orders in any format for compatibility purposes across different types of systems, decomposition layer 120 may need to translate the order into a format that is compatible with and can be recognized by all the other layers and/or processes of the distributed order orchestration system 100. Additionally, decomposition layer 120 may provide a process launch capability to assign and launch orchestration processes for an order based on appropriate decomposition rules. For example, different orchestration processes are assigned based on parameters in the order. For example, a company may give special treatment to certain customers in terms of speed of fulfillment or shipping. For example, Gold customers may be offered expedited shipping. Also, there may be an additional step for communication with the customer. When the orders for these customers are received, they are assigned to the orchestration process that has these parameters and steps while orders for other customers may be assigned to standard processes.

Decomposition may use a canonical object model to accomplish the decoupling of data format from order capture systems. Decomposition integration processes work on a set of generic data structures called Enterprise Business Objects ("EBO's"). They are based on the canonical data model. This approach allows the DOO to be agnostic of participating applications and be independent of source or target applications. The model eliminates the need to map data from different applications directly to each other.

Distributed order orchestration system 100, as illustrated in FIG. 1, further includes an orchestration layer 130. Orchestration layer 130 provides individual orchestration processes to manage order and/or service line items. For example, orchestration layer 130 may provide business process management functionality to support planning of steps within a process, including step duration and calculation or recalculation of completion dates. Orchestration layer 130 may also provide external task execution functionality to support creation, update, release, and monitoring of external tasks. External tasks are those that are carried out by the fulfillment systems. Task layer services do specific processing and then send the data to these integrated fulfillment systems. Orchestration is a sequence of task layer service invocations.

Orchestration layer 130 may also provide for jeopardy management in order to check a promised delivery date of an order against current estimated date for completion, map to user defined thresholds, and handle or escalate conditions. Orchestration layer 130 may further provide a process for change orders, including a support process rollback to accommodate for change order automation and modify in-flight orchestration processes for orders changed in order capture stage. Further, a projected order completion date may be provided by instantiating the orchestration process. Orchestration layer 130 also provides a mechanism for updating an order status automatically or upon user request.

One embodiment provides a tool that provides a high degree of abstraction for business process modeling in an order fulfillment business process. Business processes may be modeled by users, such as business analysts, and do not need any coding from an IT designer to have the business process executed. Users are provided the flexibility to define business processes in a central place configured to enter and capture all information required for orchestration and fulfilling an order. An example of such a central place can be a web-based administration user interface. Likewise, an example of all information required for orchestration and order fulfillment may be information required for process planning, core orchestration, and change management. The business process may identify one or more services that define steps to be performed in the order fulfillment process. A run-time engine then uses the definition to dynamically invoke the services based on the definition of the business process.

In the business environment, business users are often process modelers, not IT personnel. By providing a web-based administration environment, the business users may be able to design the business process. The process definitions may be defined in business terms and not in IT terms. Particular embodiments allow an administrative environment outside of a code editor, such as a BPEL editor, for defining processes using associated services. Users can configure processes that can be executed at runtime as executable processes without IT involvement. This alleviates the need for deploying the processes every time a modification of the business process is needed. The user sets up the sequence of services on a data table. The modeled business process is then used to perform an executable process (also identified as an orchestration process), which is assembled and executed at run-time. In one embodiment, "runtime" can be defined as the time when an order is received for processing. Metadata is assembled in a data runtime table and used to define the executable process for the business process. The metadata is used to invoke services in the executable process.

In one embodiment, the services invoked are encapsulated and reusable. The metadata is used to determine how and when to invoke services. Also, depending on the metadata, input arguments are generated and sent to the services to invoke the encapsulated service. A common signature is used to send data to invoke the services. Different input arguments can be formulated for different services used in different executable processes. The input arguments are formatted in the same way such that a service can read the different sets of data and invoke the service. Thus, services can be re-used in different business processes without the need to be recoded and redeployed. Deployment of services indicates the process is ready to be released for testing or production.

Distributed order orchestration system 100 may further include a task layer services 140 to provide encapsulated services used to control processing logic for each orchestration process stage. In particular, task layer services 140 may provide task-specific business logic to wrap logic around a certain request such that the system 100 knows what logical tasks are associated with a particular request. The steps that need to be performed in the executable process from orchestration may require tasks to be performed. For example, task layer services 140 can provide and control processing logic for scheduling a shipment, requesting a shipment, updating an install base, creating an activity, etc. The output of task layer services 140 is a standard goods and/or service request(s) which may be provided to other layers of the system 100, such as external interface layer 150 or fulfillment layer 160. In addition, task layer services 140 may receive input that can be used to update the processing logic or status.

Task layer services 140 initiates the task, generates a message for an external system, and sends the message. The data structure that is needed to have the task performed is generated. Certain tasks may be predefined in task layer services. Also, a customer may add other tasks using a template that defines how to create a task. The message generated indicates which task should be performed by the external system. The task to be performed is an aspect of order processing that has been modeled. For example, the task may be invoicing for an order. Parameters for performing the task are also included. The message is sent to an external interface of external interface layer 150. Task layer services 140 transforms and sends the message to the external system layer.

Distributed order orchestration system 100 also includes an external interface layer 150 to translate standard request(s) and route the request(s) to external systems for processing. More specifically, external interface layer 150 may receive the standard goods and/or services request(s) output by the task layer services 140 and provide a single layer transform of the request(s) if needed to match the format of fulfillment systems. The transformation performed by external interface layer 150 maps the data to the content and format required by the integrated fulfillment systems. Transformation by decomposition layer 120 converts the data to the internal format used by system 100. External interface layer 150 may map the data structure from task layer services 140 to the external format. External interface layer 150 provides flexible routing so that request(s) are routed to specific fulfillment systems based on business rules. For example, if more than one shipping system is available for fulfillment, business rules will determine to which shipping system an individual shipping request will be sent. External interface layer 150 may also include a transformation rules workbench that can be utilized to setup rules, rule sets, and transformation data for external routing of request(s).

The messages generated by the task layer may be in a generic format. Different external systems, however, may communicate using other formats. The external interface layer determines the format used by an external system and transforms the message. For example, metadata defined by a user may be used to determine the format to be used. In one example, mappings to what external systems call a product that was ordered are used to translate the message.

The external systems may be systems that perform the task related to processing an order, such as a scheduling system, shipping system, etc. When the task is performed, the result of the task is determined. The result may be a date when a shipment is scheduled, a date when a good is shipped, etc. The result is then sent back to external interface layer 150.

Distributed order orchestration system 100 may further include a global order promising layer 170 that provides an interface, such as a graphical user interface, for scheduling and sourcing orders. In particular, in one embodiment, global order promising layer 170 includes a sourcing broker that determines the best source for products and services associated with the order based upon a customer profile, order and supplier definitions, etc. Also, global order promising layer 170 provides for real-time reserve and un-reserve of inventory and inventory check across distributed internal systems. The interface of global order promising layer 170 allows for the viewing of availability and sourcing information so that a user can view the availability of and manually change the source from which an order for a good or service is being fulfilled. However, in an alternative embodiment, the global order promising layer 170 is separate from distributed order orchestration system 100. In this alternative embodiment, a connector service is utilized as a bridge between distributed order orchestration system 100 and global order promising layer 170.

A fulfillment workbench 180 may also be provided as a user interface for order fulfillment administrators, users and supervisors to monitor and manage the flow of orders through the system 100. In an embodiment, fulfillment workbench 180 provides users, such as supervisors, with a mechanism to monitor order fulfillment tasks, including allowing supervisors to monitor activity load and to produce reports. Fulfillment workbench 180 further provides a fulfillment process analysis that allows business process designers to analyze process metrics such as the number of manual interventions, the number and type of errors that occurred, the number of late orders, and the expected process duration versus the actual duration. In certain embodiments, a fulfillment system performance analysis capability is also included within the fulfillment workbench 180 to provide reports and dashboards to enable order managers to view orders for each system and analyze performance. The fulfillment workbench may make use of graphical representations (e.g., graphs and charts) to clearly convey system status/order information to users. Because DOO system 100 has the data reference data, it is possible to draw aggregated graphs/charts for trending analysis. Users may take actions from the fulfillment workbench as described below, such as by substituting the item ordered, splitting the quantity into multiple order lines, putting a hold on the order lines to prevent further progression, etc.

According to one embodiment, fulfillment workbench 180 allows users to make mass order information changes related to fulfillment including making single line or mass line changes to fulfillment information (e.g., dates, etc.). Fulfillment workbench 180 may further allow for the monitoring of orchestration processes, such as reviewing the status of orchestration processes including overall process progress, as well as status of individual tasks and corresponding fulfillment lines and people lines. Fulfillment workbench 180, in one embodiment, includes mechanisms for maintaining order fulfillment processing and allows an order processing user to control a process associated with an order including pause, edit, cancel, etc.

In some embodiments, fulfillment workbench 180 also provides functionality for order and task assignment. For example, fulfillment workbench 180 may use an assignment engine to assign orders and activities to the appropriate fulfillment resource. Fulfillment workbench 180 may include a mechanism for batch re-assignment of orders thereby allowing a supervisor to re-source a set of orders from one fulfillment system to another. Fulfillment workbench 180 also provides for the assignment of fill rate and backorder rules that can automatically determine how to handle shortage situations. A universal in-box may be included within fulfillment workbench 180 in order to allow users to view activities assigned to them and respond to the task.

Fulfillment workbench 180 allows a user to view orders being processed in different layers of system 100. A view of the status of an order may be generated from whichever layers have processed the order. This is because an end to end integrated system has been provided. Conventional order systems may have been customized solutions that did not allow for a view of different layers. By integrating layers in a format that allows generic communication, a user interface that can generate views from all the layers can be provided.

Examples of distributed order orchestration system 100 may also include a fulfillment layer 160. In one embodiment, fulfillment layer 160 may be an interface to external fulfillment systems, and can be used to communicate order information and fulfillment requirements to a supplier or source of the goods and/or services associated with an order.

Certain embodiments of distributed order orchestration system 100 include an administration user interface. The administration user interface provides administration services that hide the complexity of the fulfillment execution environment from the end user. For instance, the administration user interface provide product mapping via an administration environment that defines transformations to map product structure between a sales view and a supplier system definition. In this embodiment, sales view refers to a simplified view provided to consumers when making a purchase order. Supplier system definition refers to the more specific and detailed information used by suppliers of goods and/or services. The administration user interface may also provide an orchestration process workbench to set up processes, rule sets, and parameters for order orchestration. The administration user interface has an integrated setup that includes process sequence, planning, jeopardy, change management, and workbench display. The administration user interface also allows for user-defined status transitions for tasks, processes, and fulfillment lines, and business rules configuration for configuring constraints, transformation rules, and routing rules.

Figure 2:
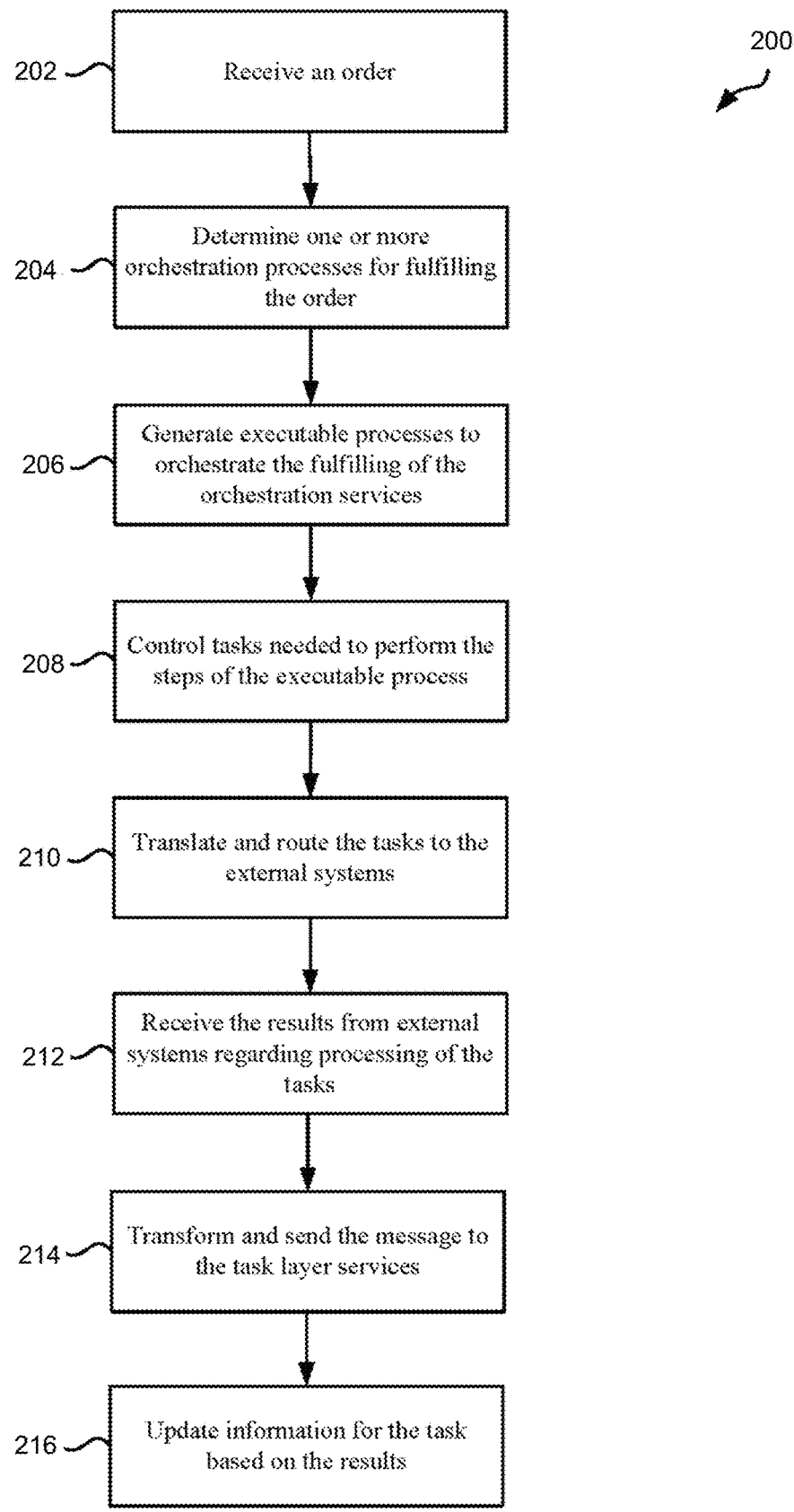
FIG. 2 illustrates a flowchart for processing an order according to one embodiment.

FIG. 2 depicts a simplified flowchart 200 for processing an order according to one embodiment. In step 202, decomposition layer 120 receives an order. In step 204, decomposition layer 120 determines one or more orchestration processes for fulfilling the order. For example, the order may be decomposed into items that need to be procured or services that need to be performed. Each item or service may have its own orchestration service.

In step 206, orchestration layer 130 generates executable processes to orchestrate the fulfilling of the orchestration services. The executable processes may have multiple steps that need to be performed for each orchestration service.

In step 208, task layer services 140 controls business functions needed to perform the steps of the executable process. Tasks to be performed for the executable process may include setting up a data structure with information and parameters that are needed to have external systems perform the tasks. The data structure may be in an internal format for system 100. For example, the task may be invoicing for an order. Parameters for performing the task are also included.

In step 210, external interface layer translates and routes the tasks to the external systems. Different external systems, however, may communicate using other formats. The external interface layer determines the format used by an external system and transforms the message. For example, metadata defined by a user may be used to determine the format to be used. In one example, mappings to what external systems call a product that was ordered are used to translate the message.

In step 212, external interface layer 150 receives the results from external systems regarding processing of the tasks. When the task is performed, the result of the task is determined. The result may be a date when a shipment is scheduled, a date when a good is shipped, etc.

In step 214, external interface layer 150 transforms and sends the message to the task layer services 140. In step 216, orchestration layer 130 updates information for the task based on the results. For example, the results may be stored in a table or database. The process then continues to the next service that can be invoked.

Further implementation details of orchestration are now described in relation to FIGS. 3-8, and in accordance with an embodiment of orchestration that utilizes a flow sequencer. However, one of ordinary skill in the art will readily appreciate that further details are merely an example of orchestration, and that orchestration may be implemented in many different embodiments, including alternative embodiments that do not utilize a flow sequencer. For example, orchestration may be implemented according to the details described in U.S. patent application Ser. No. 12/697,756, entitled "ORCHESTRATION OF BUSINESS PROCESSES USING TEMPLATES."

Figure 3:
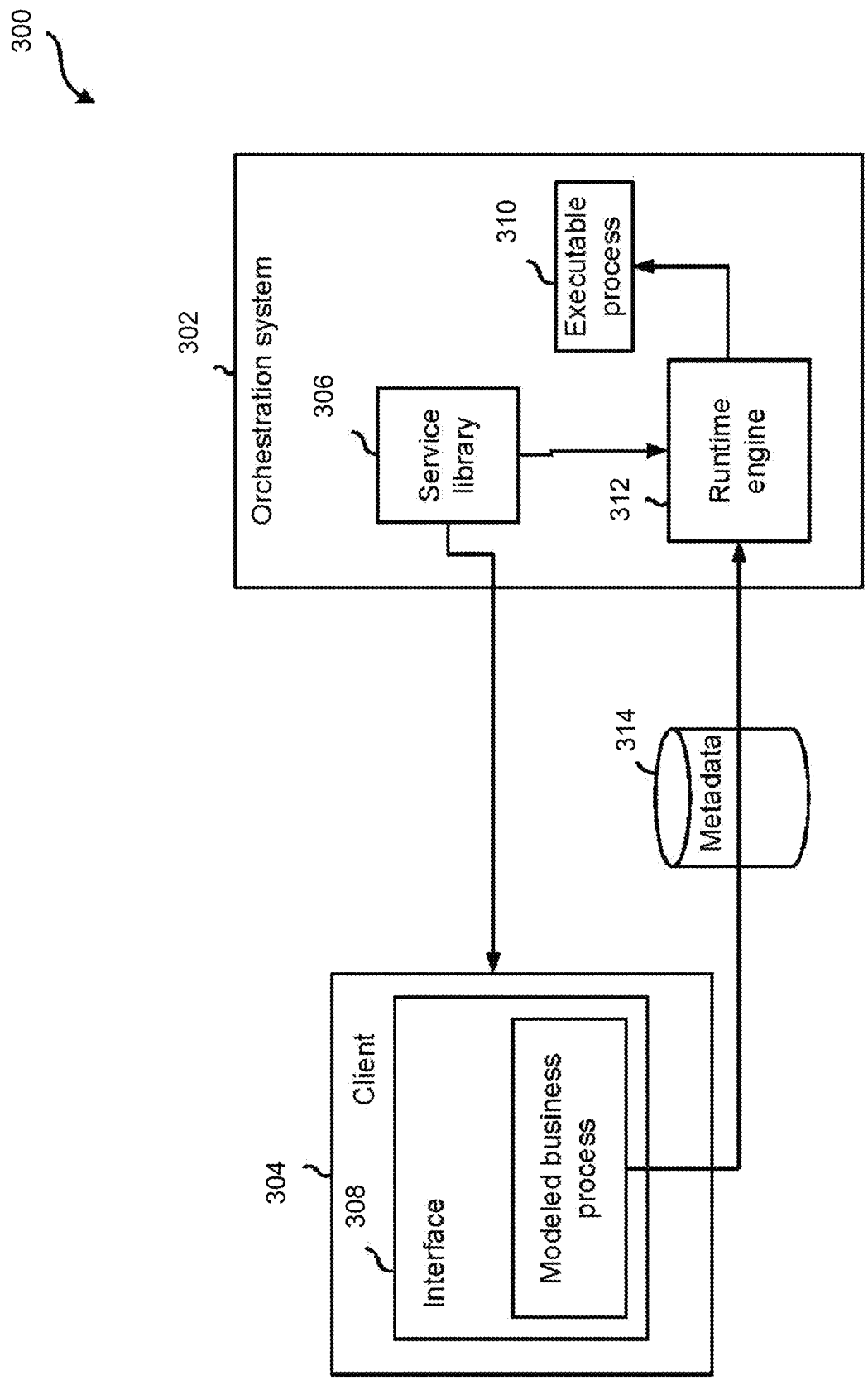
FIG. 3 illustrates an example of a system for providing an orchestration process design and authoring environment in a context of order fulfillment according to one embodiment.

FIG. 3 illustrates a system 300 for providing an orchestration process design and authoring environment in a context of order fulfillment according to one embodiment. In the embodiment, system 300 includes an orchestration system 302 and a client 304. Although single instances of orchestration system 302 and client 304 are provided, it will be understood that multiple instances may be used. Also, orchestration system 302 and client 304 may be part of a distributed computing system. That is, functions described may be distributed among various computing devices.

Client 304 may be a computing device or set of computing devices that are configured to allow a business process to be modeled. Orchestration system 302 orchestrates the invocation and running of services for an executable process 310 for the business process. Orchestration, as described, is the coordination and invoking of services that need to be performed in the business process.

As used, a business process may be modeled by a user. The business process is a definition of steps to be performed. The steps are defined in interface 308. An executable process is the process that is executed by run-time engine 312. The executable process includes code that is executed to coordinate performing of services.

A service library 306 that includes multiple services that can be included in a business process. In one embodiment, a service library 306 includes services that can be performed in an order fulfillment business process. Order fulfillment involves processes that are performed to fulfill an order. For example, an order may be received from an order capture module. The order may be for a good, service, etc. Different services may be performed to fulfill the order, such as shipment, installation, invoicing, etc. The order fulfillment process may be characterized in these different services. It is expected for any given order, some or all of these processes may need to be performed to fulfill the order. Accordingly, particular embodiments create services for the services that are expected to be performed in an order fulfillment process.

Services may be non-configurable units and configurable units. Nonconfigurable units are services that are built and provided to customers. The nonconfigurable units are units that likely may be used in an order fulfillment process. For example, it is expected that different services may have to be performed in the order fulfillment process, such as account receivable. Accordingly, these services may be modeled using a language, such as BPEL. Although BPEL is described, one of ordinary skill in the art would readily understand that other languages may be used.

Configurable units are services that are built and defined by a customer. For example, a wrapper is provided around a service that is configured by a user. For example, a customer may want a shipping service that is specific to the customer's company. Accordingly, the service performed by the configurable unit may be defined and built by a customer, but the wrapper allows runtime engine 312 to invoke the service automatically. This allows customers to define services that are needed for their individual organizations.

The services may be re-used in different business processes. The services are encapsulated and configured to receive a common signature for the service to be performed. For example, for each business process, different parameters may be provided (i.e., different products may be ordered for different prices, etc.). This causes different input arguments to be inputted into the service. The common signature defines a data structure that allows the service to be re-used for different executable processes 310. Thus, the same deployed service is used to process different input arguments for the different orders, but different results may be obtained. In this way, the order fulfillment process can be abstracted. Different users can define which services need to be performed without regard to how the processes are coded in an orchestration language.

Interface 308 may be an administration user interface. For example, a graphical user interface allows a user to model a business process at an abstract level. For example, service library 306 may be provided to client 304. The user may then use interface 308 to define steps of the business process using services in service library 306. A user may define a plurality of steps in the business process. Each step may be associated with a service in service library 306. The steps may be stored in a data table, which may include metadata that may be used by runtime engine 312 to orchestrate executable process 310. The data table is shown as being stored in storage 314. It will be understood that the data table may be stored in any area, such as in client 304, orchestration system 302, or any other device. The metadata may be defined by the user, determined from data tables, and/or orchestration rules. The user defines the sequence in which the services are to be invoked as well as conditional or parallel branching that may be required to affect the business processing rules. When the user selects a service for a process step, the user also provides additional metadata that is used to determine how the processing data is to be executed during the processing of an order at runtime. For example, conditional or parallel branching is defined.

At runtime, runtime engine 312 receives the metadata and uses it to determine parameters for the orchestration of executable process 310. Runtime engine 312 uses the parameters to determine which steps to perform and when to perform them in executable process 310. For example, runtime engine 312 orchestrates executable process 310 by invoking services in the series of steps that have been defined by the user. As will be described in more detail below, parallel and conditional processing of steps can also be performed. Also, the metadata can be used to determine the input arguments used to invoke the services.

The metadata for the table is read at runtime and services are invoked, which allows changes to executable process 310 to be performed and realized at runtime automatically. Runtime engine 312 reads through each step that is defined and performs the steps. If a change in service is desired, the user may use interface 308 to add/delete/replace a service. At run-time, when the table is read, the change may be automatically performed.

Figure 4:
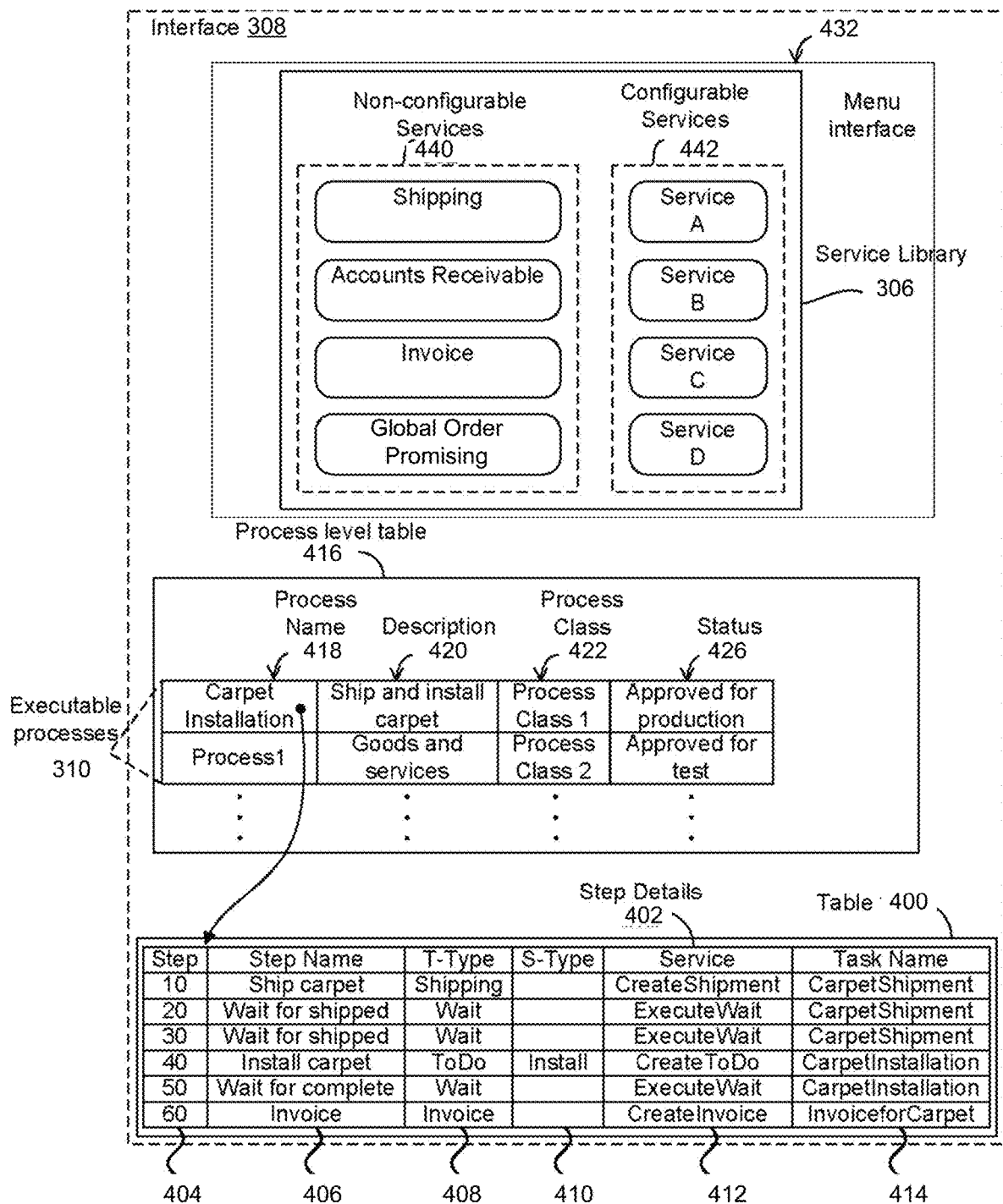
FIG. 4 illustrates an example of an interface according to one embodiment.

FIG. 4 illustrates an example of an interface 308 according to one embodiment. Process level table 416 summarizes different business processes that have been modeled. As shown, the business processes—Carpet Installation and Process 1—have been modeled by a user.

In process level table 416, a process name column 418 shows business processes carpet installation business process and process 1 have been modeled. A description column 420 describes the process. A process class column 422 describes the class of the process. A status column 426 is the status of the executable process. There may be different statuses of executable processes 310. For example, some business processes may be approved for production, approved for test, or may be new. Approved for production means that the service is approved for regular business use, approved for test is approved for testing, and new is a service in development.

A business process in table 416 can be selected and data table 400 may show the step details for individual business processes. One business process is entitled Carpet Installation and a data table 400 of step details shows each service that has been defined for the Carpet Installation.

In data table 400, a step column 404 identifies the steps in the business process. For example, steps 10-60 are provided. Services for these steps may be performed at runtime. The steps may be run in sequence from top to bottom (or in any other order). In this case, a step 10 is performed and when finished, a step 20 is performed, and so on. Additionally, although not shown, conditional and parallel steps may also be defined using interface 308. Conditional steps are steps that depend on a result occurring (e.g., another step finishing) and parallel steps are performed in parallel. A user defines whether steps should be conditional or parallel.

Step name column 406 provides a descriptive name for the steps. For example, ship carpet, wait for shipped, install carpet, wait for complete, and invoice steps are provided.

A task type column 408 describes what type of task is being performed. For example, for the ship carpet task, an external system may perform a shipping task and for the invoice step, an invoice system may invoice for a bill.

A service column 412 identifies the service associated with the step. A task name column 414 is the name of the task. For example, those tasks have to do with carpet and are named carpet shipment, carpet installation, and invoice for carpet. If something other than a carpet is being installed, the task name will be different. For example, a sink shipment, sink installation, and invoice for sink may be the names of these tasks.

Users may use interface 308 to generate data table 400. A user may select services from a menu for service library 306. For example, a user uses a menu interface 432 to select services from service library 306. Drop-down menus, drag-and-drop options, and other visual processes may be used to define executable process 310. Users are provided with an orchestration-specific interface that presents the business process data with suitable validations, rather than being required to learn the complexities of a multipurpose IT development environment. This allows a user to model a business process in an abstract manner, but have executable process 310 be generated and executed from the model.

The services in service library 306 may be made up of non-configurable units and configurable units. For example, non-configurable units are provided in a column 440 and configurable units are provided in a column 442. As shown, services that are non-configurable include shipping, accounts receivable ("AR"), invoice, and global order promising ("GOP"). Also, configurable units are designated as A, B, C, and D. Table 400 is generated as shown in interface 308 using menu 412. Table 400 is associated with metadata that describes the services to be performed and any arguments that are needed to invoke the services.

Figure 5:
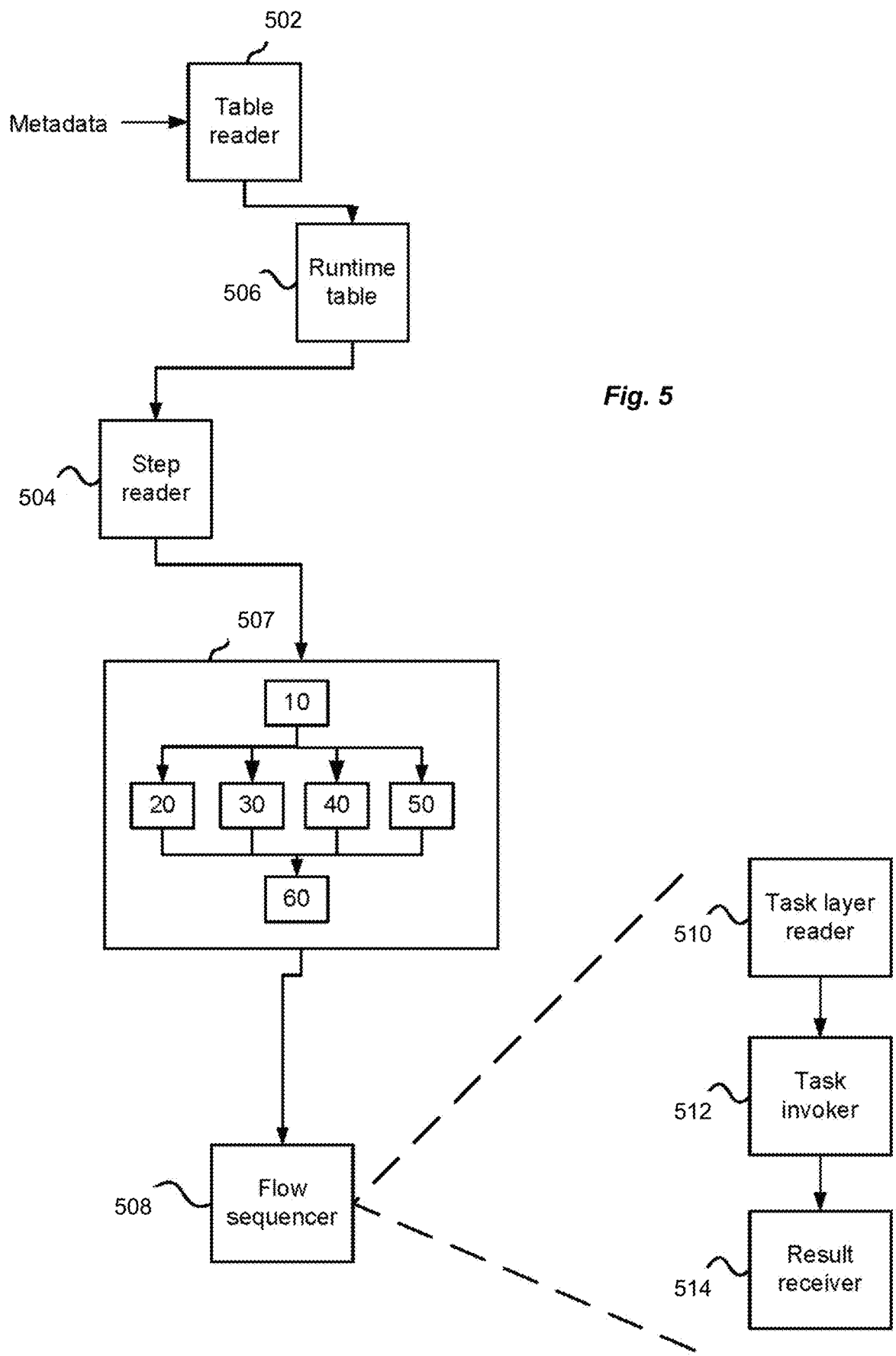
FIG. 5 illustrates the runtime operation according to one embodiment.

Once the business process is modeled in interface 308 and released by setting the process status, runtime engine 312 is used to orchestrate the invocation of the services. FIG. 5 illustrates the runtime operation according to one embodiment. In the embodiment, a table reader 502 receives metadata from interface 308 defining the business process. Table reader 502 may copy the data to a runtime table 506 but this is not necessary.

During run-time, a step reader 504 is configured to read the steps in runtime table 506, according to the embodiment. Step reader 504 may analyze the metadata and determine which steps should be executed and when. For example, step reader 504 checks to see if parallel or conditional branching is associated with a step. The metadata is also used to determine input arguments for the services. The input arguments may be determined from the metadata, from data in lookup tables, or determined using rules.

Step reader 504 may assemble executable process 310 using encapsulated services from service 306 and the metadata, according to the embodiment. For example, code for each service that was modeled in the steps is determined for executable process 310. The input arguments for each service are also determined. For example, the metadata is used to determine the input arguments such that the services can process an order for the business process. Also, any partner links are determined using the metadata to allow the services to interact with external systems. Executable process 310 is assembled based on the definition of steps in the business process. Because services are reusable, the same code for a service can be used for different business processes. However, the input arguments or partner links may be different. Because the same code is re-used, automatic assembly of executable process 310 is provided.

In the embodiment, a flow sequencer 508 is used to dynamically invoke the steps at the appropriate time based on executable process 310. As shown in box 507, a step 10 may determine a service to invoke. One of steps 20, 30, 40, and 50 are then performed. Step 60 then determines if other steps need to be performed. In this case, one of the other steps in 20, 30, 40, and 50 could be performed. Flow sequencer 508 may determine relevant input arguments depending on the content of the metadata received. These input arguments are then used to invoke a service. For example, flow sequencer 508 may include a task layer reader 510 that determines a service to invoke. A task invoker 512 then dynamically invokes the service. Any input arguments are used to invoke the service. In invoking the service, code for the encapsulated service is executed to coordinate performing of the service. For example, the executed code may prepare and send a message to an external system to perform the service.

The service may then be performed and the result is received at result receiver 514. In one example, if the task is shipping, then a shipping service generates a message for a shipping system regarding the shipping of a good. Once the shipping system ships the good, a message is returned to the shipping service, which stores the result.

After receiving a result, it is then checked whether further sequences need to be performed. For example, a while activity module checks to see whether further services need to be processed. For example, the process may be returned to flow sequencer 508 to allow for dynamic invocation of other steps in the process. Also, the while activity module may wait until parallel branches are completed.

Accordingly, the information required to invoke the services is determined automatically based on the runtime table. In one example, in BPEL, necessary partner links for all invocations have been created and are used to invoke the services. The services represented in the BPEL partner links are deployed BPEL processes that require no further configuration in order to be used in multiple business process definitions. When a service is invoked by the runtime engine, the corresponding partner link is accessed in the underlying BPEL process. Assembly of a service and modification of any service take place through the use of the metadata found in the runtime table and may be managed through interface 308.

Accordingly, a user can set up the steps in a business process. Executable process 310 can be automatically assembled at run-time. The code used in executable process 310 is not generated by the user who set up the business process. Rather, metadata can be defined and is used to assemble encapsulated services for executable process 310.

Figure 6:
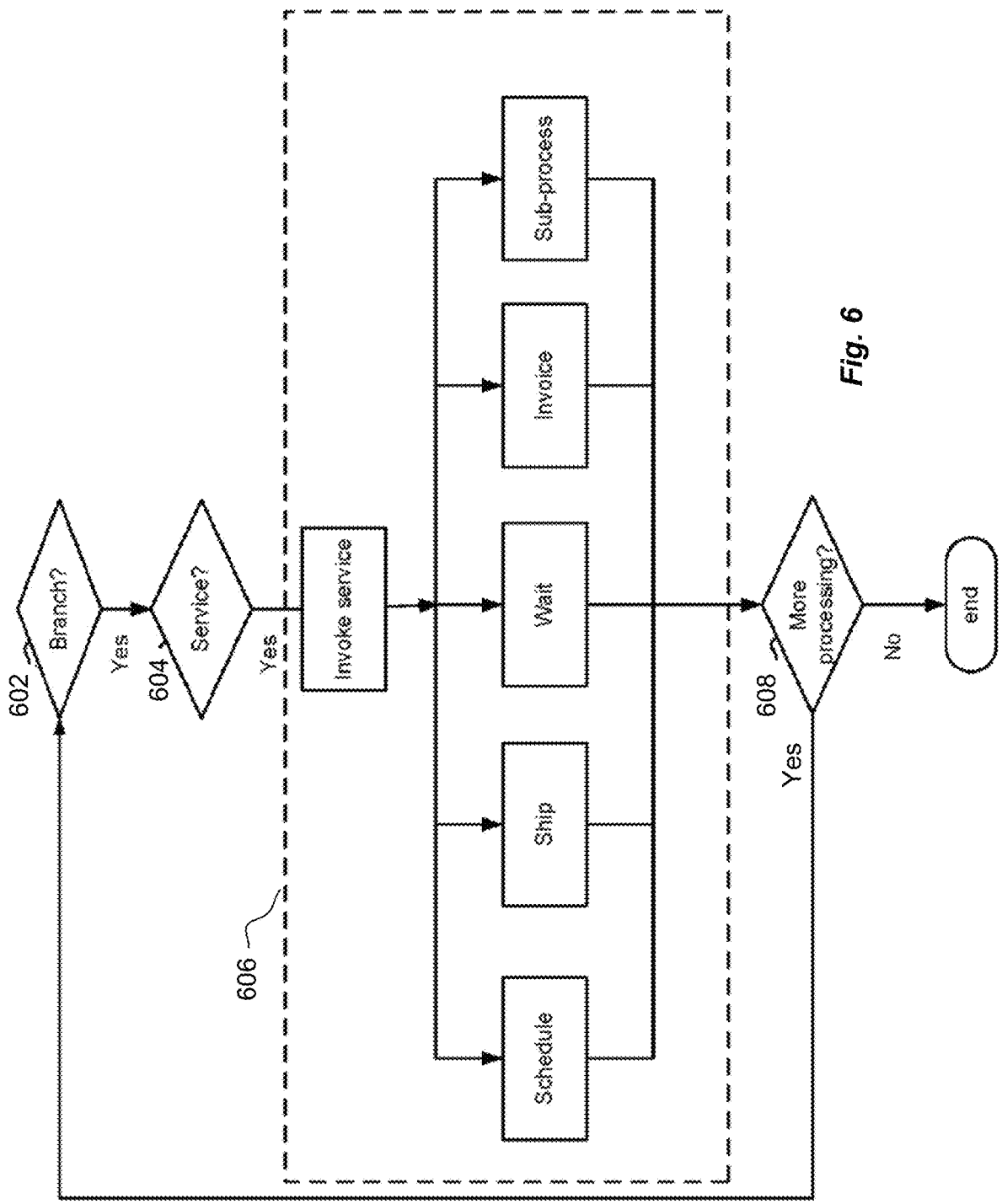
FIG. 6 illustrates an example of invocation of services using a flow sequencer according to one embodiment.

FIG. 6 illustrates an example of invocation of services using flow sequencer 508 according to one embodiment. At step 602, according to the embodiment, it is determined if branching is needed. If a conditional statement is encountered, the process proceeds down the appropriate branch based on which condition is satisfied. If parallel branching is encountered, parallel flow sequence instances are spawned to carry out the additional branches. The branching is determined and used later in invoking services. The process then proceeds to step 604 in which a service is determined.

Various services may then be performed. The steps include an invoke service step, schedule step, ship step, wait step, invoice step, and sub-process step. Identical processing sequences can flow in parallel until a unifying step is reached. Each flow sequence contains the same underlying coded process (such as a BPEL process), but different processing sequences can be used in different executable processes 310. That is, one sequence may contain Schedule, Ship, Invoice while another may contain Schedule, Activity, Ship, Activity, Invoice, although the runtime engine including the underlying coded processes do not change. That is, the code for each service that is invoked stays the same even though different executable processes are being run.

An external service invocation is contained in each branch of the flow sequencer, one branch for each service that can be invoked. The branch contains all the steps necessary to set up the data that should be included in the message to the specific external service and to format the response received from the service. Once a service is complete, the while activity module checks to see if there are further services to process and either returns to flow sequencer 508, continues to the next step in the process or waits until any parallel branches are complete.

Box 606 shows a conceptual execution of executable process 310. Not all steps may be run at once. For example, the invoke service is invoked for step 10 and determines a service to invoke. Once that is completed, step 608 determines if other steps need to be performed. In this case, step 604 determines the Schedule, Ship, Wait, Invoice, and subprocesses services should be performed. Once all the flows have been completed, a uniform set of results can be constructed. Based on the definition of the executable process, it is determined if additional processing should be performed. Different branches are performed where each branch invokes the associated service. Input arguments for the service are generated from the metadata in the runtime table. When the selected service has been performed, step 608 determines if additional services should be performed. If so, the process reiterates to step 602. If not, the process ends.

Figure 7:
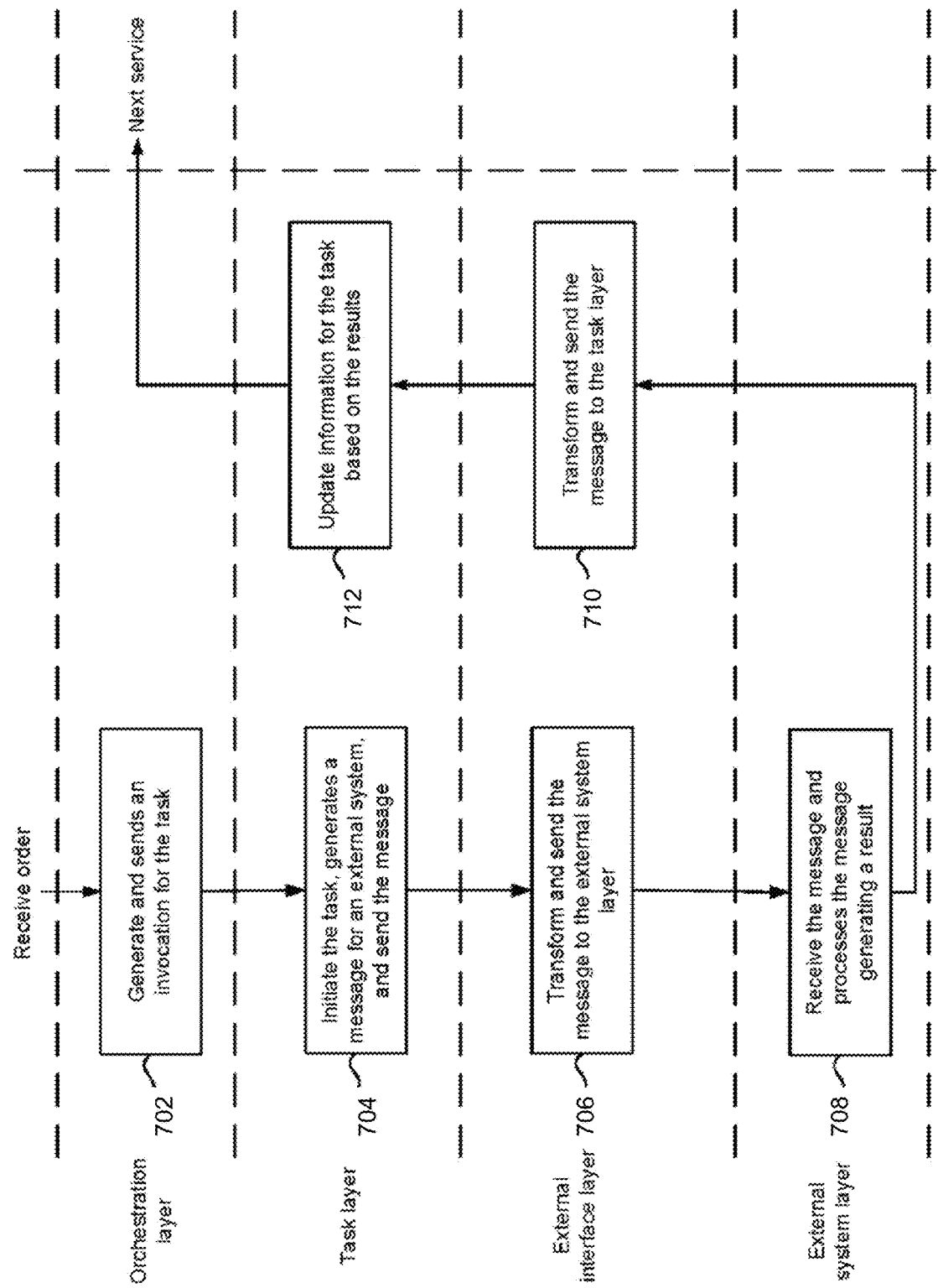
FIG. 7 illustrates a process for orchestration data flow among different layers according to one embodiment.

The orchestration of services is provided using information from table 400. However, in addition to orchestration, services need to communicate with external systems. FIG. 7 illustrates a process for orchestration data flow among different layers according to one embodiment. An orchestration layer, task layer, external interface layer, and external system layer is provided. In one embodiment, a decomposition layer (not shown) is provided before an orchestration layer.

Step 702 generates and sends an invocation for the task, according to the embodiment. An order may be received from an order capture module. This may cause a task to be invoked. The invocation request is generated using data found in the runtime table. The request is sent to the task layer.

Step 704 initiates the task, generates a message for an external system, and sends the message, according to the embodiment. The message generated indicates which task should be performed by the external system. The task to be performed is an aspect of order processing that has been modeled. For example, the task may be invoicing for an order. Parameters for performing the task are also included. The message is sent to an external interface.

Step 706 transforms and sends the message to the external system layer, according to the embodiment. The messages generated by the task layer may be in a generic format. Different external systems, however, may communicate using other formats. The external interface layer determines the format used by an external system and transforms the message. For example, metadata defined by a user may be used to determine the format to be used. In one example, mappings to what external systems call a product that was ordered are used to translate the message.

Step 708 receives the message returned by the external system and processes the message generating a result, according to the embodiment. The external systems may be systems that perform the task related to processing an order, such as a scheduling system, shipping system, etc. When the task is performed, the result of the task is determined. The result may be a date when a shipment is scheduled, a date when a good is shipped, etc. The result is then sent back to the external interface layer.

In the embodiment, step 710 transforms and sends the message to the task layer. Step 712 updates information for the task based on the results. For example, the results may be stored in a table or database. The process then continues to the next service that can be invoked.

By using encapsulated services that are defined using interface 308, changes can be made to an executable process 310 and implemented at runtime. For example, alterations to the metadata during the running of the process can influence the sequence of steps taken as well as the input arguments of the individual steps.

Figure 8:
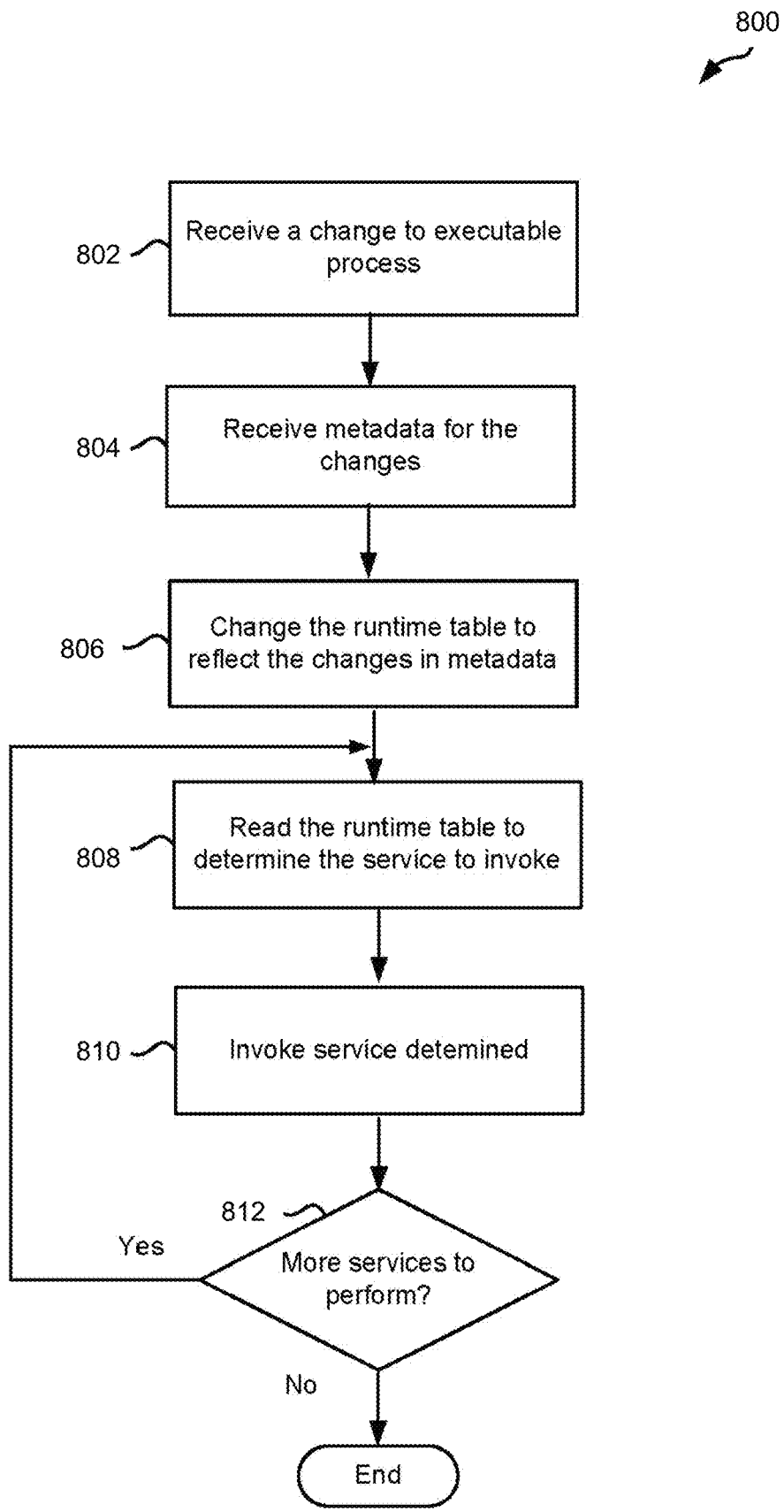
FIG. 8 illustrates a flowchart of a method for changing an executable process according to one embodiment.

FIG. 8 illustrates a flowchart 800 of a method for changing a business process according to one embodiment. In one embodiment, the functionality of flowchart 800 of FIG. 8, as well as the functionality of flow chart 1000 of FIG. 10, the functionality of flow chart 1100 of FIG. 11, the functionality of flow chart 2700 of FIG. 27, and the functionality of flow chart 2800 of FIG. 28, is implemented by software stored in memory or other computer-readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Step 802 receives a change to the business process. For example, interface 308 is used to change the business process to include different steps. In one example, steps may be replaced, steps may be deleted, or steps may be added.

Step 804 receives metadata for the changes. For example, runtime engine 312 may receive the changed metadata. Step 806 then changes the runtime table to reflect the changes in metadata. For example, executable process 310 may be changed to include different services to invoke.

When a service is to be invoked, step 808 reads the runtime table to determine the service to invoke. For example, step reader 504 may be reading the table during the processing of executable process 310. If the runtime table has been changed, step reader 504 determines the next step that needs to be performed based on the changes.

Step 810 then invokes the service determined. Because services can be called based on different input arguments, additional programming to re-deploy the new service is not needed when services in the business process are changed. Rather, the table may just be changed and different service can be automatically invoked.

Step 812 then determines if more services need to be performed. If so, the process reiterates to step 806 where the table is read again to determine the next step to perform. If not, the process ends.

Accordingly, data-driven orchestration provides abstraction and flexibility. The abstraction refers to the web-based administration of process metadata that defines the process steps in an executable process. Process code is re-used across different business processes. Flexibility refers to the ability to modify the processes without re-deployment of code. The use of changes to runtime metadata facilitates changes to executable process 310. Abstraction brings the process model closer to the business user and reduces administrative costs. Flexibility allows a business user to respond to change, such as the modification of process specifications when business processes or rules change.

Furthermore, a DOO order ("order") is an object that represents an order received from an order capture module, and that has been transferred into an object format utilized by an orchestration system. The order is capable of including a distributed order orchestration header ("header"). A header is an object that contains the entire hierarchy of the order. The order is capable of including one or more groups, where a group is an entity used to collect distributed order orchestration order lines ("order lines") for processing in a single instance of an orchestration process. Each group is capable of including one or more order lines. An order line is an object that contains the information of the corresponding order line of the order. Each order line is capable of including one or more distributed order orchestration fulfillment lines ("fulfillment lines"). A fulfillment line is an object that corresponds to a supply action of a corresponding fulfillment system which is capable of processing the order line. Thus, a fulfillment line is a supply line that fulfills the corresponding fulfillment task.

Further implementation details of orchestration are described in U.S. patent application Ser. No. 12/617,698, entitled "DISTRIBUTED ORDER ORCHESTRATION," U.S. patent application Ser. No. 12/718,585, entitled "CHANGE MANAGEMENT FRAMEWORK IN DISTRIBUTED ORDER ORCHESTRATION SYSTEM," and U.S. patent application Ser. No. 12/697,756, entitled "ORCHESTRATION OF BUSINESS PROCESSES USING TEMPLATES."

Status Management Framework

One embodiment is directed to a status management framework of a distributed order orchestration system. As previously described, during orchestration, a distributed order orchestration system can interact with multiple fulfillment systems. Such interactions can include sending and receiving messages to and from the multiple fulfillment systems, such as requests, responses, and updates, and where each message can include one or more status values. According to the embodiment, the status management framework determines how status information received from the multiple fulfillment systems is propagated and displayed within the distributed order orchestration system. Furthermore, the status management framework can allow customers to customize how the distributed order orchestration system propagates and displays the status information received from the multiple fulfillment systems.

Figure 9:
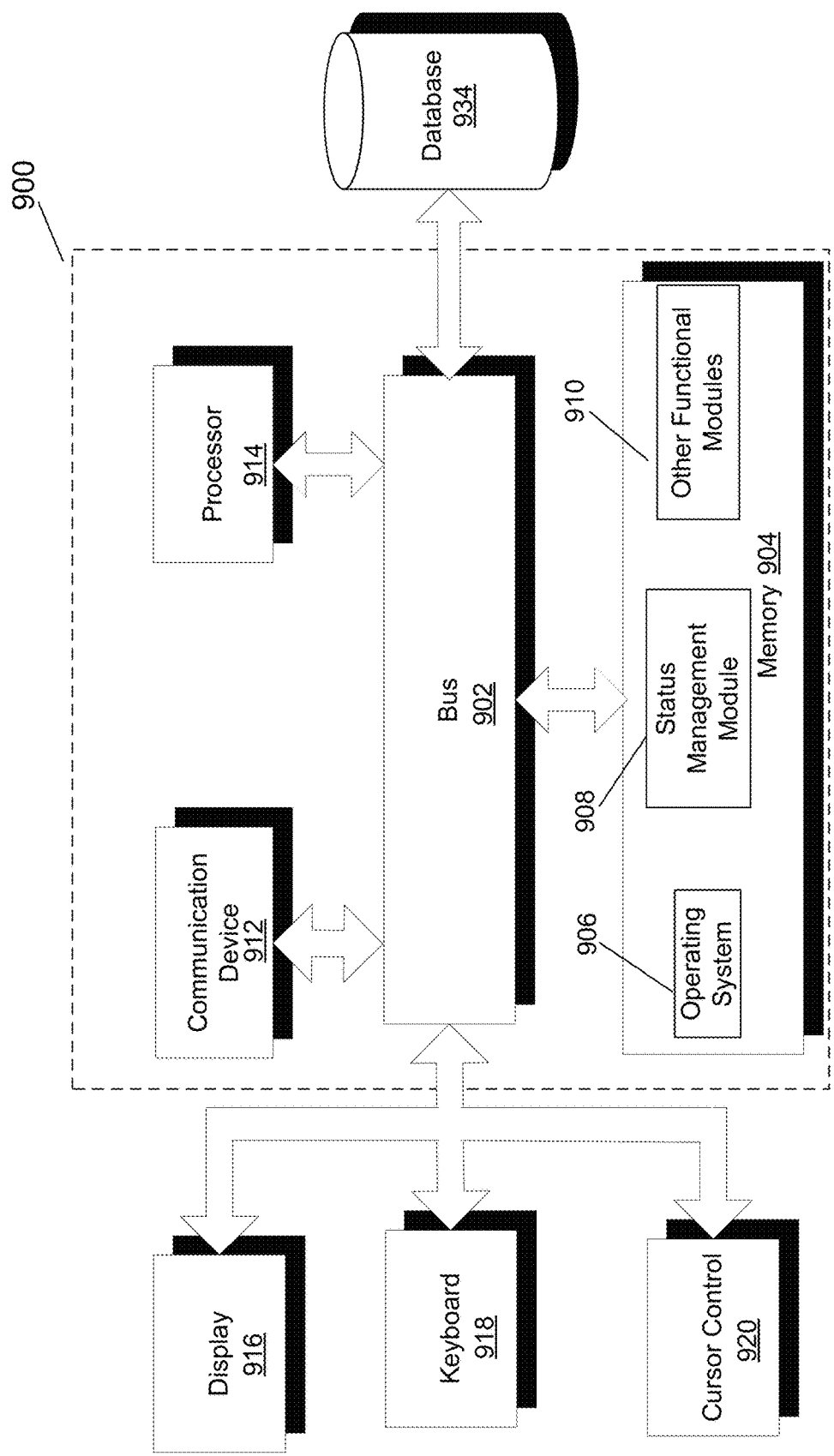
FIG. 9 illustrates a block diagram of a system that may implement an embodiment of the present invention.

FIG. 9 illustrates a block diagram of a system 900 that may implement one embodiment of the invention. System 900 includes a bus 902 or other communications mechanism for communicating information between components of system 900. System 900 also includes a processor 914, operatively coupled to bus 902, for processing information and executing instructions or operations. Processor 914 may be any type of general or specific purpose processor. System 900 further includes a memory 904 for storing information and instructions to be executed by processor 914. Memory 904 can be comprised of any combination of random access memory ("RAM"), read only memory ("ROM"), static storage such as a magnetic or optical disk, or any other type of machine or computer-readable medium. System 900 further includes a communication device 912, such as a network interface card or other communications interface, to provide access to a network. As a result, a user may interface with system 900 directly or remotely through a network or any other method.

A computer-readable medium may be any available medium that can be accessed by processor 914. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 914 can also be operatively coupled via bus 902 to a display 916, such as a Liquid Crystal Display ("LCD"). Display 916 can display information to the user. A keyboard 918 and a cursor control device 920, such as a computer mouse, can also be operatively coupled to bus 902 to enable the user to interface with system 900.

According to one embodiment, memory 904 can store software modules that may provide functionality when executed by processor 914. The modules can include an operating system 906, a status management module 908, as well as other functional modules 910. Operating system 906 can provide an operating system functionality for system 900. Status management module 908 can provide functionality for managing status information, as will be described in more detail below. In certain embodiments, status management module 908 can comprise a plurality of modules that each provide specific individual functionality for managing status information. System 900 can also be part of a larger system. Thus, system 900 can include one or more additional functional modules 910 to include the additional functionality. For example, functional modules 910 may include modules that are part of the "Fusion" product from Oracle Corporation.

Processor 914 can also be operatively coupled via bus 902 to a database 934. Database 934 can store data in an integrated collection of logically-related records or files. Database 934 can be an operational database, an analytical database, a data warehouse, a distributed database, an end-user database, an external database, a navigational database, an in-memory database, a document-oriented database, a real-time database, a relational database, an object-oriented database, or any other database known in the art.

As previously described, interacting with multiple fulfillment systems can prove challenging in many respects. One of the key challenges is how to receive updates from fulfillment systems that include status information, and intelligently update a status of one or more objects within a distributed order orchestration system as a result. Some of the other key challenges include the following challenges. Users can design unique orchestration processes which can include any task in any sequence, as well as conditional and parallel branches. Thus, the objects within a distributed order orchestration system may be different from one orchestration process to another orchestration process. Additionally, each fulfillment system may have a different way of sending status information. For example, some fulfillment systems may send explicit status values, while other fulfillment systems may send information that implies a status change (for example, an order quantity of 10, and a shipped quantity of 10, implying that a shipping task has completed). Furthermore, different fulfillment systems that perform the same function, may each use different methods to provide status updates, including different status values that indicate the same status.

Additionally, updates from fulfillment systems are sent to a distributed order orchestration system at a very detailed level (for example, a status value per fulfillment line per task; also identified as a "task/fulfillment line status value"), and the status values received by the distributed order orchestration system may need to be rolled up and propagated to various objects within the distributed order orchestration systems. Examples of such objects include task, orchestration process, fulfillment line, order line, and order). Furthermore, when change orders are sent to a distributed order orchestration system, one or more affected orchestration processes may need to be updated to reflect the changes. During this time period, users may need to understand a status of the one or more affected orchestration processes. In addition, a fulfillment process, and its tasks, may split as a result of changes made by the fulfillment system. When splits occur, a status of the split fulfillment processes may need to be accounted for.

Furthermore, different users may desire different levels of detail in status updates. Allowing users the ability to add their own status values as well as alter a display of existing status values allows users to customize a level of detail in status updates. Furthermore, users can be enabled to reuse as many definitions as possible when authoring new processes.

According to certain embodiments of the invention, a distributed order orchestration system can address the challenges described above by providing a status management framework. The status management framework can manage status information by receiving messages from one or more fulfillment systems that include one or more status values. The status management framework can further manage status information be propagating the one or more received status values within the distributed order orchestration system. The status management framework can include a status service that receives one or more status values from one or more task layer services, and propagates the one or more status values throughout one or more objects of the distributed order orchestration system.

In certain embodiments, the status management framework can manage status information through the following sequence. First, a fulfillment system sends a message to a distributed order orchestration system. The message can be an enterprise business message ("EBM"), where an EBM is a message exchanged between two applications or devices. The message can be an update to a distributed order orchestration system. The message can also be a response that acknowledges a receipt of a request from the distributed order orchestration system. Next, a fulfillment system connector component either: (a) translates a fulfillment system status value contained within the message into a distributed order orchestration status value; or (b) passes through the fulfillment system status value. Subsequently, the fulfillment system connector component sends a message that contains the distributed order orchestration status value (or the fulfillment system status value) to a specific task layer service of the distributed order orchestration system, where the task layer service interprets the message. As previously described, a task layer service is a service that performs task-specific processing within an orchestration process, and then sends data to one or more fulfillment systems. Next, the task layer service determines an appropriate status value associated with each fulfillment line within the message, and associated with the task performed by the task layer service, based on the interpreted message.

The task layer service then calls a status service. A status service is a service that determines and sets an appropriate status value for one or more objects within the distributed order orchestration system. Examples of objects are tasks, orchestration processes, fulfillment lines, order lines, and orders. The status service creates or updates a record stored in an intersection table, where the intersection table includes one or more records, and each record includes a fulfillment line identity, a task identity, and a status value. Thus, the intersection table maps each status value to a fulfillment line and a task. The status service then determines and sets an appropriate status value for each task in an orchestration process. Once the status service has determined and set a status value for each task, the status service evaluates one or more user-defined expressions for the orchestration process (identified as "orchestration process status conditions") to determine and set an appropriate status value for the orchestration process. Next, the status service determines and sets a status value for each fulfillment line in a manner similar to determining and setting a status value for each task with a few exceptions. Namely, a fulfillment line status is based on a status of each task related to the fulfillment line, so the appropriate status values stored in the intersection table are evaluated. Based on these status values, fulfillment line status conditions are evaluated to determine and set a status value for each fulfillment line. Once each fulfillment line status is determined, the status service determines and sets a status value for each order line based on logic stored within the status service. Once each orchestration line status is determined, the status service determines and sets a status value for each order based on logic stored within the status service. The sequence is further described below in greater detail.

According to certain embodiments, users of a distributed order orchestration system can define one or more attributes of the status management framework. More specifically, users can define eligible status values and status logic/conditions. Regarding eligible status values, users can define: (a) a master listing of all possible status values that can be used within the distributed order orchestration system, including their display value; (b) a subset of status values that can be used to assign a status to a fulfillment line; (c) a subset of status values that can be used to assign a status to a task type; (d) a subset of status values that can be used to assign a status to an orchestration process class. Regarding status logic/conditions, users can define: (a) logic that defines how to map an inbound status from a task layer to a user-friendly status that can be visible within a runtime user interface of the distributed order orchestration system, as well as in status rules; (b) logic that determines how to roll a task status up to a fulfillment line; and (c) logic that determines how to roll a task status up to an orchestration process. Furthermore, based on these status values, the distributed order orchestration system can determine how to roll a fulfillment line status up to an order line; and can determine how to roll an order line status up to an order. User setup capabilities are further described below in greater detail.

Figure 10:
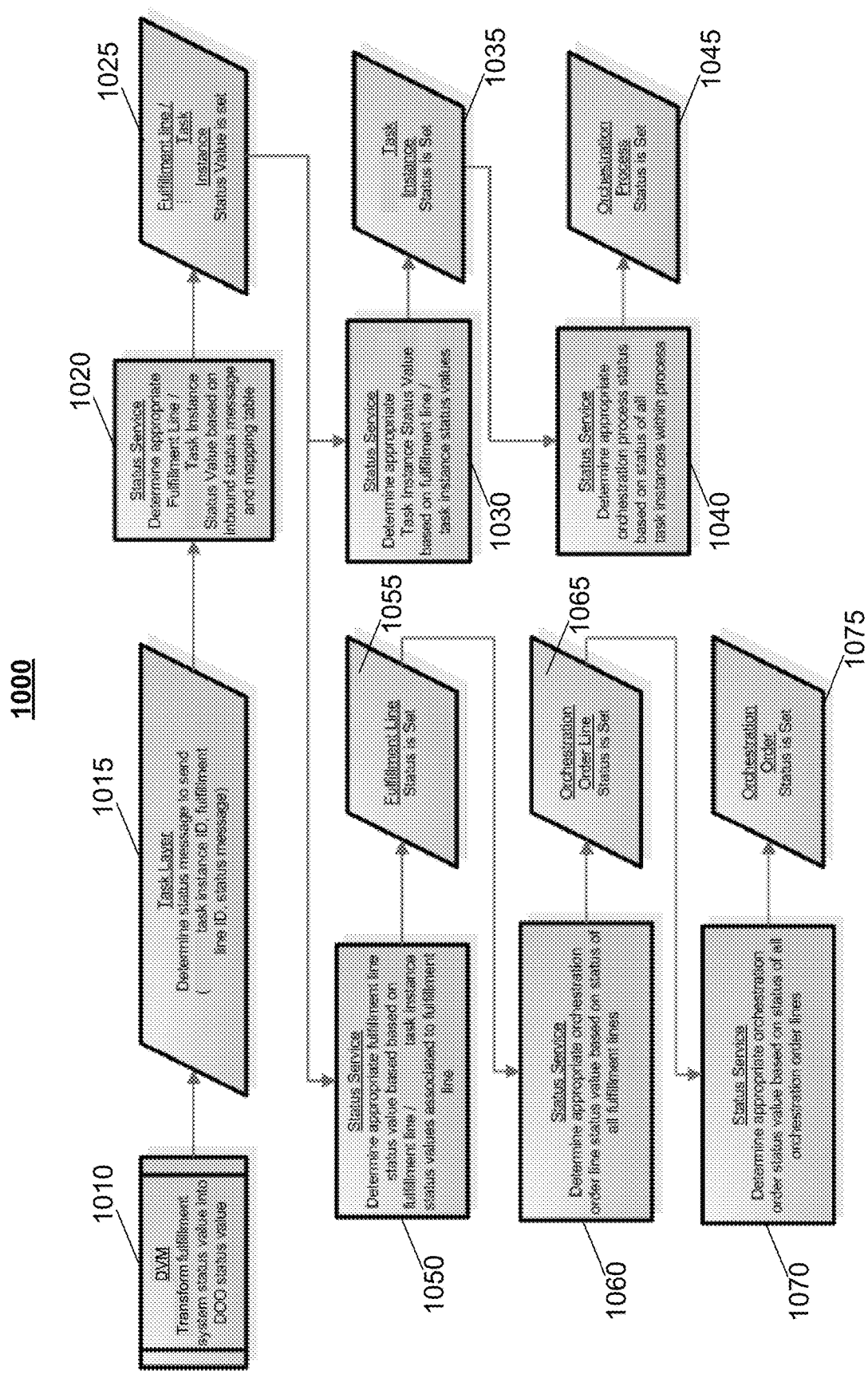
FIG. 10 illustrates a flow chart of a method for managing status information according to one embodiment.

FIG. 10 illustrates a flow chart 1000 of a method for managing status information according to one embodiment. The flow illustrated in FIG. 10 begins when a fulfillment system sends a message to a distributed order orchestration system, such as system 900 of FIG. 9. In certain embodiments, the message sent by the fulfillment system is a status update message. In other embodiments, the message sent by the fulfillment system is a response to a request that is sent by the distributed order orchestration system to the fulfillment system. In one embodiment, the message is an EBM. As previously described, an EBM is a standardized message that can be transmitted within components of the distributed order orchestration system, and can define a format for presenting information. Thus, according to the embodiment, the message from the fulfillment system complies with the EBM format. Within the EBM format is an attribute called "status," and the status attribute of the EBM can include a status value. The status value can be associated with a fulfillment line, and can also be associated with a task. The fulfillment line can be associated with an order line, where the order line can be associated with an order. The task can be associated with an orchestration process.

In certain embodiments, the status value may be a distributed order orchestration status value. In other words, the status value complies with a format specific to the distributed order orchestration system. In other embodiments, the status value may be a fulfillment system status value. In other words, the status value complies with a format specific to the fulfillment system, rather than the distributed order orchestration system. In these embodiments, while each fulfillment system status value complies with the EBS format, each fulfillment system status value does not necessarily comply with a format specific to the distributed order orchestration system. For example, a first fulfillment system may send a fulfillment system status value of "Complete," a second fulfillment system may send a fulfillment system status value of "Shipped," and a third fulfillment system may send a fulfillment system status value of "Done."

At 1010, a component of the distributed order orchestration system transforms a received fulfillment system status value into a distributed order orchestration status value. In certain embodiments, the component is a domain value map ("DVM"). A domain value map is an object that maps various fulfillment system status values to corresponding distributed order orchestration status values. The distributed order orchestration status value is then sent to a task layer service. The transformation of 1010 is only performed in embodiments where a distributed order orchestration system receives a fulfillment system status value. In embodiments where the distributed orchestration system receives a distributed order orchestration status value, the transformation of 1010 is not performed. The flow then proceeds to 1015.

At 1015, a task layer service determines a status message to send to a status service. By determining the status message, the task layer service first determines a task instance identity of a task that is associated with the status value. The task layer service then determines a fulfillment line identity of a fulfillment line that is associated with the status value. The task layer service then stores the status value, task instance identity, and fulfillment line identity within a status message that is generated by the task layer service. Subsequently, the task layer service sends the status message to a status service. The flow then proceeds to 1020.

At 1020, the status service determines a status value for a task and fulfillment line. More specifically, the status service first translates the status value stored within the status message received from the task layer service into a status value that the status service understands. In certain embodiments, the status service translates the status value using a mapping table. The status service subsequently analyzes an intersection table and identifies whether the intersection table includes a record that includes the task instance identity and the fulfillment line identity stored within the status message received from the task layer service. As previously described, an intersection table includes one or more records, where each record includes a task instance identity, a fulfillment line identity, and a status value. Thus, the intersection table maps each status value with a task and a fulfillment line. Where the intersection table includes a record that includes the task instance identity and the fulfillment line identity, the status service determines that the record will be updated with the translated status value. The status service performs these actions for each task/fulfillment line status value. The flow then proceeds to 1025.

At 1025, the status service sets a status value for a task/fulfillment line by storing the translated status value within the intersection table. If the intersection table contains a record that includes the task instance identity and fulfillment line identity contained within the status message received from the task layer service, the status service updates the record by updating the status value stored in the record with the translated status value. If the intersection table does not contain a record that includes the task instance identity and fulfillment line identity, the status service creates a record that includes the translated status value, and that also includes the task instance identity and fulfillment line identity stored within the status message received from the task layer service. The status service performs these actions for each task/fulfillment line status value.

The flow then proceeds to 1030 and 1050. In certain embodiments, the sequence of 1030, 1035, 1040, and 1045, and the sequence of 1050, 1055, 1060, 1065, 1070, and 1075, can be performed in parallel. In alternate embodiments, the sequence of 1030, 1035, 1040, and 1045, and the sequence of 1050, 1055, 1060, 1065, 1070, and 1075, can be performed sequentially, where either sequence can be performed first, and the other sequence can be performed second.

At 1030, the status service determines a status value for a task based on one or more task/fulfillment line status values. More specifically, the status service analyzes the intersection table to determine the status value for each task/fulfillment line that is associated with the task. Based on the task/fulfillment line status values stored within the intersection table that are associated with the task, the status service determines a composite status value for the task that takes into consideration the task/fulfillment line status values. For example, if the task/fulfillment line status values are all the same, then the status service determines that the composite status value for the task is the same as the status value for each task/fulfillment line. As a more specific example, if each of the task/fulfillment lines has a status value of "Complete," then the status service determines that the task has a composite status value of "Complete" as well. As another example, if the task/fulfillment line status values are different, then the status service determines that the composite status value for the task is a value that indicates that the status values are different, such as "Various." In certain embodiments, users of the distributed order orchestration system can customize how the status service determines a status value for a task based on the task/fulfillment line status values that are associated with the task. More specifically, users can create logic for the status service that determines a composite status value for a task based on task/fulfillment line status values that are associated with the task. The status service performs these actions for each task. The flow then proceeds to 1035.

At 1035, the status service sets the status value for the task. The status service sets the status value to the composite status value determined at 1030. In certain embodiments, the status service stores the status value in an attribute of an object stored within the distributed order orchestration system, where the object represents the task. The object (including the status value) can be stored within any type of memory, and can be accessed by the distributed order orchestration system. Thus, the status value for the task can be propagated within the distributed order orchestration system. The status service performs these actions for each task. The flow then proceeds to 1040.

At 1040, the status service determines a status value for an orchestration process based on the task status value of each task associated with the orchestration process. More specifically, the status service first analyzes each of the task status values that are associated with the orchestration process. The status service then evaluates one or more orchestration process status conditions, where each orchestration process status condition evaluates to one of two Boolean values (such as true or false) based on the task status values that are associated with the orchestration process. Evaluating an expression (such as an orchestration process status condition) to one of two Boolean values means that it is determined whether the expression equals a first Boolean value (such as true) or a second Boolean value (such as false). Each of the orchestration process status conditions is associated with a sequence number. The status service then determines the orchestration process status condition that evaluates to a first Boolean value (such as true), and that is associated with the highest sequence number, and selects the orchestration process status condition. Each of the orchestration process status conditions is also associated with a status value. The status service then determines a composite orchestration process status value that is equal to the status value associated with the selected orchestration process status condition.

In certain embodiments where at least one task associated with the orchestration process splits into two or more tasks, situations can arise where one or more duplicate tasks are associated with the orchestration process, but a task status value of each duplicate task is different. In these embodiments, to handle these situations, each task status value can also be associated with a split priority. A split priority determines which task status value should be selected to evaluate an orchestration process status condition, where one or more duplicate tasks are associated with the orchestration process, but a task status value of each duplicate task is different. When the status services analyzes each of the task status values that correspond to the orchestration process, and evaluates the one or more orchestration process status conditions, the status service uses the task status value associated with a higher split status priority. In one embodiment, a split priority is represented by a numerical value (e.g., 1, 2, 3, or 4), where the lower the numerical value, the higher the priority, and vice-versa. However, this is merely an example embodiment, and in alternate embodiments, a split priority can be presented in other ways. For example, in an alternate embodiment, a split priority can be represented by a numerical value, where the higher the numerical value, the higher the priority. In another alternate embodiment, a split priority can be represented by an alphabetical value (e.g., A, B, C, or D).

In certain embodiments, users of the distributed order orchestration system can customize the one or more orchestration process status conditions used by the status service to determine a status value for an orchestration process. More specifically, users can create logic for each orchestration process status condition that is based on one or more task status values that correspond to the orchestration process, where the status service evaluates each orchestration process status condition to determine a status value for the orchestration process. The status service performs these actions for each orchestration process. The flow then proceeds to 1045.

At 1045, the status service sets the status value for the orchestration process. The status service sets the status value to the composite status value determined at 1040. In certain embodiments, the status service stores the status value in an attribute of an object stored within the distributed order orchestration system, where the object represents the orchestration process. The object (including the status value) can be stored within any type of memory, and can be accessed by the distributed order orchestration system. Thus, the status value for the orchestration process can be propagated within the distributed order orchestration system. The status service performs these actions for each orchestration process.

At 1050, the status service determines a status value for a fulfillment line based on the task/fulfillment line status values that correspond to the fulfillment line. More specifically, the status service analyzes the intersection table to determine the status value for each task/fulfillment line that is associated with the fulfillment line. The status service then evaluates one or more fulfillment line status conditions, where each fulfillment line status condition evaluates to one of two Boolean values (such as true or false) based on the task/fulfillment line status values that correspond to the fulfillment line. Each of the fulfillment line status conditions is associated with a sequence number. The status service then determines the fulfillment line status condition that evaluates to a first Boolean value (such as true), and that is associated with the highest sequence number, and selects the fulfillment line status condition. Each of the fulfillment line status conditions is also associated with a status value. The status service then determines a composite fulfillment line status value that is equal to the status value associated with the selected fulfillment line status condition.

In certain embodiments, the one or more fulfillment line status conditions comprise a rule set. A rule set can be associated with a status category, where one or more status categories comprise a status catalog. A status catalog can include one or more items, where each item can be associated with a status category. An orchestration process can be associated with a status catalog, and a fulfillment line that is associated with the orchestration process can include an item attribute. A value of the item attribute can be identical to a value of an item within the status catalog associated with the orchestration process. Based on the item attribute, a fulfillment line can be associated with a status category that comprises the item, and thus, the fulfillment line can be associated with the rule set that is associated with the status category. Therefore, in these embodiments, each fulfillment line associated with an orchestration process can be associated with its own rule set (i.e., can be associated with its own one or more fulfillment line status conditions).

In certain embodiments, users of the distributed order orchestration system can customize the one or more fulfillment line status conditions used by the status service to determine a status value for a fulfillment line. More specifically, users can create logic for each fulfillment line status condition that is based on one or more task/fulfillment line status values that correspond to the fulfillment line, where the status service evaluates each fulfillment line status condition to determine a status value for the fulfillment line. Users can further create a rule set that comprises one or more fulfillment line status conditions, and associate the rule set with a status category of a status catalog. The status service performs these actions for each fulfillment line. The flow then proceeds to 1055.

At 1055, the status service sets the status value for the fulfillment line. The status service sets the status value to the composite status value determined at 1050. In certain embodiments, the status service stores the status value in an attribute of an object stored within the distributed order orchestration system, where the object represents the fulfillment line. The object (including the status value) can be stored within any type of memory, and can be accessed by the distributed order orchestration system. Thus, the status value for the fulfillment line can be propagated within the distributed order orchestration system. The status service performs these actions for each fulfillment line. The flow then proceeds to 1060.

At 1060, the status service determines a status value for an order line based on the fulfillment line status values that correspond to the order line. In certain embodiments, an order line is comprised of one or more fulfillment lines. Each fulfillment line can have a fulfillment line status value associated with it, where the fulfillment line status value can be (among other status values), one of three status values, where a first status value indicates that a fulfillment line is open, a second status value indicates that a fulfillment line is closed, and a third status value indicates that a fulfillment line is cancelled. The status service can include logic that analyzes each fulfillment line status value associated with an order line, and that determines a composite order line status value based on the fulfillment line status values. For example, if each fulfillment line status value has a status value that indicates a fulfillment line is open, the status service can determine a composite order line status value of a first status value that indicates that an order line is open. If each fulfillment line status value has a status value that indicates a fulfillment line is closed, the status service can determine a composite order line status value of a second status value that indicates that an order line is closed. If each fulfillment line status value has a status value that indicates a fulfillment line is cancelled, the status service can determine a composite order line status value of a third status value that indicates that an order line is cancelled. If some fulfillment line status values have a status value that indicates a fulfillment line is open, and other fulfillment line status values have a status that indicates a fulfillment line is closed, the status service can determine a composite order line status value of a fourth status value that indicates an order line is partially open. In the event that some fulfillment line status values have a status value that indicates a fulfillment line is cancelled, and other fulfillment line status values have a status value that indicates a fulfillment line is either open or closed, the status service can ignore the fulfillment line status values that have a status value that indicates a fulfillment line is cancelled in determining a composite order line status value, and solely determine the composite order line status value based on the fulfillment line status values that have a status value that indicates a fulfillment line is either open or closed. Thus, the status service determines a composite order line status value based on the fulfillment line status values that correspond to the order line. The status service performs these actions for each order line. The flow then proceeds to 1065.

At 1065, the status service sets the status value for the order line. The status service sets the status value to the composite status value determined at 1060. In certain embodiments, the status service stores the status value in an attribute of an object stored within the distributed order orchestration system, where the object represents the order line. The object (including the status value) can be stored within any type of memory, and can be accessed by the distributed order orchestration system. Thus, the status value for the order line can be propagated within the distributed order orchestration system. The status service performs these actions for each order line. The flow then proceeds to 1070.

At 1070, the status service determines a status value for an order based on the order line status values that correspond to the order. In certain embodiments, an order is comprised of one or more order lines. Each order line can have an order line status value associated with it, where the order line status value can be (among other status values), one of three status values, where a first status value indicates that an order line is open, a second status value indicates that an order line is closed, and a third status value indicates that an order line is cancelled. The status service can include logic that analyzes each order line status value associated with an order, and that determines a composite order status value based on the order line status values. For example, if each order line status value has a status value that indicates an order line is open, the status service can determine a composite order status value of a first status value that indicates that an order is open If each order line status value has a status value that indicates an order line is closed, the status service can determine a composite order status value of a second status value that indicates that an order is closed. If each order line status value has a status value that indicates an order line is cancelled, the status service can determine a composite order status value of a third status value that indicates that an order is cancelled. If some order line status values have a status value that indicates an order line is open, and other order line status values have a status that indicates an order line is closed, the status service can determine a composite order status value of a fourth status value that indicates an order is partially open. In the event that some order line status values have a status value that indicates an order line is cancelled, and other order line status values have a status value that indicates an order line is either open or closed, the status service can ignore the order line status values that have a status value that indicates an order line is cancelled in determining a composite order status value, and solely determine the composite order status value based on the order line status values that have a status value that indicates an order line is either open or closed. Thus, the status service determines a composite order status value based on the order line status values that correspond to the order. The status service performs these actions for each order. The flow then proceeds to 1075.

At 1075, the status service sets the status value for the order. The status service sets the status value to the composite status value determined at 1070. In certain embodiments, the status service stores the status value in an attribute of an object stored within the distributed order orchestration system, where the object represents the order. The object (including the status value) can be stored within any type of memory, and can be accessed by the distributed order orchestration system. Thus, the status value for the order can be propagated within the distributed order orchestration system. The status service performs these actions for each order.

Figure 11:
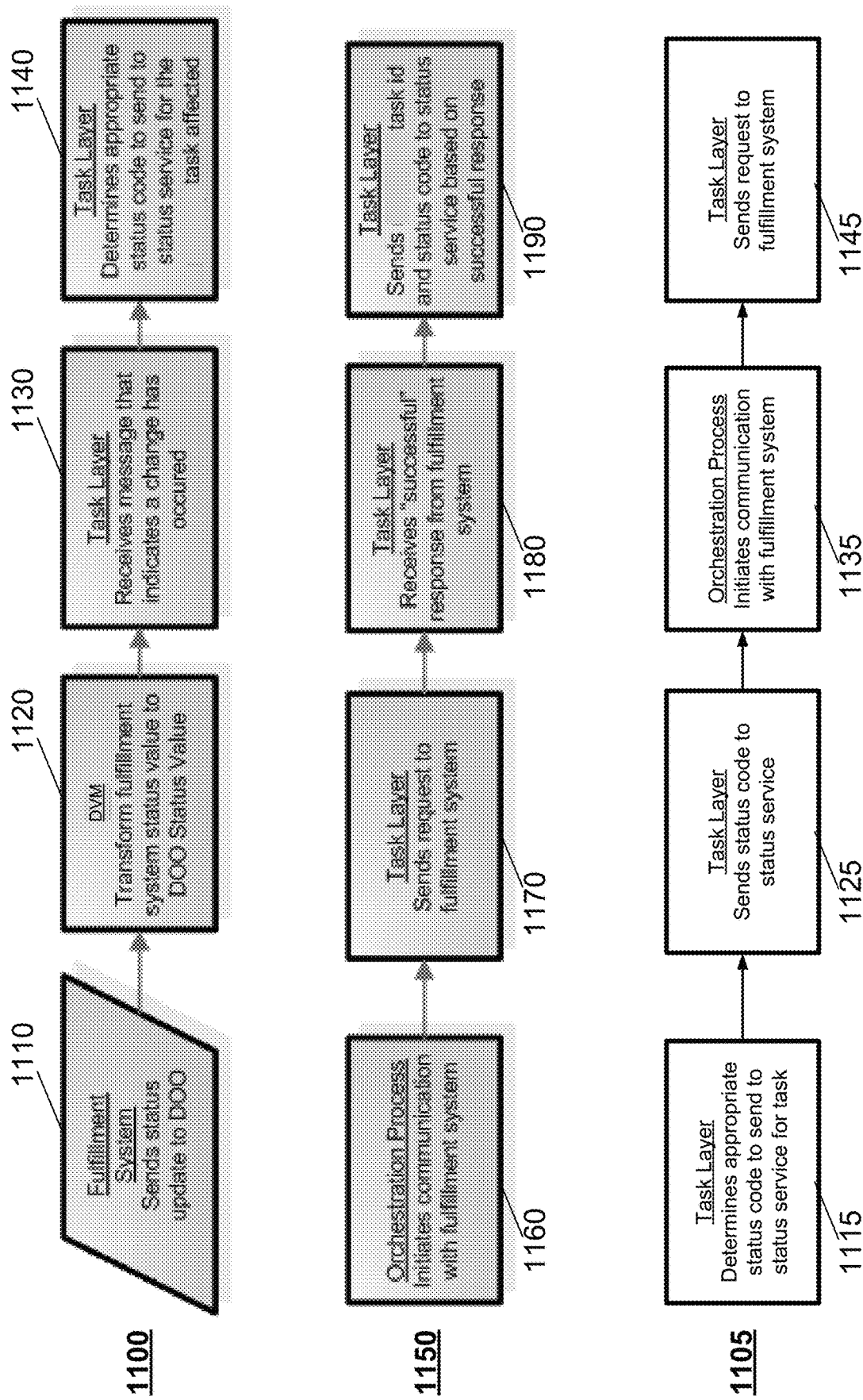
FIG. 11 illustrates a flow chart of a method for determining a status value to send to a status service according to a first embodiment, a flow chart of a method for determining a status value to send to the status service according to a second embodiment, and a flow chart of a method for determining a status value to send to a status service according to a third embodiment.

FIG. 11 illustrates a flow chart 1100 of a method for determining a status value to send to a status service according to a first embodiment, a flow chart 1150 of a method for determining a status value to send to the status service according to a second embodiment, and a flow chart 1105 of a method for determining a status value to send to a status service according to a third embodiment. The first embodiment is an embodiment where a distributed order orchestration system receives a status update from a fulfillment system. The second embodiment is an embodiment where the distributed order orchestration system does not receive an explicit status value from the fulfillment system, but instead receives a response that acknowledges a receipt of a request from the distributed order orchestration system. The third embodiment is an embodiment where the distributed order orchestration system determines a status value before submitting an outbound request to a fulfillment system.

The flow of flow chart 1100 is now described. At 1110, a fulfillment system sends a status update to a distributed order orchestration system. The status update can include a status value. The status value can either be a distributed order orchestration status value or a fulfillment system status value. In the illustrated embodiment of FIG. 11, the status value is a fulfillment system status value. The flow then proceeds to 1120.

At 1120, a DVM transforms the fulfillment system status value into a distributed order orchestration status value. A DVM is a component within the distributed order orchestration system that includes one or more mappings. Each mapping maps a fulfillment system status value with a distributed order orchestration status value. The DVM identifies a mapping that corresponds to the received fulfillment system status value and uses the mapping to transform the received fulfillment system status value into a corresponding distributed order orchestration status value. In certain embodiments, the DVM is seeded with expected fulfillment system status values and corresponding distributed order orchestration status values. In certain embodiments, a user can customize the one or more mappings included within the DVM. The customization can include creating new mappings, deleting existing mappings, or updating existing mappings. The flow then proceeds to 1130.

At 1130, a task layer service receives a message from the DVM that indicates that a change has occurred. According to the embodiment, the message includes the distributed order orchestration status value. The task layer service determines a fulfillment line and task associated with the distributed order orchestration status value. The flow then proceeds to 1140.

At 1140, the task layer service determines an appropriate status value to send to a status service. The status value corresponds to the distributed order orchestration status value. The task layer service then sends a status message to the status service, where the status message includes the status value, a task instance identity that corresponds to the task associated with the status value, and a fulfillment line identity that corresponds to the fulfillment line associated with the status value. The status service subsequently translates the status value received from the task layer service into a status value that the status service understands, and stores the translated status value, task instance identity, and fulfillment line identity within an intersection table (not shown). In certain embodiments, the status service translates the status value using a mapping table.

The flow of flow chart 1150 is now described. At 1160, an orchestration process of a distributed order orchestration system initiates communication with a fulfillment system. In certain embodiments, the orchestration process initiates communication with the fulfillment system by sending an instruction to a task layer service of the distributed order orchestration system to send a request to the fulfillment system. The flow then proceeds to 1170.

At 1170, the task layer service sends a request to the fulfillment system. In certain embodiments, the request can be a request that the fulfillment system perform processing related to a task performed by the task layer service. The flow then proceeds to 1180.

At 1180, the task layer service receives a response from the fulfillment system. The response is a response to the request previously sent by the task layer service. In certain embodiments, the response does not include an explicit status value. Instead, in these embodiments, the response includes information associated with the request sent by the task layer service, and the task layer service can infer a status value from the information. For example, a task layer service can send a request to a shipping fulfillment system to ship 40 items, and a task layer service can receive a response from the shipping fulfillment system, where the response includes a shipped quantity of 40. From the shipped quantity of 40, the task layer service can infer that the status is "Complete," because the shipped quantity of 40 indicates that all 40 requested items have been shipped, and therefore, the task layer service can infer a status value of "Complete." In addition to a status value, the task layer service can determine a task and fulfillment line that is associated with the status value (where the status value is either an explicit status value received from the fulfillment system or inferred from the information received from the fulfillment system), can determine a task instance identity associated with the task, and can determine a fulfillment line identity associated with the fulfillment line. The flow then proceeds to 1190.

At 1190, the task layer service then sends a status message to the status service, where the status message includes the status value, the task instance identity, and the fulfillment line identity. The status service subsequently translates the status value received from the task layer service into a status value that the status service understands, and stores the translated status value, task instance identity, and fulfillment line identity within an intersection table (not shown). In certain embodiments, the status service translates the status value using a mapping table.

The flow of flow chart 1105 is now described. At 1115, a task layer service of a distributed order orchestration system determines an appropriate status value to send to a status service. In certain embodiments, the task layer service determines a status value that indicates a task has started, such as "Started." The status value can assist in distinguishing tasks that have started versus tasks where the task layer service has received a response from a fulfillment system. The flow then proceeds to 1125.

At 1125, the task layer service then sends a status message to the status service, where the status message includes the status value, a task instance identity that corresponds to the task associated with the status value, and a fulfillment line identity that corresponds to the fulfillment line associated with the status value. The status service subsequently translates the status value received from the task layer service into a status value that the status service understands, and stores the translated status value, task instance identity, and fulfillment line identity within an intersection table (not shown). In certain embodiments, the status service translates the status value using a mapping table. The flow then proceeds to 1135.

At 1135, an orchestration process of the distributed order orchestration system initiates communication with a fulfillment system. In certain embodiments, the orchestration process initiates communication with the fulfillment system by sending an instruction to the task layer service of the distributed order orchestration system to send a request to the fulfillment system. The flow then proceeds to 1145.

At 1145, the task layer service sends a request to the fulfillment system. In certain embodiments, the request can be a request that the fulfillment system perform processing related to a task performed by the task layer service.

Figure 12:
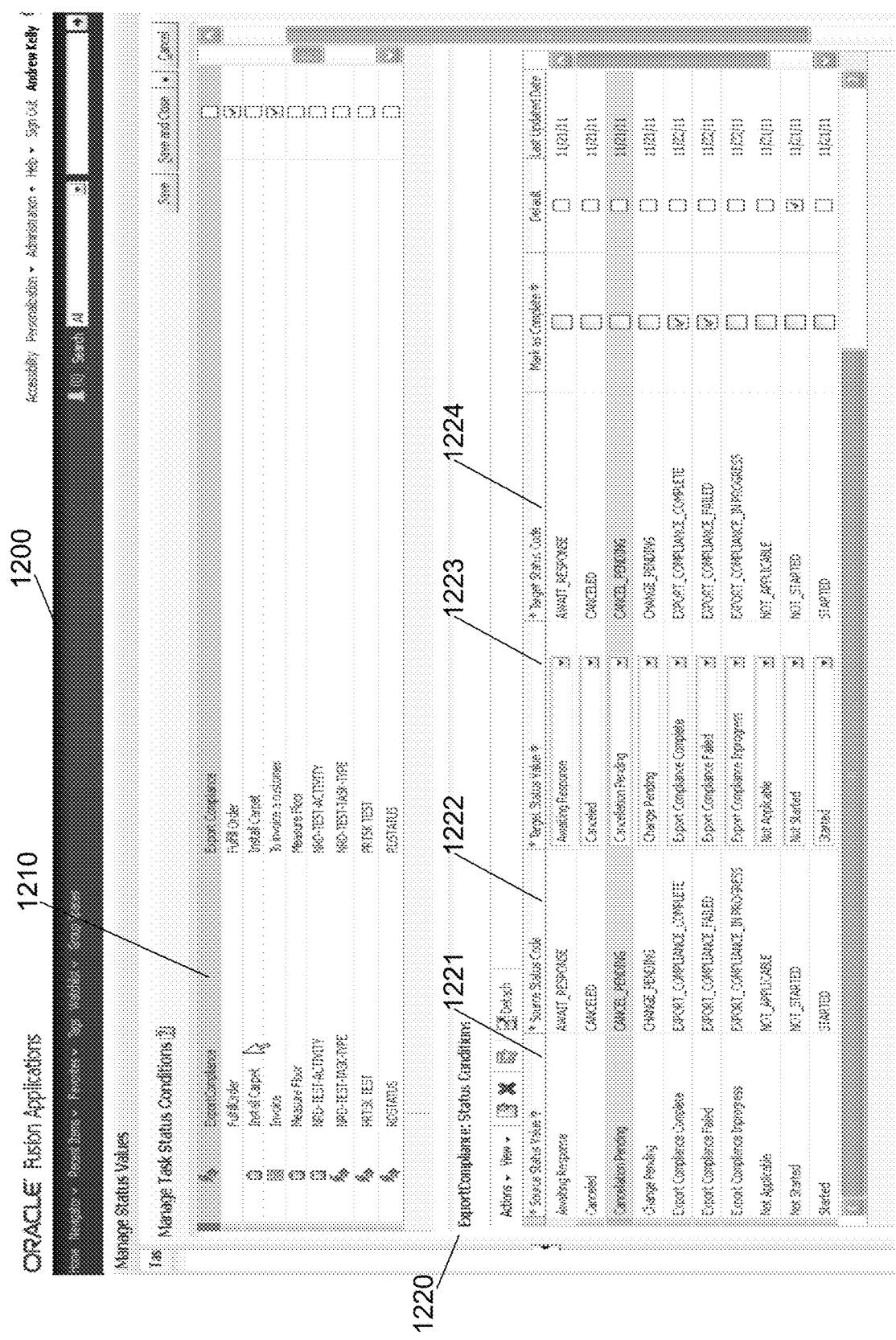
FIG. 12 illustrates a user interface that includes a plurality of mapping tables used by a status service to translate a status value received from a task layer service into a status value that the status service understands.

FIG. 12 illustrates a user interface 1200 that includes a plurality of mapping tables used by a status service to translate a status value received from a task layer service into a status value that the status service understands. User interface 1200 allows users of a distributed order orchestration system to define one or more status value mappings for each task type stored within the distributed order orchestration system.

In the illustrated embodiment, user interface 1200 displays task type 1210, where task type 1210 displays one or more task types that are stored within the distributed order orchestration system. According to the embodiment, a mapping table is associated with each task type, where each mapping table includes one or more source status values and one or more target status values. Each source status value can be mapped to a target status value within the mapping table. When a status service receives a source status value from a task layer service, where the source status value is within a status message, the status service can translate the received source status value by analyzing a mapping table that corresponds to a task type of the source status value, and by determining a target status value that the source status value is mapped. Furthermore, according to the embodiment, users can create, modify, or delete, one or more mappings of the one or more mapping tables. In the illustrated embodiment, user interface 1200 displays user sub-interface 1220.

User sub-interface 1220 displays a mapping table for the task type "Export Compliance." According to the illustrated embodiment, the mapping table displayed within user sub-interface 1220 includes source status value 1221, source status code 1222, target status value 1223, and target status code 1224. Source status value 1221 displays a source status value for each source status value associated with the task type "Export Compliance," within the distributed order orchestration system. Source status code 1222 displays a status code for each source status value associated with the task type "Export Compliance," within the distributed order orchestration system. Target status value 1223 displays a target status value that each corresponding source status value is mapped to within the distributed order orchestration system. Target status code 1224 displays a status code for each target status value associated with the task type "Export Compliance," within the distributed order orchestration system. Users can add, modify, or delete, one or more mappings of the mapping table displayed within user sub-interface 1220.

Figure 13:
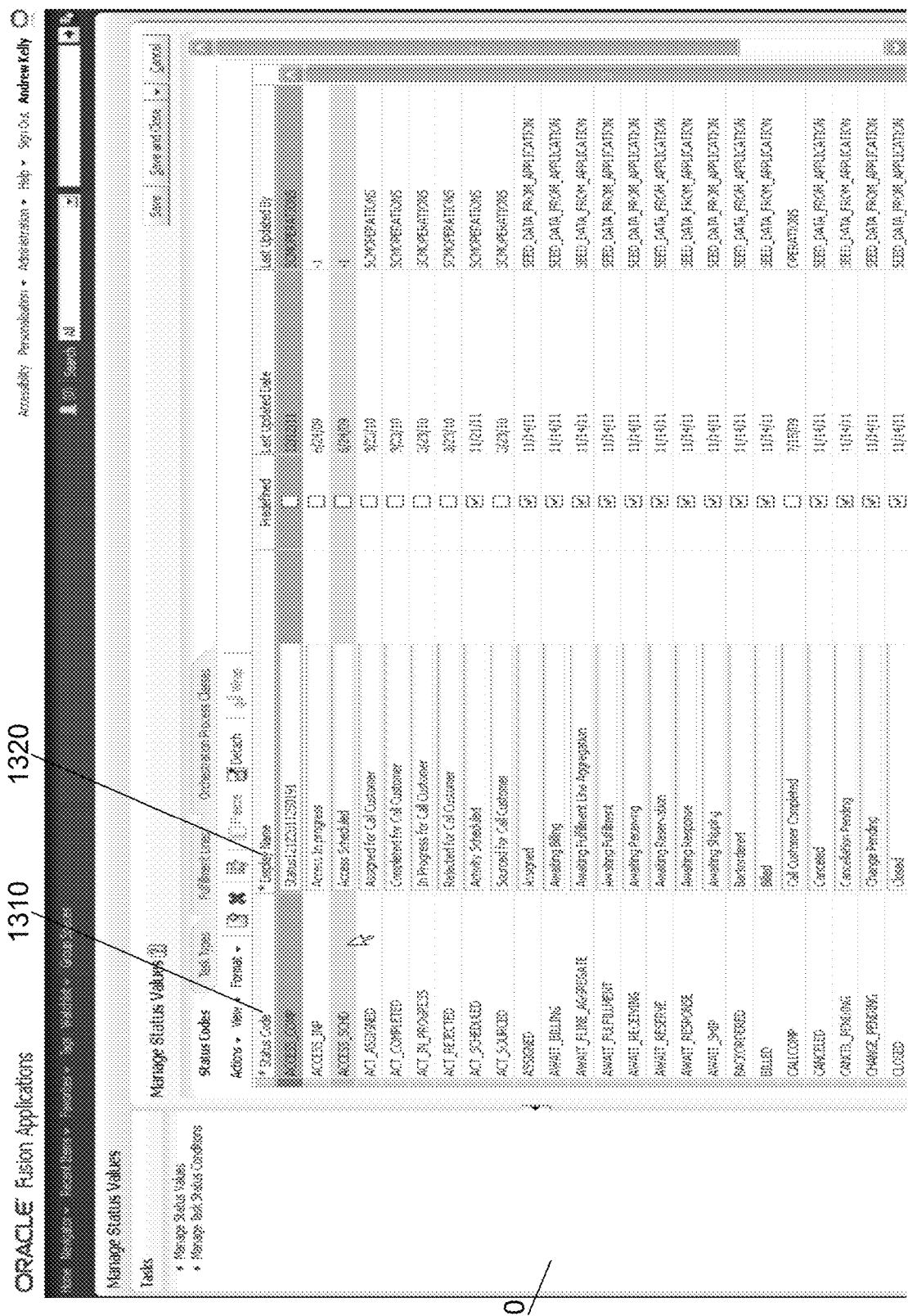
FIG. 13 illustrates a user interface for defining a list of possible status values according to one embodiment.

FIG. 13 illustrates a user interface 1300 for defining a list of possible status values according to one embodiment. User interface 1300 allows users of a distributed order orchestration system to define one or more status values that can be used by a status management framework. Each of the one or more status values complies with a format specific to the distributed order orchestration system.

According to the embodiment, each status value includes a status code and a display value. The status code is an internal status value that is used by the status management framework of the distributed order orchestration system. The display value is the external status value that is displayed in a user interface of the distributed order orchestration system. Thus, in the illustrated embodiment, user interface 1300 displays status code 1310 and display value 1320. Status code 1310 displays a status code for each status value defined within the status management framework. Display value 1320 displays a display value for each status value defined within the status management framework.

According to the embodiment, users can add, modify, and delete one or more status values using user interface 1300. In certain embodiments, users can add a status value using a first user sub-interface, where a user can enter a status code and a display value for a status value. In certain embodiments, users can edit a status value using a second user sub-interface, where a user can modify an existing status code and a display value for a status value. In certain embodiments, one or more status values are pre-defined within the status management framework, in addition to the one or more status values that are defined by users. These pre-defined status values can also be displayed within user interface 1300.

FIG. 14 illustrates an intersection table 1400 according to one embodiment. Intersection table 1400 includes one or more records, and each record includes a task instance identity, a fulfillment line identity, and a status value. Thus, the intersection table maps each status value to a task and a fulfillment line. According to the embodiment, intersection table 1400 includes three columns, task instance identity 1410, fulfillment line identity 1420, and status value 1430. Task instance identity 1410 stores a task instance identity for each record, fulfillment line identity 1420 stores a fulfillment line identity for each record, and status value 1430 stores a status value for each record.

Thus in the illustrated embodiment, intersection table 1400 includes five records. The first record includes a status value (i.e., "Scheduled") that is associated with a task instance identity of "1," which represents a first task. The status value is also associated with a fulfillment line identity of "1," which represents a first fulfillment line. The second record includes a status value (i.e., "Scheduled") that is also associated with the first task (i.e., task instance identity of "1"). The status value is also associated with a fulfillment line identity of "2," which represents a second fulfillment line. The third record includes a status value (i.e., "Shipped") that is associated with a task instance identity of "2," which represents a second task. The status value is also associated with a fulfillment line identity of "1," which represents the first fulfillment line. The fourth record includes a status value (i.e., "Awaiting Shipping") that is also associated with the second task (i.e., task instance identity of "2"). The status value is also associated with a fulfillment line identity of "2," which represents the second fulfillment line. The fifth record includes a status value (i.e., "In Progress") that is associated with a task instance identity of "3," which represents a third task. The status value is also associated with a fulfillment line identity of "1," which represents the first fulfillment line.

While intersection table 1400 includes five records, this is merely an example embodiment, and in alternate embodiments, intersection table 1400 can include any number of records. Furthermore, in alternate embodiments, intersection table 1400 may have a different format than the format illustrated in FIG. 14, and still be within a scope of the invention.

FIG. 15 illustrates an intersection table 1500 that includes task/fulfillment line status values, and a task status value 1540 according to one embodiment. Similar to intersection table 1400 of FIG. 14, intersection table 1500 includes three columns, task instance identity 1510, fulfillment line identity 1520, and status value 1530. As similarly described in relation to intersection table 1400 of FIG. 14, task instance identity 1510 stores a task instance identity for each record, fulfillment line identity 1520 stores a fulfillment line identity for each record, and status value 1530 stores a status value for each record.

In the illustrated embodiment of FIG. 15, intersection table 1500 includes five records. Each record includes a task instance identity of "1," which represents a task. The five records include a fulfillment line identity of "1," "2," "3," "4," and "5," respectively, which represents five fulfillments lines of the task. Each record includes a status value of "Complete." A status service analyzes the five records of intersection table 1500, determines that the status values for all five records are the same, and sets task status value 1540 to be the same as each of the status values (i.e., "Complete"). Thus, the status service sets a status value of the task represented by the task instance identity of "1" to "Complete."

FIG. 16 illustrates an intersection table that includes task/fulfillment line status values, and a task status value according to another embodiment. Similar to intersection table 1500 of FIG. 15, intersection table 1600 includes three columns, task instance identity 1610, fulfillment line identity 1620, and status value 1630. In the illustrated embodiment of FIG. 16, intersection table 1600 includes five records. Each record includes a task instance identity of "2," which represents a task, where the task is different from the task illustrated in FIG. 15. The five records include a fulfillment line identity of "1," "2," "3," "4," and "5," respectively, which represent five fulfillments lines of the task. Unlike the illustrated embodiment of FIG. 15, where the status values for all five records were the same, certain records illustrated in this embodiment include status values that are different from status values that are included in other records. More specifically, the status value of the first record, the second record, and the third record equals "Complete," whereas the status value of the fourth record and the fifth value equals "Started." A status service analyzes the five records of intersection table 1600, determines that the status values for the five records are different, and sets task status value 1640 to be a value that indicates the difference in the status values for the five records (i.e., "Various"). Thus, the status service sets a status value of the task represented by the task instance identity of "2" to "Various."

While the illustrated embodiments of FIGS. 15 and 16 previously described are examples of determining a status value of a task based on one or more task/fulfillment line status values, one of ordinary skill in the art would readily appreciate that these are non-limiting examples, and that in alternate embodiments, a status service can determine a status value of a task based on one or more task/fulfillment line status values using alternate logic. In certain embodiments, such logic can be customized by a user of a distributed order orchestration system.

Figure 17:
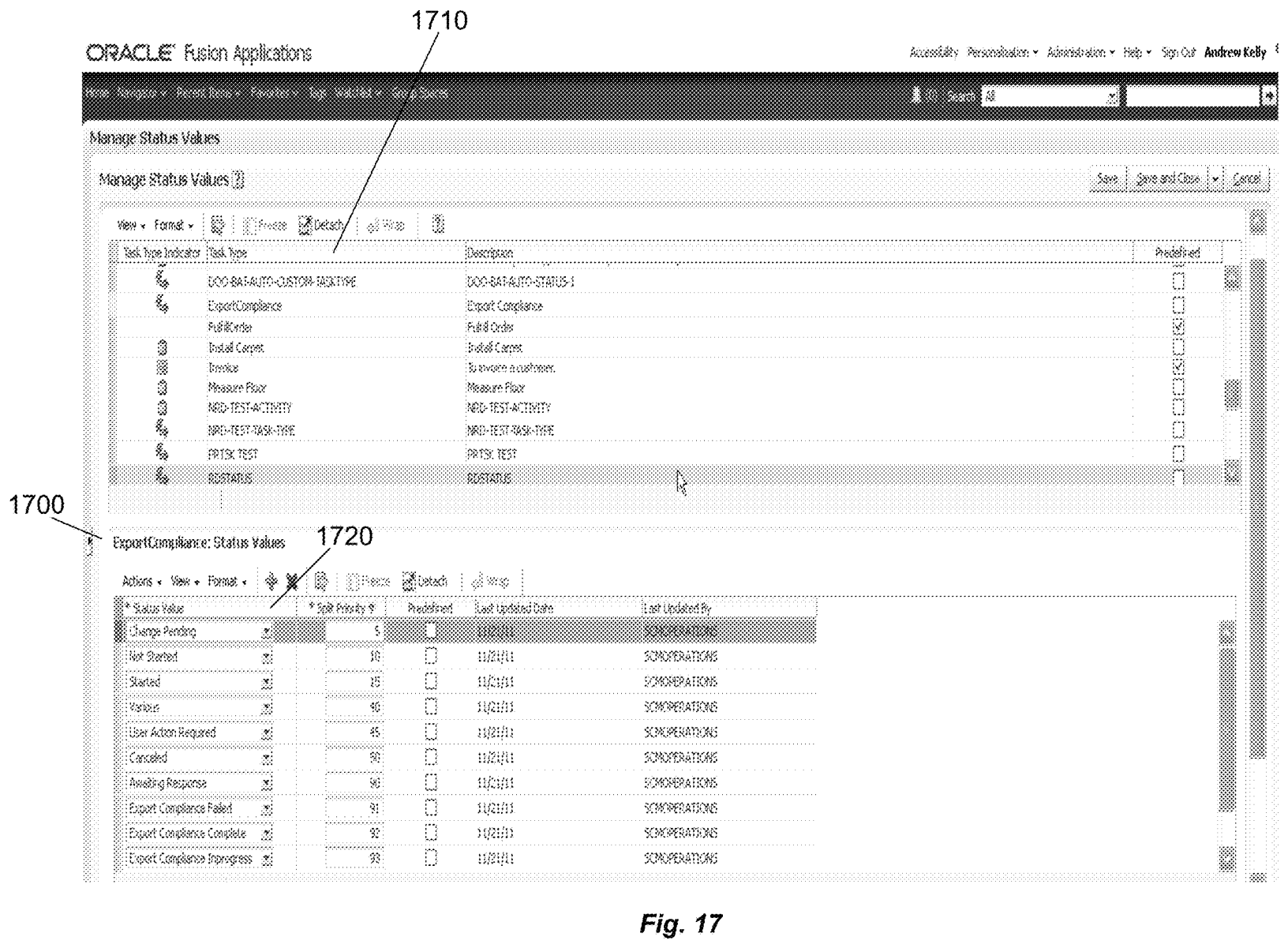

FIG. 17 illustrates a user interface 1700 for defining a list of task types and defining a list of possible status values for each task type according to one embodiment. User interface 1700 allows users of a distributed order orchestration system to define one or more task types that can be used by a status management framework. A task type is a collection of one or more tasks. Each task within a distributed order orchestration system can be associated with a task type. User interface 1700 further allows users to define one or more status values that can be associated with a task type. The status management framework can then assign one of the status values associated with the task type to each task that is also associated with the task type.

Thus, in the illustrated embodiment, user interface 1700 displays task type 1710. Task type 1710 displays one or more task types defined within a status management framework. User interface 1700 also displays status value 1720. Status value 1720 displays one or more status values defined with the status management framework and associated with the selected task type in task type 1710.

According to the embodiment, users can add, modify, and delete one or more status values using user interface 1700. Furthermore, for each task type defined within the status management framework, users can associate one or more status values with the task type using user interface 1700. In certain embodiments, users can associate one or more status values with the task type using a user sub-interface. More specifically, users can search the one or more status values defined within the status management framework based on status code and/or display name. The user sub-interface can then display one or more status values. More specifically, the user sub-interface can display a status code for one or more status values within the user sub-interface, and can display a display name for one or more status values within the user sub-interface.

Figure 18:
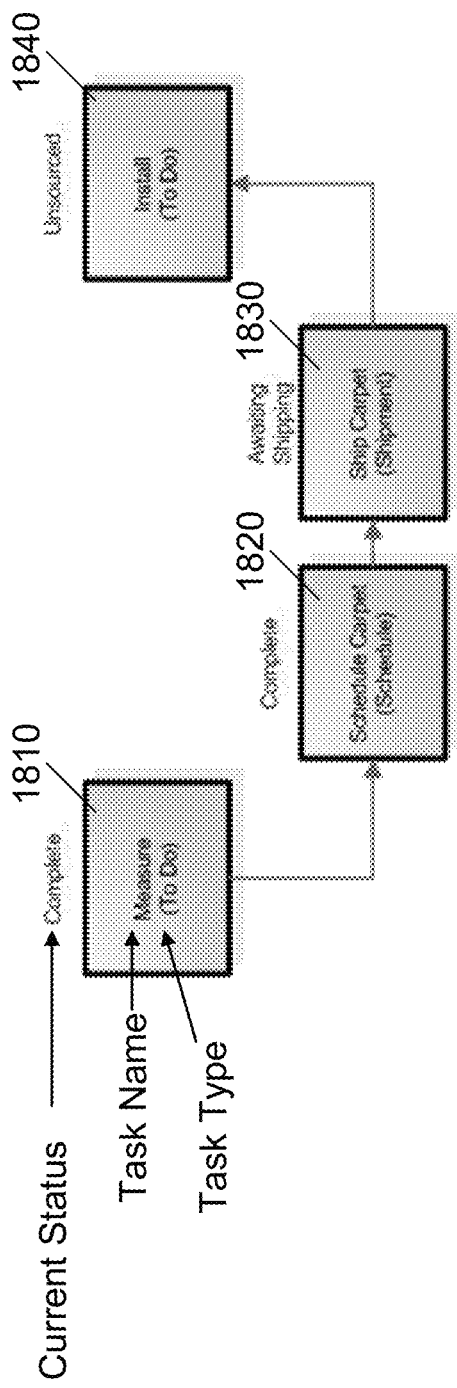
FIG. 18 illustrates a plurality of tasks associated with an orchestration process, and a plurality of orchestration process status conditions that are used to determine an orchestration process status value according to one embodiment.

FIG. 18 illustrates a plurality of tasks associated with an orchestration process, and a plurality of orchestration process status conditions that are used to determine an orchestration process status value according to one embodiment. Specifically, FIG. 18 illustrates tasks 1810, 1820, 1830, and 1840, which are all associated with an orchestration process "Carpets." Task 1810 has a task name of "Measure" and a task status value of "Complete." Task 1820 has a task name of "Schedule Carpet," and a task status value of "Complete." Task 1830 has a task name of "Ship Carpet," and a task status value of "Awaiting Shipping." Task 1840 has a task name of "Install," and a task status value of "Unsourced."

According to the embodiment, a status service can determines a status value for the orchestration process "Carpets," based on a task status value of tasks 1810, 1820, 1830, and 1840. More specifically, the status service can analyze each task status value of tasks 1810, 1820, 1830, and 1840. The status service can also evaluate orchestration process status conditions 1850, 1860, 1870, and 1880, which are each associated with the orchestration process "Carpets." As illustrated in FIG. 18, orchestration process status condition 1850 includes a status condition, "Measure=Unsourced," and thus, orchestration process status condition 1850 evaluates to a first Boolean value (such as true) when task 1810 has a task status value of "Unsourced." Orchestration process status condition 1850 also includes a sequence number, "1," that is associated with the status condition, and also includes a status value, "Started," that is also associated with the status condition. Further, orchestration process status condition 1860 includes a status condition, "Measure=Complete," and thus, orchestration process status condition 1860 evaluates to a first Boolean value (such as true) when task 1810 has a task status value of "Complete." Orchestration process status condition 1860 also includes a sequence number, "2," that is associated with the status condition, and also includes a status value, "Pre-Ship Tasks Complete," that is also associated with the status condition. Likewise, orchestration process status condition 1870 includes a status condition, "Ship Carpet=Shipped," and thus, orchestration process status condition 1870 evaluates to a first Boolean value (such as true) when task 1830 has a task status value of "Shipped." Orchestration process status condition 1870 also includes a sequence number, "3," that is associated with the status condition, and also includes a status value, "Shipped," that is also associated with the status condition. Finally, orchestration process status condition 1880 includes a status condition, "Install=Complete," and thus, orchestration process status condition 1880 evaluates to a first Boolean value (such as true) when task 1840 has a task status value of "Complete." Orchestration process status condition 1880 also includes a sequence number, "4," that is associated with the status condition, and also includes a status value, "Installed," that is also associated with the status condition.

According to the embodiment, when the status service evaluates orchestration process status conditions 1850, 1860, 1870, and 1880, the status service determines that only the status condition of orchestration process status condition 1860 evaluates to a first Boolean value (such as true). This is because the task status value of task 1810 is "Complete" rather than "Unsourced," because the task status value of task 1830 is not "Shipped," and because the task status value of task 1840 is not "Complete." Thus, the status service sets an orchestration process status value of the orchestration process "Carpets" equal to the status value of orchestration process status condition 1860 (i.e., "Pre-Ship Tasks Complete"). One of ordinary skill in the art would readily appreciate that this is only an example embodiment of a status service determining an orchestration process status value, and that in alternate embodiments, a status service can determine an orchestration process status value based on any configuration of tasks, and any configuration of orchestration process status conditions.

Figure 19:
FIG. 19 illustrates a user interface for associating a split priority with each task status value of a task type values according to one embodiment.

FIG. 19 illustrates a user interface 1900 for associating a split priority with each task status value of a task type values according to one embodiment. User interface 1900 allows users of a distributed order orchestration system to associate a split priority with one or more task type values. As previously described, a split priority can be used where a task splits into two or more tasks, and there may be duplicate tasks that have different task status values associated with them. A split priority determines which task status value should be selected as an orchestration process status value, where one or more duplicate tasks are associated with the orchestration process.

Thus, in the illustrated embodiment, user interface 1900 displays status value 1910. Status value 1910 displays one or more task status values defined for a task type within a status management framework. User interface 1900 also displays split priority 1920. Split priority 1920 displays a split priority for each task status value that is defined with the status management framework and associated with the task status value. According to the embodiment, users can associate a split priority with each task status value for a task type. Thus, users can associate a split priority for each task type defined within the status management framework. In the illustrated embodiment, a split priority is represented by a numerical value (e.g., 5, 10, 15, 40, 45, 50, 90, 91, 92, or 93), where the lower the numerical value, the higher the priority, and vice-versa. However, this is merely an example embodiment, and in alternate embodiments, a split priority can be presented in other ways. For example, in an alternate embodiment, a split priority can be represented by a numerical value, where the higher the numerical value, the higher the priority. In another alternate embodiment, a split priority can be represented by an alphabetical value (e.g., A, B, C, or D).

Figure 20:
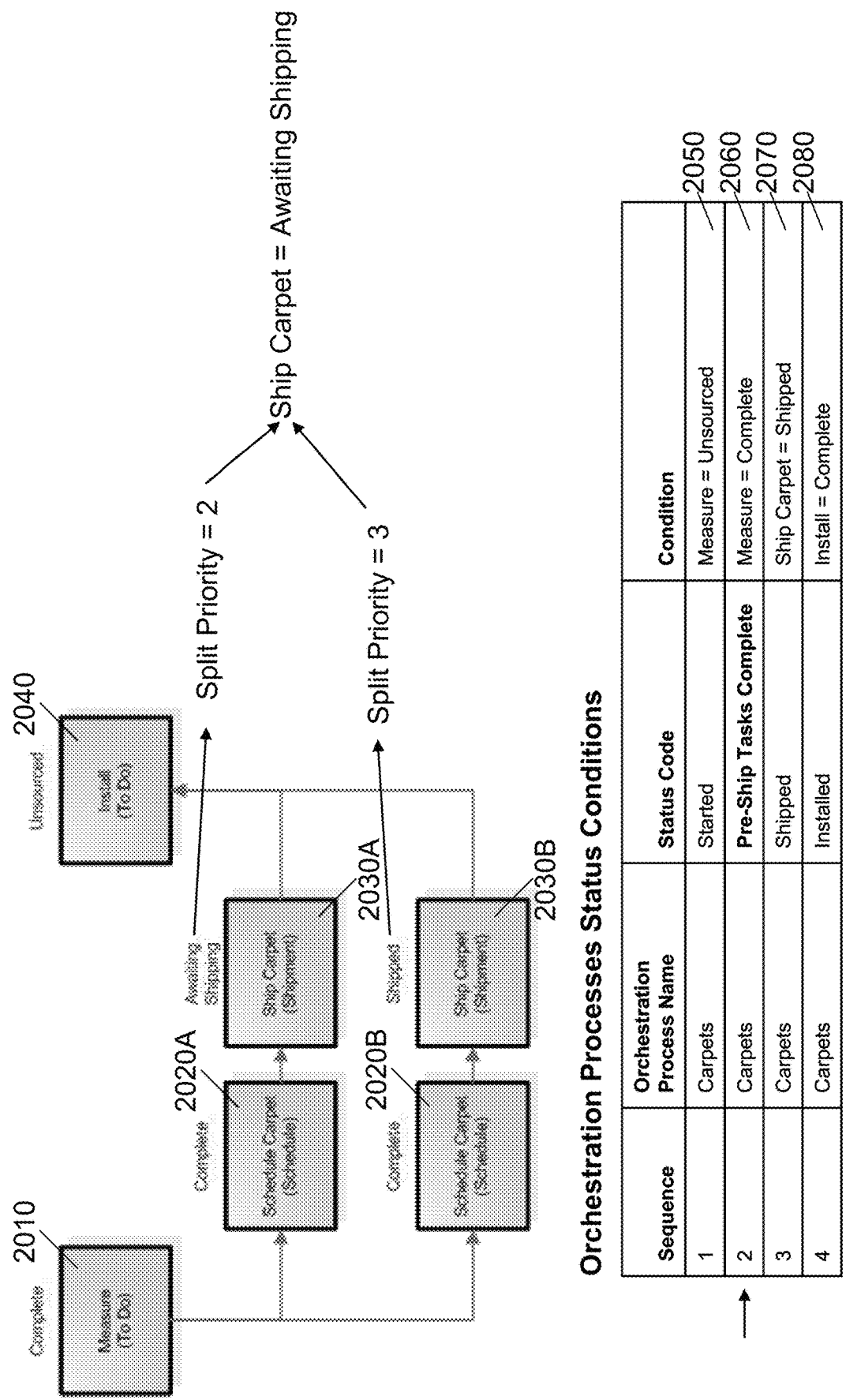
FIG. 20 illustrates a plurality of tasks associated with an orchestration process, and a plurality of orchestration process status conditions that are used to determine an orchestration process status value according to another embodiment.

FIG. 20 illustrates a plurality of tasks associated with an orchestration process, and a plurality of orchestration process status conditions that are used to determine an orchestration process status value according to another embodiment. The illustrated embodiment of FIG. 20 is similar to the illustrated embodiment of FIG. 18, but in the illustrated embodiment of FIG. 20, two tasks of an orchestration process have each split into two duplicate tasks, thus, creating four tasks (in addition to the two other tasks that have not split, for a total of six tasks). Specifically, FIG. 20 illustrates tasks 2010, 2020A, 2020B, 2030A, 2030B, and 2040, which are all associated with an orchestration process "Carpets." Tasks 2010 and 2040 are identical to tasks 1810 and 1840 of FIG. 18, and are not described in further detail. Tasks 2020A and 2020B are duplicate tasks that each have a task name of "Schedule Carpet," and each have a task status value of "Complete." Tasks 2030A and 2030B are also duplicate tasks that each have a task name of "Ship Carpet." However, task 2030A has a task status value of "Awaiting Shipping," and task 2030B has a task status value of "Shipped." In order to resolve the two different task status values of tasks 2030A and 2030B, a split priority is associated with each task status value. In the illustrated embodiment, the task status value of task 2030A is associated with a split priority of "2," and the task status value of task 2030B is associated with a split priority of "3." According to the embodiment, a split priority with a lower numerical value is given priority over a split priority with a higher numerical value. Thus, task 2030A is given priority over task 2030B, and the task status value of task 2030A (i.e., "Awaiting Shipping") is used for purposes of evaluating the orchestration process status conditions and determining an orchestration process status value.

According to the embodiment, a status service can determines a status value for the orchestration process "Carpets," based on a task status value of tasks 2010, 2020A, 2030A, and 2040. More specifically, the status service can analyze each task status value of tasks 2010, 2020A, 2030A, and 2040. The status service can ignore the task status value of task 2020B because the task status value of task 2020B is the same as the task status value of task 2020A. The status service can ignore the task status value of task 2030B because the task status value of task 2030B has a lower split priority than the task status value of task 2030B. The status service can also evaluate orchestration process status conditions 2050, 2060, 2070, and 2080, which are each associated with the orchestration process "Carpets." Orchestration process status conditions 2050, 2060, 2070, and 2080 are identical to orchestration process status conditions 1850, 1860, 1870, and 1880 of FIG. 18, and are not further described in greater detail.

According to the embodiment, when the status service evaluate orchestration process status conditions 2050, 2060, 2070, and 2080, the status service determines that only the status condition of orchestration process status condition 2060 evaluates to a first Boolean value (such as true). This is because the task status value of task 2010 is "Complete" rather than "Unsourced," because the task status value of task 2030A (which has the higher split priority) is not "Shipped," and because the task status value of task 2040 is not "Complete." Thus, the status service sets an orchestration process status value of the orchestration process "Carpets" equal to the status value of orchestration process status condition 2060 (i.e., "Pre-Ship Tasks Complete"). One of ordinary skill in the art would readily appreciate that this is only an example embodiment of a status service determining an orchestration process status value, and that in alternate embodiments, a status service can determine an orchestration process status value based on any configuration of tasks, any configuration of orchestration process status conditions, and any configuration of split priority.

Figure 21:
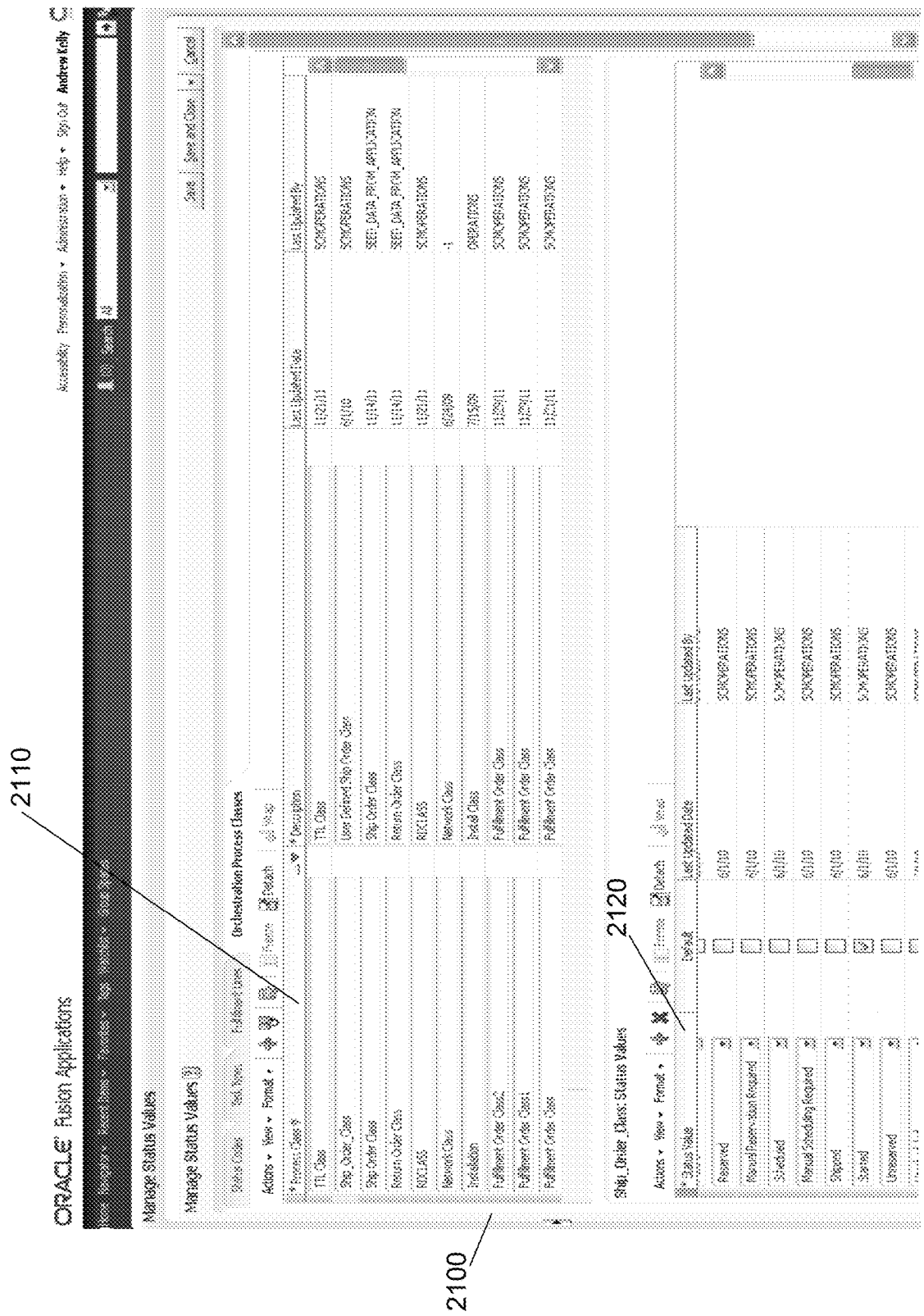
FIG. 21 illustrates a user interface for defining a list of orchestration process classes and defining a list of possible status values for each orchestration process class according to one embodiment.

FIG. 21 illustrates a user interface 2100 for defining a list of orchestration process classes and defining a list of possible status values for each orchestration process class according to one embodiment. User interface 2100 allows users of a distributed order orchestration system to define one or more orchestration process classes that can be used by a status management framework. A orchestration processes class can be associated with one or more orchestration processes. Each orchestration process within a distributed order orchestration system can be associated with a orchestration process class. User interface 2100 further allows users to define one or more status values that can be associated with a orchestration process class. The status management framework can then assign one of the status values associated with the orchestration process class to each orchestration process that is also associated with the orchestration process class.

Thus, in the illustrated embodiment, user interface 2100 displays process class 2110. Process class 2110 displays one or more orchestration process classes defined within a status management framework. User interface 2100 also displays status value 2120. Status value 2120 displays one or more status values defined with the status management framework and associated with the selected orchestration process class in process class 2110.

According to the embodiment, users can add, modify, and delete one or more orchestration process classes using user interface 2100. Furthermore, for each orchestration process class defined within the status management framework, users can associate one or more status values with the orchestration process class using user interface 2100.

Figure 22:
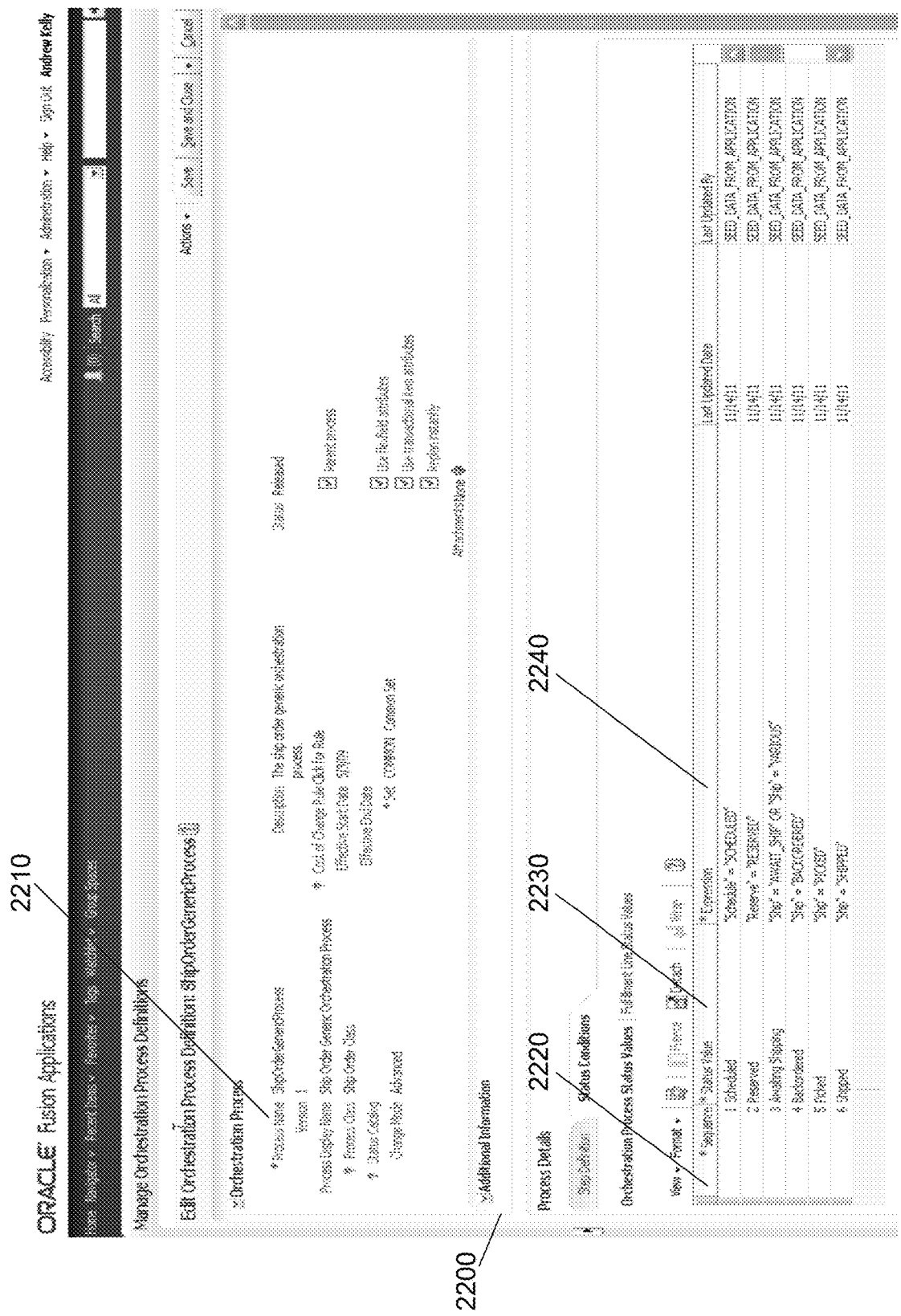
FIG. 22 illustrates a user interface for defining a list of orchestration process status conditions and defining logic for each orchestration process status condition according to one embodiment.

FIG. 22 illustrates a user interface for defining a list of orchestration process status conditions and defining logic for each orchestration process status condition according to one embodiment. User interface 2200 allows users of a distributed order orchestration system to define one or more orchestration process status conditions that can be used by a status management framework. An orchestration process status condition includes condition logic that evaluates to one of two Boolean values (such as true or false) based on the task status values that are associated with the orchestration process. The status management framework can then utilize the orchestration process status conditions to determine a status value for the orchestration process based on a task status value of each task associated with the orchestration process.

Thus, in the illustrated embodiment, user interface 2200 displays process name 2210. Process name 2210 displays an orchestration process defined within a status management framework. User interface 2200 also displays sequence 2220, status value 2230, and expression 2240. Sequence 2220 displays one or more sequence numbers, where each sequence number is associated with an orchestration process status condition that is defined within the status management framework, and is associated with the orchestration process in process name 2210. Status value 2230 displays one or more orchestration process status values, where each orchestration process status value is associated with an orchestration process status condition that is defined within the status management framework, and is associated with the orchestration process in process name 2210. Expression 2240 displays one or more conditions, where each condition is associated with an orchestration process status condition that is defined within the status management framework, and is associated with the orchestration process in process name 2210.

According to the embodiment, users can add, modify, and delete one or more orchestration process status conditions using user interface 2200. More specifically, users can create one or more orchestration process status conditions, where, for each orchestration process status condition, users can associate the orchestration process status condition with a sequence number, an orchestration process status value, a condition, or a combination therein. Users can also modify one or more orchestration process status conditions by modifying a sequence number, an orchestration process status value, a condition, or combination therein. Regarding a condition, users can create or modify a condition of an orchestration process status condition using a user sub-interface. More specifically, users can create or modify a condition using a condition window. A condition window allows a user to combine one or more tasks, and one or more operators, to create or modify a condition of a fulfillment line status condition.

FIG. 23 illustrates an intersection table 2300 that includes task/fulfillment line status values, and a plurality of fulfillment line status conditions that are used to determine a fulfillment line status value 2340 according to one embodiment. Similar to intersection table 1400 of FIG. 14, intersection table 2300 includes three columns, task instance identity 2310, fulfillment line identity 2320, and status value 2330. As similarly described in relation to intersection table 1400 of FIG. 14, task instance identity 2310 stores a task instance identity for each record, fulfillment line identity 2320 stores a fulfillment line identity for each record, and status value 2330 stores a status value for each record.

In the illustrated embodiment of FIG. 23, intersection table 2300 includes four records. Each record includes a fulfillment line identity of "1," which represents a fulfillment line. The four records include a task identity of "1," "2," "3," and "4," respectively, which represents four tasks of the fulfillment line. Each record includes a status value of "Complete."

According to the embodiment, a status service can determines a status value for the fulfillment line with a fulfillment line identity of "1," based on the task/fulfillment line status values of intersection table 2300. More specifically, the status service can evaluate fulfillment line status conditions 2340, 2350, 2360, and 2370, which are each associated with the fulfillment line with a fulfillment line identity of "1," based on the task/fulfillment line status values of intersection table 2300. As illustrated in FIG. 23, fulfillment line status condition 2340 includes a status condition, "2=Not Complete," and thus, fulfillment line status condition 2340 evaluates to a first Boolean value (such as true) when a task/fulfillment line status value associated with a fulfillment line identity of "1," and a task instance identity of "2," has a status value of "Not Complete." Fulfillment line status condition 2340 also includes a sequence number, "1," that is associated with the status condition, and also includes a status value, "Unscheduled," that is also associated with the status condition. Further, fulfillment line status condition 2350 includes a status condition, "2=Complete," and thus, fulfillment line status condition 2350 evaluates to a first Boolean value (such as true) when a task/fulfillment line status value associated with a fulfillment line identity of "1," and a task instance identity of "2," has a status value of "Complete." Fulfillment line status condition 2350 also includes a sequence number, "2," that is associated with the status condition, and also includes a status value, "Scheduled," that is also associated with the status condition. Likewise, fulfillment line status condition 2360 includes a status condition, "4=Not Complete," and thus, fulfillment line status condition 2360 evaluates to a first Boolean value (such as true) when a task/fulfillment line status value associated with a fulfillment line identity of "1," and a task instance identity of "4," has a status value of "Not Complete." Fulfillment line status condition 2360 also includes a sequence number, "3," that is associated with the status condition, and also includes a status value, "Awaiting Shipping," that is also associated with the status condition. Finally, fulfillment line status condition 2370 includes a status condition, "4=Complete," and thus, fulfillment line status condition 2370 evaluates to a first Boolean value (such as true) when a task/fulfillment line status value associated with a fulfillment line identity of "1," and a task instance identity of "4," has a status value of "Complete." Fulfillment line status condition 2370 also includes a sequence number, "4," that is associated with the status condition, and also includes a status value, "Shipped," that is also associated with the status condition.

According to the embodiment, when the status service evaluates fulfillment line status conditions 2340, 2350, 2360, and 2370, the status service determines that both a status condition of fulfillment line status condition 2350 and a status condition of fulfillment line status condition 2370 evaluate to a first Boolean value (such as true). This is because a task/fulfillment line status value associated with a fulfillment line identity of "1," and a task instance identity of "2," has a status value of "Complete," and a task/fulfillment line status value associated with a fulfillment line identity of "1," and a task instance identity of "4," has a status value of "Complete." The status service further determines that the task/fulfillment line status value associated with a fulfillment line identity of "1," and a task instance identity of "4," is associated with a higher sequence number (i.e., "4"). Thus, the status service sets fulfillment line status value 2380 equal to the status value of fulfillment line status condition 2370 (i.e., "Shipped"). One of ordinary skill in the art would readily appreciate that this is only an example embodiment of a status service determining a fulfillment line status value, and that in alternate embodiments, a status service can determine a fulfillment line status value based on any configuration of task/fulfillment line status values, and any configuration of fulfillment line status conditions.

Figure 24:
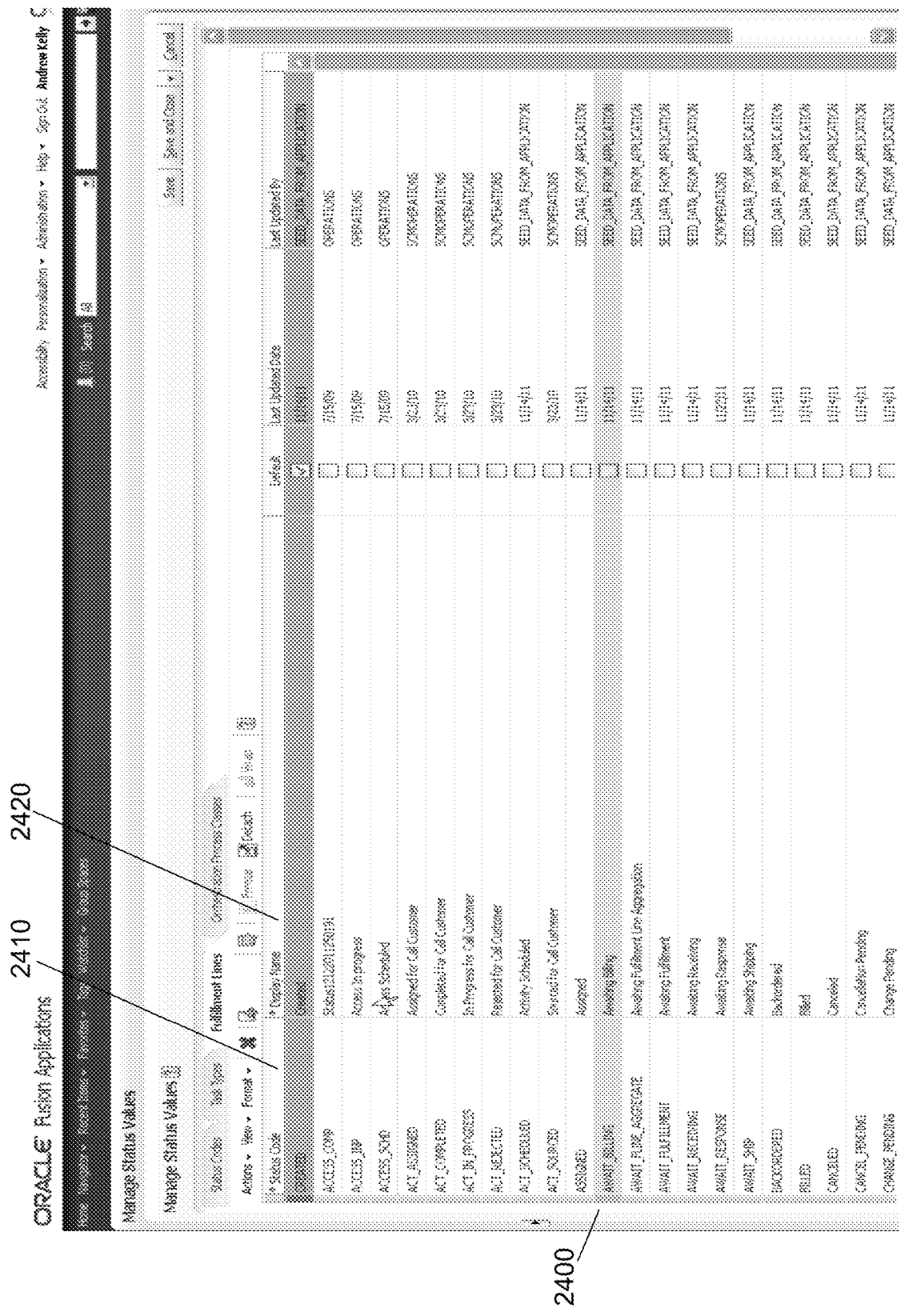
FIG. 24 illustrates a user interface for defining a list of possible fulfillment line status values according to one embodiment.

FIG. 24 illustrates a user interface 2400 for defining a list of possible fulfillment line status values according to one embodiment. User interface 2400 allows users of a distributed order orchestration system to define one or more fulfillment line status values that can be used by a status management framework.

According to the embodiment, each fulfillment line status value includes a status code and a display value. The status code is an internal fulfillment line status value that is used by the status management framework of the distributed order orchestration system. The display value is the external fulfillment line status value that is displayed in a user interface of the distributed order orchestration system. Thus, in the illustrated embodiment, user interface 2400 displays status code 2410 and display value 2420. Status code 2410 displays a status code for each fulfillment line status value defined within the status management framework. Display value 2420 displays a display value for each fulfillment line status value defined within the status management framework.

According to the embodiment, for each fulfillment line defined within the status management framework, users can associate one or more status values with the fulfillment line using user interface 2400. In certain embodiments, users can associate one or more status values with the fulfillment line using a user sub-interface. More specifically, users can search the one or more fulfillment line status values defined within the status management framework based on status code and/or display name. The user sub-interface can then display one or more fulfillment line status values. More specifically, the user sub-interface can display a status code for one or more fulfillment line status values within the user sub-interface, and can display a display name for one or more fulfillment line status values within the user sub-interface.

Figure 25:
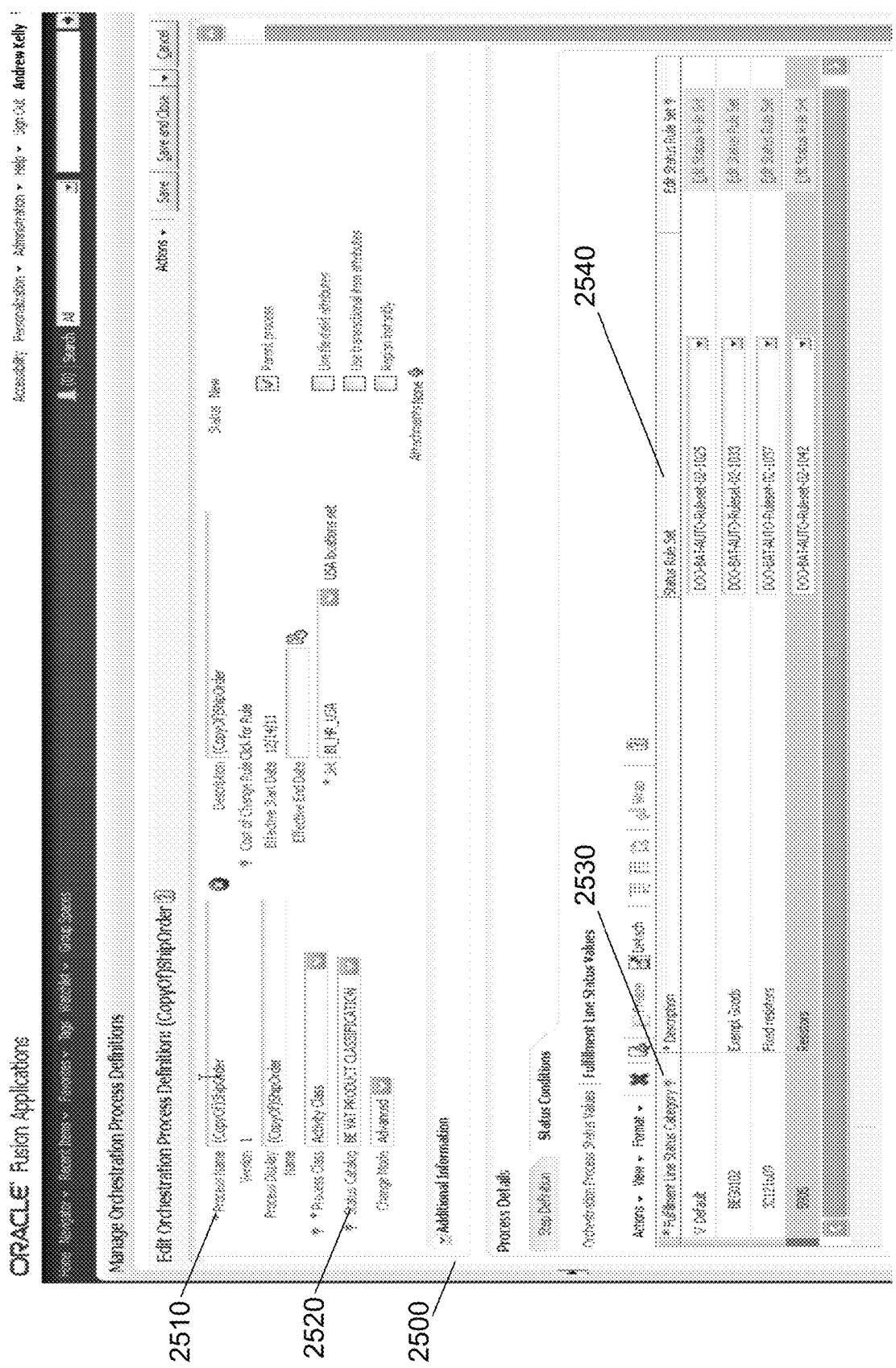
FIG. 25 illustrates a user interface for defining a list of possible status categories according to one embodiment.

FIG. 25 illustrates a user interface 2500 for defining a list of possible status categories according to one embodiment. User interface 2500 allows users of a distributed order orchestration system to define one or more status categories that can be used by a status management framework. A status category is a category associated with a rule set, where a rule set comprises one or more fulfillment line status conditions. Thus, each fulfillment line can be associated with a status category, and thus, associated with a rule set (i.e., one or more fulfillment line status conditions).

Thus, in the illustrated embodiment, user interface 2500 displays process name 2510. Process name 2510 displays an orchestration process defined within a status management framework. User interface 2500 also displays status catalog 2520. A status catalog is a collection of one or more status categories, where the status catalog is defined within a status management framework. A status catalog can be associated with one or more orchestration processes. Thus, status catalog 2520 displays a status catalog defined within the status management framework, where the status catalog is associated with the orchestration process displayed in process name 2510.

According to the illustrated embodiment, user interface 2500 displays status category 2530. Status category 2530 displays one or more status categories that comprise a status catalog, where the status catalog is associated with the orchestration process in process name 2510. User interface 2500 also displays status rule set 2540. Status rule set 2540 displays one or more rule sets defined within a status management framework, where each rule set is associated with a status category displayed in status category 2530. In certain embodiments, user interface 2500 also displays an item (not shown in FIG. 25). As previously described, an orchestration process can be associated with a status catalog, and a fulfillment line that is associated with the orchestration process can include an item attribute. A value of the item attribute can be identical to a value of an item within the status catalog associated with the orchestration process. Based on the item attribute, a fulfillment line can be associated with a status category that comprises the item, and thus, the fulfillment line can be associated with the rule set that is associated with the status category. Thus, in certain embodiments, user interface 2500 displays one or more items associated with a status category displayed in status category 2530.

Figure 26:
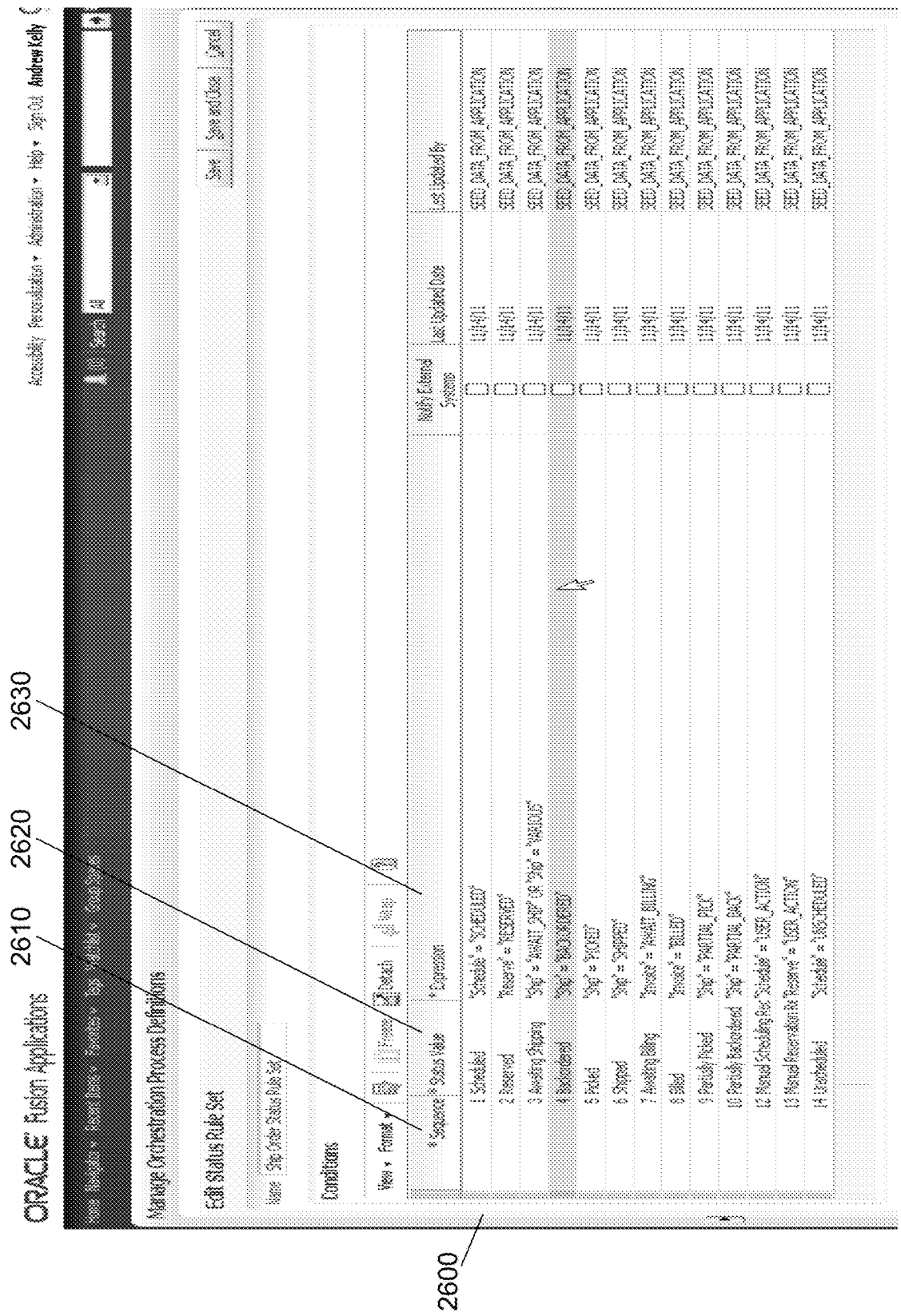
FIG. 26 illustrates a user interface for defining a list of possible rule sets according to one embodiment.

FIG. 26 illustrates a user interface 2600 for defining a list of possible rule sets according to one embodiment. User interface 2600 allows users of a distributed order orchestration system to define one or more rule sets that can be used by a status management framework. A rule set comprises one or more fulfillment line status conditions. Thus, user interface 2600 also allows users of the distributed order orchestration system to define one or more fulfillment line status conditions that can be used by a status management framework. A fulfillment line status condition includes condition logic that evaluates to one of two Boolean values (such as true or false) based on the task/fulfillment line status values that are associated with the fulfillment line. The status management framework can then utilize the fulfillment line status conditions to determine a status value for the fulfillment line based on a task/fulfillment line status value of each task/fulfillment line associated with the fulfillment line.

Thus, in the illustrated embodiment, user interface 2600 displays sequence 2610, status value 2620, and expression 2630. Sequence 2610 displays one or more sequence numbers, where each sequence number is associated with a fulfillment line status condition that is defined within the status management framework, and is associated with a rule set. Status value 2620 displays one or more fulfillment line status values, where each fulfillment line status value is associated with a fulfillment line status condition that is defined within the status management framework, and is associated with the rule set. Expression 2630 displays one or more conditions, where each condition is associated with a fulfillment line status condition that is defined within the status management framework, and is associated with the rule set.

According to the embodiment, users can add, modify, and delete one or more fulfillment line status conditions for a specific rule set using user interface 2600. More specifically, users can create one or more fulfillment line status conditions, where, for each fulfillment line status condition, users can associate the fulfillment line status condition with a sequence number, a fulfillment line status value, a condition, or a combination therein. Users can also modify one or more fulfillment line status conditions by modifying a sequence number, a fulfillment line status value, a condition, or combination therein. Regarding a condition, users can create or modify a condition of a fulfillment line status condition using a user sub-interface. More specifically, users can create or modify a condition using a condition window. As previously described, a condition window allows a user to combine one or more tasks, and one or more operators, to create or modify a condition of a fulfillment line status condition.

Figure 27:
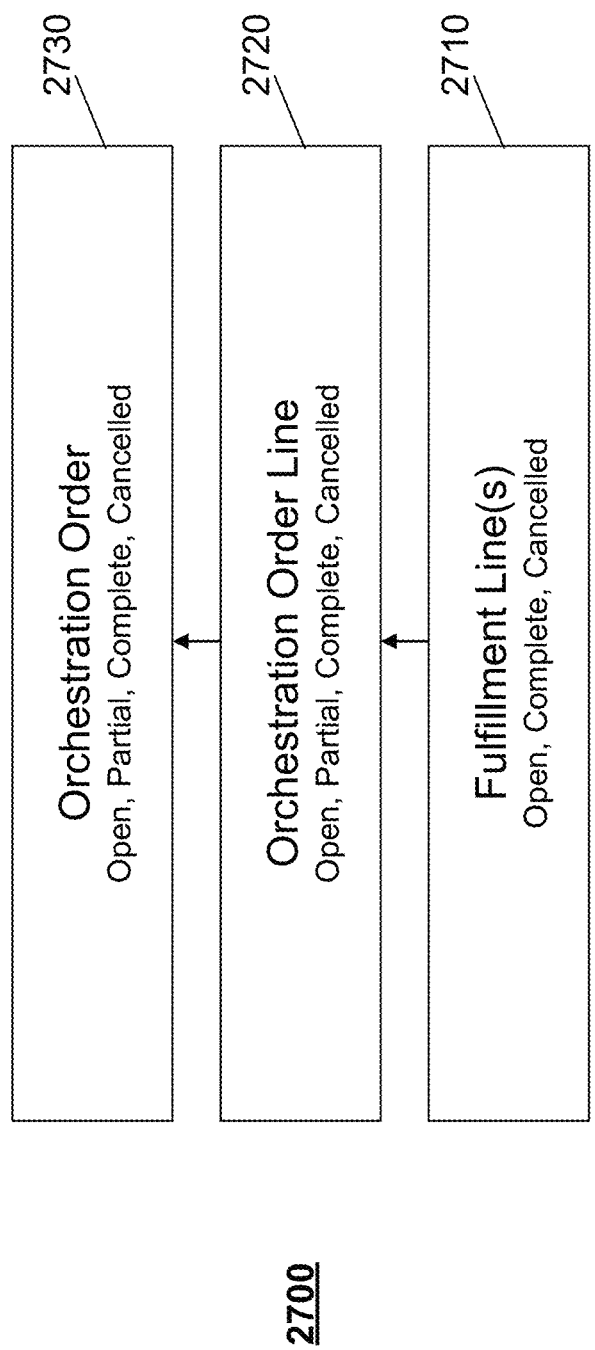
FIG. 27 illustrates a flow chart for determining an order line status value and for determining an order status value according to one embodiment.
Figure 28:
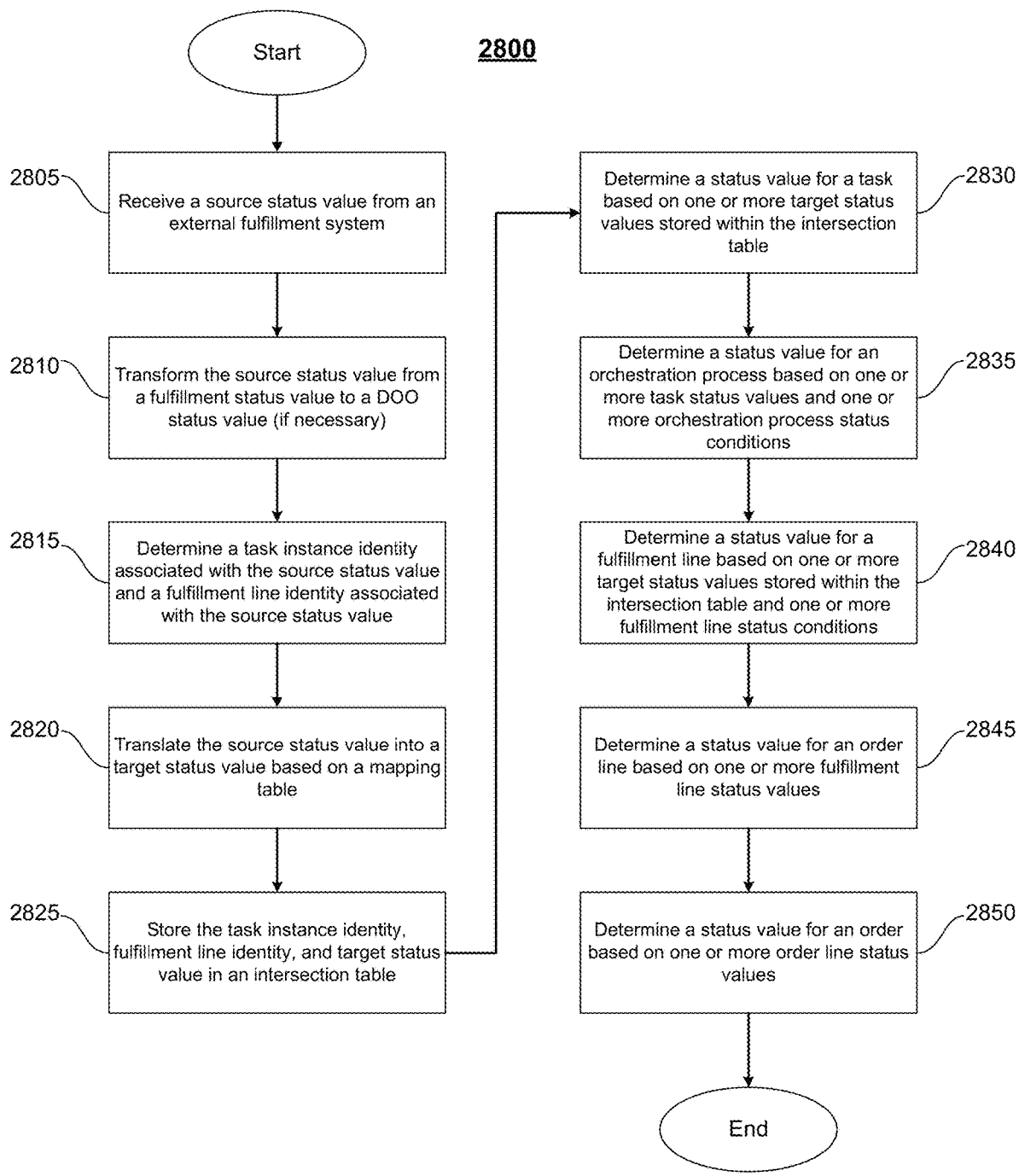
FIG. 28 illustrates a flow diagram of the functionality of a status management module according to an embodiment of the invention.

FIG. 27 illustrates a flow chart 2700 for determining an order line status value and for determining an order status value according to one embodiment. At 2710, a fulfillment line status value is determined, as previously described. According to the embodiment, a fulfillment line can have a fulfillment line status value associated with it, where the fulfillment line status value can be (among other status values), one of three status values, where a first status value indicates that a fulfillment line is open, a second status value indicates that a fulfillment line is closed, and a third status value indicates that a fulfillment line is cancelled. In one embodiment, the first status value can be a status value of "Open," the second status value can be a status value of "Closed," and the third status value can be a status value of "Cancelled."

At 2720, an order line status value is determined for an order line based on one or more fulfillment line status values that are associated with the order line. If all of the one or more fulfillment line status values are a first status value that indicates that a fulfillment line is open, then the order line status value is determined to be a first status value that indicates that the order line is open. For example, if all of the one or more fulfillment line status values are a status value of "Open," then the order line status value is determined to be a status value of "Open." If all of the one or more fulfillment line status values are a second status value that indicates a fulfillment line is closed, then the order line status value is determined to be a second status value that indicates that the order line is closed. For example, if all of the one or more fulfillment line status values are a status value of "Closed," then the order line status value is determined to be a status value of "Closed." If all of the one or more fulfillment line status values are a third status value that indicates a fulfillment line is cancelled, then the order line status value is determined to be a third status value that indicates that the order line is cancelled. For example, if all of the one or more fulfillment line status values are a status value of "Cancelled," then the order line status value is determined to be a status value of "Cancelled." If some of the one or more fulfillment line status values are a first value that indicates a fulfillment line is open, and some of the one or more fulfillment line status values are a second value that indicates a fulfillment line is closed, then the order line status value is determined to be a fourth status value that indicates that the order line is partially open. For example, is some of the one or more fulfillment line status values are a status value of "Open," and some of the one or more fulfillment line status values are a status value of "Closed," then the order line status value is determined to be a status value of "Partial."

At 2730, an order status value is determined for an order based on one or more order line status values that are associated with the order. If all of the one or more order line status values are a first status value that indicates that an order line is open, then the order status value is determined to be a first status value that indicates that the order is open. For example, if all of the one or more order line status values are a status value of "Open," then the order status value is determined to be a status value of "Open." If all of the one or more order line status values are a second status value that indicates an order line is closed, then the order status value is determined to be a second status value that indicates that the order is closed. For example, if all of the one or more order line status values are a status value of "Closed," then the order status value is determined to be a status value of "Closed." If all of the one or more order line status values are a third status value that indicates an order line is cancelled, then the order status value is determined to be a third status value that indicates that the order is cancelled. For example, if all of the one or more order line status values are a status value of "Cancelled," then the order status value is determined to be a status value of "Cancelled." If some of the one or more order line status values are a first value that indicates an order line is open, and some of the one or more order line status values are a second value that indicates an order line is closed, then the order status value is determined to be a fourth status value that indicates that the order is partially open. For example, is some of the one or more order line status values are a status value of "Open," and some of the one or more order line status values are a status value of "Closed," then the order status value is determined to be a status value of "Partial."

In certain embodiments, a status management framework includes logic to accommodate specialized use cases. Such specialized use cases, and the logic to accommodate them, are described below in greater detail.

Change Management-Related Handling of Status Value Updates:

When a change to an order occurs (either through a change order received by an order capture system, or a change made by a user through a workbench), a status service of a status management framework can set a status value to a value that indicates a change has occurred (such as "Change Pending") for the following: (1) all completed or in-process tasks; (2) fulfillment lines affected by the change; and (3) orchestration processes affected by the change. Once an orchestration system begins to compensate for the change, the status service changes all status values that were previously set to a status value that indicates a change has occurred. In some cases where the change does not affect a status value, the status service changes the status value back to the previous status value. In other cases where the change does affect the status value, the status service changes the status value to a new status value.

When a cancellation request occurs (through a change order that is received by an order capture system), a status service of a status management framework can set a status value to a value that indicates a cancellation request has occurred (such as "Cancel Pending") for the following: (1) all completed or in-process tasks; (2) fulfillment lines affected by the cancellation request; and (3) orchestration processes affected by the cancellation request. As an orchestration process communicates the cancellation request to each external fulfillment system, a task layer indicates to a status service of the status management framework that a task/fulfillment line status value is "Cancelled." Once all status values for all tasks (that have previously completed or were in progress) in the orchestration process have been set to a status value of "Cancelled," status values of the one or more fulfillment lines and the orchestration process are also set to "Cancelled." Once status values of the one or more fulfillment lines have been set to a status value of "Cancelled," a status service sets a status value of an order line and order accordingly (if the status values of all fulfillment lines have been set to "Cancelled," then a status value of the order line is set to "Cancelled;" same applies for one or more order lines and order). If there are any lines on the order that do not have a status value of "Cancelled," then the status value of the order line and/or order is set to another status value (e.g., "Open," "Closed," or "Partial").

Ignoring Cancellation Status:

A status service of a status management framework can ignore task/fulfillment lines with a status value of "Cancelled" in an intersection table when determining a status value for one or more tasks. As an example, if there are four fulfillment lines associated with a schedule task, then an intersection table will include four records with a status value of "Scheduled." However, if an order capture system cancels one of the fulfillment lines, the intersection table is updated to include three records with a status value of "Scheduled," and a fourth record with a status value of "Cancelled." In this example, the status service can ignore the fourth record with a status value of "Cancelled," and determine a task status value of "Scheduled" for the schedule task.

Models:

In certain embodiments, a fulfillment line has a hierarchy that includes a model and components. For example, a fulfillment line can include a computer model, where the computer model contains components, such as hard disk drive, memory, and processor. While a user typically views and acts on the model, a task layer usually sends the components as child lines to external fulfillment systems. This can result in a model fulfillment line being filtered out from a request to an external fulfillment system, which in turn, can result in an intersection table having few, if any, records for the model itself.

In these embodiments, where a child of a model is sent to an external fulfillment system, an additional record is inserted into an intersection table for the model. A status value for the model is determined in a similar way as it is for the task. If all the children of the model have the same status value for the task, then the model shares the same status value. If the children have mixed status values, then the model has a status value of "Various," (as indicated in the intersection table). A status value for a model fulfillment line is determined as previously described.

Not Applicable:

In certain embodiments when an orchestration process reaches a task and determines that all fulfillment lines have been filtered out (meaning that there is no payload to send to an external fulfillment system), a status service of the status management framework can set a task status value to a status value of "Not Applicable."

Various:

In certain embodiments, where a task layer provides different task/fulfillment line statuses for a given task, a status service of the status management framework can set a task status value to a status value of "Various," since there is no one status value that accurately reflects a status of the task.

Various Completed:

In certain task layer services, there are multiple status values that could indicate that a task is complete. As an example, for a returns task, a task status value can be set to either a status value of "Delivered," or a status value of "Rejected," where either status value indicates a completion of the returns task. An ability of an orchestration process to move on past a task is based on whether the task's exit criteria are met, where the exit criteria is determined by a task status value of the task. In an orchestration process, there is validation to ensure that an administrator defines a final wait step as waiting for a status value that indicates completion.

However, in scenarios similar to the scenario described in relation to the returns task, it is possible that an intersection table can have multiple distinct task/fulfillment line status values that are all completion status values. In normal processing, as previously described, this would yield a status value of "Various." However, in this scenario, a wait step in an orchestration process could never be evaluated to a first Boolean value (such as true), since a status value of the returns task is neither "Returned," nor "Delivered." In these embodiments, a status service of the status management framework can use a status value of "Completed—Various." This allows an orchestration process to exit the returns task, and move on even in light of mixed status values in the intersection table.

Initial Status Values:

In certain embodiments, administrator can determine a default status value for one or more fulfillment lines, tasks, and orchestrations process. This can be determined by a "default flag" in a setup user interface. The default status values can be used as the corresponding objects are initial created to set a status of each object correctly.

FIG. 28 illustrates a flow diagram 2800 of the functionality of a status management module according to an embodiment of the invention. At 2805, a source status value is received from an external fulfillment system. The source status value can be stored with a status message that is received from an external fulfillment system. The source status value can be either a distributed order orchestration status value or a fulfillment system status value. In alternate embodiments, the status message that is received from the external fulfillment system does not include a source status value, but instead includes information associated with a request previously sent by a distributed order orchestration system to the external fulfillment system. In these embodiments, a source status value can be inferred from the information stored within the status message. The flow then proceeds to 2810.

At 2810, if the received source status value is a fulfillment system status value, the fulfillment system status value is transformed into a distributed order orchestration status value. The transformation of the fulfillment system status value can be performed by a DVM, where a DVM is a component within the distributed order orchestration system that includes one or more mappings, where each mapping maps a fulfillment system status value with a distributed order orchestration status value. The DVM can identify a mapping that corresponds to the received fulfillment system status value, and use the mapping to transform the received fulfillment system status value into a corresponding distributed order orchestration status value. In certain embodiments, the DVM can be seeded with expected fulfillment system status values and corresponding distributed order orchestration status values. In other embodiments, a user can customize the one or more mappings included within the DVM, where the customization can include creating new mappings, deleting existing mappings, or updating existing mappings. The transformation of 2810 is only performed in embodiments where the received source status value is a fulfillment system status value. In embodiments where the received source status value is a distributed order orchestration status value, the transformation of 2810 is not performed. The flow then proceeds to 2815.

At 2815, a task instance identity associated with the source status value is determined, and a fulfillment line identity associated with the source status value is determined. In certain embodiments, the received source status value can be stored with a status message that is received from an external fulfillment system, and the task instance identity and the fulfillment line identity can be determined based on information that is also stored within the status message. The task instance identity can identify a task of the distributed order orchestration system. The fulfillment line identity can identify a fulfillment line of the distributed order orchestration system. The flow then proceeds to 2820.

At 2820, the source status value is translated into a target status value based on a mapping table. In certain embodiments, a mapping table includes one or more source status values and one or more target status values, where each source status value is mapped to a target status value within the mapping table. The mapping table can be analyzed to identify the source status value, a corresponding target status value can be identified, and the source status value can be translated into the target status value based on the mapping within the mapping table. In certain embodiments, the source status value and the mapping table can each be associated with a task type. In these embodiments, the mapping table can also be analyzed to determine if the mapping table is associated with the task type that the source status value is associated with. The flow then proceeds to 2825.

At 2825, the target status value, the task instance identity, and the fulfillment line identity are each stored within an intersection table. In certain embodiments, an intersection table includes one or more records, where each record includes a task instance identity, a fulfillment line identity, and a status value. Thus, the intersection table maps each status value with a task (that is represented by the task instance identity) and a fulfillment line (that is represented by a fulfillment line identity). In embodiments where the intersection table includes a record with the task instance identity and the fulfillment line identity, the record can be updated with the target status value. In embodiments where the intersection table does not include a record with the task instance identity and the fulfillment line identity, a record can be created, where the record includes the task instance identity, the fulfillment line identity, and the target status value. The flow then proceeds to 2830.

At 2830, a status value for a task is determined based on one or more target status values stored within the intersection table. In certain embodiments, the intersection table is analyzed to determine one or more target status values associated with the task. Based on the one or more target status values associated with the task, a composite status value for the task is determined that takes into consideration the one or more target status values. In one embodiment, if the one or more target status values associated with the task are all the same, then the composite status value for the task is the same as the status value for the one or more target status values. In another embodiment, if the one or more target status values associated with the task are different, then the composite status value for the task is a value that indicates that the target status values are different, such as "Various." In certain embodiments, a user can customize how a status value for a task is determined based on one or more target status values stored within the intersection table. More specifically, a user can create logic that determines a composite status value for a task based on one or more target status values that are associated with the task. The flow then proceeds to 2835.

At 2835, a status value for an orchestration process is determined based on one or more task status values and one or more orchestration process status conditions. In certain embodiments, one or more task status values that are associated with the orchestration process can be analyzed. Then, one or more orchestration process status conditions can be evaluated. Each orchestration process status condition evaluates to one of two Boolean values based on the one or more task status values that are associated with the orchestration process. Further, each orchestration process status condition can be associated with a sequence number. Subsequently, an orchestration process status condition is selected, where the orchestration process status condition evaluates to a first Boolean value, and is associated with the highest sequence number. Each orchestration process status condition can be further associated with a status value. A composite status value is then determined that is equal to the status value associated with the selected orchestration process status condition.

In certain embodiments, each task status value of the one or more task status values can be associated with a split priority. A split priority can determine which task status value should be used to evaluate an orchestration process status condition, where one or more duplicate tasks are associated with the orchestration process, but a task status value of each duplicate task is different. According to these embodiments, in evaluating the orchestration process status condition, the task status value associated with a higher split status priority is used.

In certain embodiments, a user can customize the one or more orchestration process status conditions used to determine a status value for an orchestration process. More specifically, a user can create logic for each orchestration process condition that is based on one or more task status values that correspond to the orchestration process. The flow then proceeds to 2840.

At 2840, a status value for a fulfillment line is determined based on one or more target status values stored within the intersection table, and one or more fulfillment line status conditions. In certain embodiments, the intersection table can be analyzed to determine one or more target status values associated with the fulfillment line. Then, one or more fulfillment line status conditions can be evaluated. Each fulfillment line status condition evaluates to one of two Boolean values based on the one or more target status values that are associated with the fulfillment line. Further, each fulfillment line status condition can be associated with a sequence number. Subsequently, a fulfillment line status condition is selected, where the fulfillment line status condition evaluates to a first Boolean value, and is associated with the highest sequence number. Each fulfillment line status condition can be further associated with a status value. A composite status value is then determined that is equal to the status value associated with the selected fulfillment line status condition.

In certain embodiments, the one or more fulfillment line status conditions comprise a rule set. A rule set can be associated with a status category, where one or more status categories comprise a status catalog. A status catalog can include one or more items, where each item can be associated with a status category. An orchestration process can be associated with a status catalog, and a fulfillment line that is associated with the orchestration process can include an item attribute. A value of the item attribute can be identical to a value of an item within the status catalog associated with the orchestration process. Based on the item attribute, a fulfillment line can be associated with a status category that comprises the item, and thus, the fulfillment line can be associated with the rule set that is associated with the status category. Therefore, in these embodiments, each fulfillment line associated with an orchestration process can be associated with its own rule set (i.e., can be associated with its own one or more fulfillment line status conditions).

In certain embodiments, a user can customize the one or more fulfillment line status conditions used to determine a status value for a fulfillment line. More specifically, a user can create logic for each fulfillment line status condition that is based on one or more target status values that correspond to the fulfillment line. A user can further create a rule set that comprises one or more fulfillment line status conditions, and associate the rule set with a status category of a status catalog. The flow then proceeds to 2845.

At 2845, a status value for an order line is determined based on one or more fulfillment line status values. In certain embodiments, an order line is comprised of one or more fulfillment lines. Each fulfillment line can have a fulfillment line status value associated with it, where the fulfillment line status value can be (among other status values), one of three status values, where a first status value indicates that a fulfillment line is open, a second status value indicates that a fulfillment line is closed, and a third status value indicates that a fulfillment line is cancelled. Each fulfillment line status value associated with an order line can be analyzed. A composite order line status value can then be determined based on the fulfillment line status values.

In one embodiment, if each fulfillment line status value has a status value that indicates a fulfillment line is open, a composite order line status value of a first status value that indicates that an order line is open can be determined. In another embodiment, if each fulfillment line status value has a status value that indicates a fulfillment line is closed, a composite order line status value of a second status value that indicates that an order line is closed can be determined. In another embodiment, if each fulfillment line status value has a status value that indicates a fulfillment line is cancelled, a composite order line status value of a third status value that indicates that an order line is cancelled can be determined. In another embodiment, if some fulfillment line status values have a status value that indicates a fulfillment line is open, and other fulfillment line status values have a status that indicates a fulfillment line is closed, a composite order line status value of a fourth status value that indicates an order line is partially open can be determined. The flow then proceeds to 2850.

At 2850, a status value for an order is determined based on one or more order line status values. In certain embodiments, an order is comprised of one or more order lines. Each order line can have an order line status value associated with it, where the order line status value can be (among other status values), one of three status values, where a first status value indicates that an order line is open, a second status value indicates that an order line is closed, and a third status value indicates that an order line is cancelled. Each order line status value associated with an order can be analyzed. A composite order status value can then be determined based on the order line status values.

In one embodiment, if each order line status value has a status value that indicates an order line is open, a composite order status value of a first status value that indicates that an order is open can be determined. In another embodiment, if each order line status value has a status value that indicates an order line is closed, a composite order status value of a second status value that indicates that an order is closed can be determined. In another embodiment, if each order line status value has a status value that indicates an order line is cancelled, a composite order status value of a third status value that indicates that an order is cancelled can be determined. In another embodiment, if some order line status values have a status value that indicates an order line is open, and other order line status values have a status that indicates an order line is closed, a composite order status value of a fourth status value that indicates an order is partially open can be determined.

2830, 2835, 2840, 2845, and 2850 are examples of determining a status value of an object based on one or more target status values stored within an intersection table, according to certain embodiments. However, determining a status value of an object based on the one or more target status values stored within the intersection table is not limited to the example embodiments previously described. In alternate embodiments, a status value of an object can be determined based on one or more target status values stored within an intersection table, and based on logic stored within a status management framework of a distributed order orchestration system. In some embodiments, such logic can be customized by a user of the distributed orchestration system.

Thus, according to certain embodiments, a status management framework can be flexible in communicating with disparate fulfillment systems while providing users with the ability to extend and adjust the status management framework to meet their own needs. Thus, the status management framework can allow users of a distributed order orchestration system to make data-driven updates to alter status behaviors rather than having to write addition program code containing additional logic. Furthermore, while certain embodiments of the invention have been described in relation to order orchestration, one of ordinary skill in the art would appreciate that the status management framework could be applied to other business applications in alternate embodiments. For example, the status management framework can be applied in supply chain orchestration ("SCO"). As another example, the status management framework can be applied in supply chain financial orchestration ("SFO").

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to orchestrate an order for an item in a dynamically executable distributed order orchestration system comprising a capture layer, a decomposition layer, an orchestration layer, a task layer, a status service and an external interface layer, the orchestration comprising:

at the capture layer, receiving the order over a network and creating a source order object from the order;

at the decomposition layer, receiving the order from the capture layer in a first format, decomposing the received order into individual purchase orders and translating each of the individual purchase orders into at least one second format that is different from the first format and that is compatible with an external order fulfillment system, and sending the individual purchase orders to the external fulfillment system;

at the task layer, receiving a source status value from the external fulfillment system, wherein the source status value is associated with a task and a fulfillment line;

determining a task instance identity of the task associated with the source status value, and a fulfillment line identity of the fulfillment line associated with the source status value;

transforming the source status value corresponding to the external fulfillment system into a target status value corresponding to the distributed order orchestration system based on a mapping table;

at the status service, storing the target status value, task instance identity, and fulfillment line identity in an intersection table, wherein the intersection table maps a status value to a task and fulfillment line;

analyzing the intersection table and determining one or more target status values mapped to the task;

determining a composite status value of the task based on the one or more target status values mapped to the task, wherein the composite status value is a composite of the one or more target status values mapped to the task;

analyzing the intersection table and determining one or more target status values mapped to the fulfillment line;

evaluating one or more fulfillment line status conditions based on the one or more target status values that are mapped to the fulfillment line, wherein each fulfillment line status condition comprises a sequence number, a status value, and a condition;

selecting the fulfillment line status condition whose condition evaluates to a pre-defined value and whose sequence number is the largest;

determining a composite status value of the fulfillment line that is equal to the status value of the selected fulfillment line status condition;

determining a status value of an orchestration process based on one or more task status values and one or more orchestration process status conditions, wherein each orchestration process status condition evaluates to one of two Boolean values based on the one or more task status values; and in response to the determined status value of the orchestration process, causing the external fulfillment system to ship the item to a recipient.

2. The non-transitory computer-readable medium of claim 1, wherein the determining the composite status value of the task further comprises:

determining a composite status value that is the same as the status value for the one or more target status values when the one or more target status values associated with the task are all the same; and determining a composite status value that indicates that the one or more target status values associated with the task are different when the one or more target status values associated with the task are different.

3. The non-transitory computer-readable medium of claim 1, wherein the determining the status value of the orchestration process further comprises:

analyzing the one or more task status values and determining one or more task status values associated with the orchestration process;

evaluating each orchestration process status condition to one of two Boolean values based on the one or more task status values that are associated with the orchestration process;

selecting the orchestration process status condition that evaluates to a first Boolean value, and that is associated with a highest sequence number; and determining a composite status value that is equal to a status value associated with the selected orchestration process status condition.

4. The non-transitory computer-readable medium of claim 3, wherein the determining the status value of the orchestration process further comprises:

selecting a task status value associated with a highest split priority, where one or more duplicate tasks are associated with the orchestration process, wherein each task status value of the one or more task status values is associated with a split priority.

5. The non-transitory computer-readable medium of claim 1, wherein the status condition of each fulfillment line status condition evaluates to one of two Boolean values based on the one or more target status values.

6. The non-transitory computer-readable medium of claim 5, wherein the pre-defined value is a first Boolean value.

7. The non-transitory computer-readable medium of claim 6, wherein the one or more fulfillment line status conditions comprise a rule set;

wherein the rule set is associated with a status category;
where the status category is associated with a status catalog;
wherein an orchestration process is associated with the status catalog; and
wherein the fulfillment line is associated with the orchestration process and associated with the status category.

8. The non-transitory computer-readable medium of claim 5, the orchestration further comprising:

determining a status value for an order line based on one or more fulfillment line status values; and
determining a status value for an order based on one or more order line status values.

9. A computer-implemented method for orchestrating an order for an item in a dynamically executable distributed order orchestration system comprising a capture layer, a decomposition layer, an orchestration layer, a task layer, a status service and an external interface layer, the method comprising:

at the capture layer, receiving the order over a network and creating a source order object from the order;

at the decomposition layer, receiving the order from the capture layer in a first format, decomposing the received order into individual purchase orders and translating each of the individual purchase orders into at least one second format that is different from the first format and that is compatible with an external order fulfillment system, and sending the individual purchase orders to the external fulfillment system;

at the task layer, receiving a source status value from the external fulfillment system, wherein the source status value is associated with a task and a fulfillment line;

determining, by a processor, a task instance identity of the task associated with the source status value, and a fulfillment line identity of the fulfillment line associated with the source status value;

transforming the source status value corresponding to the external fulfillment system into a target status value corresponding to the distributed order orchestration system based on a mapping table;

at the status service, storing the target status value, task instance identity, and fulfillment line identity in an intersection table, wherein the intersection table maps a status value to a task and fulfillment line;

analyzing the intersection table and determining one or more target status values mapped to the task;

determining a composite status value of the task based on the one or more target status values mapped to the task, wherein the composite status value is a composite of the one or more target status values mapped to the task;

analyzing the intersection table and determining one or more target status values mapped to the fulfillment line;
evaluating one or more fulfillment line status conditions based on the one or more target status values that are mapped to the fulfillment line, wherein each fulfillment line status condition comprises a sequence number, a status value, and a condition;
selecting the fulfillment line status condition whose condition evaluates to a pre-defined value and whose sequence number is the largest;
determining a composite status value of the fulfillment line that is equal to the status value of the selected fulfillment line status condition;
determining a status value of an orchestration process based on one or more task status values and one or more orchestration process status conditions, wherein each orchestration process status condition evaluates to one of two Boolean values based on the one or more task status values; and
in response to the determined status value of the orchestration process, causing the external fulfillment system to ship the item to a recipient.

10. The computer-implemented method of claim 9, wherein the status condition of each fulfillment line status condition evaluates to one of two Boolean values based on the one or more target status values.

11. The computer-implemented method of claim 10, wherein the determining the status value of the object within the distributed orchestration system further comprises:
determining a status value for an order line based on one or more fulfillment line status values; and
determining a status value for an order based on one or more order line status values.

12. A dynamically executable distributed order orchestration system that orchestrates an order for an item, comprising:
one or more processors that execute instructions to implement a capture layer, a decomposition layer, an orchestration layer, a task layer, a status service and an external interface layer;
at the capture layer, receiving the order over a network and creating a source order object from the order;
at the decomposition layer, receiving the order from the capture layer in a first format, decomposing the received order into individual purchase orders and translating each of the individual purchase orders into at least one second format that is different from the first format and that is compatible with an external order fulfillment system, and sending the individual purchase orders to the external fulfillment system;
at the task layer, a status value reception module configured to receive a source status value from the external fulfillment system, wherein the source status value is associated with a task and a fulfillment line;
a determination module configured to determine a task instance identity of the task associated with the source status value, and a fulfillment line identity of the fulfillment line associated with the source status value;
a status value translation module configured to transform the source status value corresponding to the external fulfillment system into a target status value corresponding to the distributed order orchestration system based on a mapping table;
at the status service, an intersection table storage module configured to store the target status value, task instance identity, and fulfillment line identity in an intersection table, wherein the intersection table maps a status value to a task and fulfillment line; and
a status value determination module configured to analyze the intersection table and determine one or more target status values mapped to the task;
wherein the status value determination module is further configured to determine a composite status value of the task based on the one or more target status values mapped to the task, and wherein the composite status value is a composite of the one or more target status values mapped to the task;
wherein the status value determination module is further configured to analyze the intersection table and determine one or more target status values mapped to the fulfillment line;
wherein the status value determination module is further configured to evaluate one or more fulfillment line status conditions based on the one or more target status values that are mapped to the fulfillment line, wherein each fulfillment line status condition comprises a sequence number, a status value, and a condition;
wherein the status value determination module is further configured to select the fulfillment line status condition whose condition evaluates to a pre-defined value and whose sequence number is the largest;
wherein the status value determination module is further configured to determine a composite status value of the fulfillment line that is equal to the status value of the selected fulfillment line status condition; and
wherein the status value determination module is further configured to determine a status value of an orchestration process based on one or more task status values and one or more orchestration process status conditions, wherein each orchestration process status condition evaluates to one of two Boolean values based on the one or more task status values and in response to the determined status value of the orchestration process, causing the external fulfillment system to ship the item to a recipient.

13. The distributed order orchestration system of claim 12, wherein the status condition of each fulfillment line status condition evaluates to one of two Boolean values based on the one or more target status values.

14. The distributed order orchestration system of claim 13, wherein the status value determination module is further configured to determine a status value for an order line based on one or more fulfillment line status values; and
wherein the status value determination module is further configured to determine a status value for an order based on one or more order line status values.

* * * * *